US007817854B2

(12) United States Patent
Taylor

(10) Patent No.: US 7,817,854 B2
(45) Date of Patent: Oct. 19, 2010

(54) METHOD AND APPARATUS FOR IDENTIFYING THE ROTATION ANGLE AND BOUNDING RECTANGLE OF A DIGITIZED FORM

(75) Inventor: Garland S. Taylor, Valrico, FL (US)

(73) Assignee: Pegasus Imaging Corporation, Tampa, FL (US)

( * ) Notice: Subject to any disclaimer, the term of this patent is extended or adjusted under 35 U.S.C. 154(b) by 1125 days.

(21) Appl. No.: 11/484,836

(22) Filed: Jul. 11, 2006

(65) Prior Publication Data
US 2008/0018941 A1    Jan. 24, 2008

(51) Int. Cl.
    *G06K 9/00*    (2006.01)
(52) U.S. Cl. .................................................. 382/168
(58) Field of Classification Search .................. 382/112, 382/137–140, 164–165, 168, 170, 171, 181, 382/190, 199, 203–206, 305–306; 715/200, 715/221, 234, 243, 246, 247, 255
    See application file for complete search history.

(56) References Cited

U.S. PATENT DOCUMENTS
7,487,438 B1 *    2/2009    Withers ...................... 715/223
* cited by examiner Primary Examiner—Jose L Couso
(74) Attorney, Agent, or Firm—Straub & Pokotylo; Michael P. Straub

(57) ABSTRACT

Methods and apparatus for determining the skew angle of a digitized form scanned at an angle to the original page are described. The method determines a rotation angle and a boundary rectangle of best fit. Sections of the digital image in the form of thin strips are examined for the boundary between the page and the region of the scanned image beyond the original page. The Hough transform is employed to determined candidate edge line segments for the page from the sets of perimeter points. These line segments are then combined to select the best rectangle enclosing the page, from which the skew angle is determined. The algorithm also determines a rotated bounding box enclosing the page. An innovation of the invention is the use of fuzzy logic, whereby several candidates for perimeter points, candidate edges, and bounding rectangles are determined in each step of the computation with associated confidence values and the final skew angle is selected by choosing the bounding rectangle with the highest confidence values.

31 Claims, 37 Drawing Sheets

METHOD AND APPARATUS FOR IDENTIFYING THE ROTATION ANGLE AND BOUNDING RECTANGLE OF A DIGITIZED FORM

FIELD OF THE INVENTION

The present invention relates to the field of automated processing of forms and, more particularly, to methods and apparatus for aligning and/or interpreting digital forms.

BACKGROUND OF THE INVENTION

In certain areas, like government, health care, human resources, and insurance, the daily processing of a variety of paper forms is a routine and important activity. The processing of a form often involves: the extraction of the information on the form supplied by the users; specific actions that are governed by the specific nature of the extracted information; and, possibly, the archiving of the extracted information and/or the form itself in a manner that facilitates subsequent use of the archival information. While all of these steps can, and often are, performed by a human, the processing of large number of forms on a timely basis by means of digital computing devices would be desirable.

One common step in the automation of forms handling is the digitization of one or more forms by means of an appropriate scanning device. The result of the scanning process is a set of information representing the digitized form. The set of information is normally a rectangular array of pixel elements—an "image"—of dimensions W and H where the "width", W, is the number of pixels in each horizontal row of the array and the "height", H, is the number of pixels in each vertical column of the pixel array. The columns may be identified, for purpose of discussing such a set of information, by an index, I, whose values can range from 0 to W-1; and the rows can be identified by an index J whose values range from 0 to H-1 where W, H, J and I are integer values. If a pixel array itself is labeled as IMG, then the value of a pixel in the column with index I and row with index J is labeled for discussion purposed as IMG[I,J]. The ordered pair [I,J] is sometimes called the "address" or "pixel location" of this pixel. This is illustrated in FIG. 1. FIG. 1 includes an exemplary pixel array 100 in which column 0 102, exemplary column I 104, column (W-1) 106, row 0 108, exemplary row J 110, row (H-1) 112, and exemplary pixel location [I,J] 114 are identified.

While the particular colors that are used on forms can vary from application to application, most forms have only two distinguishing color features, the background color and the foreground color. It is common practice to set the values of all pixels representing the background color to the number 1, as illustrated with background pixels 116 in FIG. 1, and all pixels representing the foreground color to the value 0, as illustrated with foreground pixels 118 in FIG. 1.

A not uncommon phenomenon in the scanning operation is that the digitized form is created at an angle to the original orientation of the form, as illustrated in image 300 of FIG. 3 (compare to image 200 of FIG. 2). Parts of the boundary of the original page may or may not be visible in the digitized form, as illustrated in FIG. 4. In either case, this perturbation of the form can present a serious impediment to high-level automated tasks such as form classification or optical character recognition.

Thus an automatic method of determining the rotation angle for the digitized form and digitally rotating the form to a straight orientation would be desirable. The operation of rotating the form by a known angle is straightforward and well-understood in the art. However, the problem of determining the correct rotation angle is much subtler and more complex, and there is a need for improved methods and apparatus to perform such operations.

In addition to determining the correct angle of rotation, it would be useful to be able to determine the boundaries of the original page within the image. Parts of this rectangle may even extend beyond the boundaries of the image matrix itself.

Thus there is a need for improved methods and apparatus that can be used to determine useful information for correcting rotation error in a scanned printed form. Examples of useful information include: (1) a rotation angle, (2) a first x-value indicating the left edge of the page with corrected rotation, (3) a second x-value indicating the right edge of the page with corrected rotation, (4) a first y-value indicating the top edge of the page with corrected rotation, and (5) a second y-value indication the bottom edge of the page with corrected rotation.

SUMMARY OF THE INVENTION

Various exemplary embodiments of the invention are directed to an automated process for determining a rotation angle and bounding rectangle of a digitized form created by scanning a printed paper page which may be misaligned in orientation with respect to the scanner. Various embodiments of the present invention are well suited to applications where the region of the scanned image outside the boundaries of the original page presents a color contrast with the page itself.

An exemplary embodiment in accordance with the present invention will now be described. Inputs to the exemplary process in accordance with the present invention are a digital image in the form of a matrix with H rows and W columns, each element of the matrix taking one of a plurality of values, e.g., the value 0 or 1, together with the values of W and H and a detection-effort parameter ranging in value, e.g., from 1 to 100, the detect effort parameter value indicating the desired emphasis on accuracy of computation at the expense of computation time. For the purpose of this description it is assumed that the 1 value represents the background (page) color while the 0 value represents the foreground (text) color.

For purposes of discussion, the image can be divided into three regions: the printed area, corresponding to the central area of the page which contains printed data, roughly rectangular in outline; the margin area, corresponding to regions of the original page outside the printed area, and the extra-marginal area, comprising regions of the image outside the boundary of the scanned page. Note that the printed area is expected to contain both 0 and 1 pixel values, while the margin area is expected to contain mostly 1 pixel values, although owing to specks and defects in the scanning process, or small extraneous marks on the original document, the margin area may contain a small proportion of 0 pixel values. The extra-marginal area is expected to be predominantly of a single pixel value, which may be 0 or 1. However, if the extra-marginal comprises predominantly of the pixel value 1, there is no need for the algorithm to draw a distinction between the marginal area and extra-marginal area; we assume therefore that the extra-marginal area is comprised predominantly of the pixel value 0. Again, specks and defects in the scanning process may introduce a small proportion of 1 pixel values.

The first stage in the computation is construction of several horizontal and vertical "bands", a "band" including certain descriptive information about a horizontal or vertical strip of the image. The height of a horizontal strip or the width of a vertical strip is a fixed value, e.g. 8. In certain embodiments, the fixed value 8 allows a block of 8 pixels stored in a single byte of computer memory to be processed as a single unit, providing a significant efficiency advantage. In other embodiments, the heights of horizontal strips and the widths of vertical strips may be of various sizes. Some embodiments may construct strips which vary from horizontal and vertical by some angle and which may not be parallel to each other.

The following information is stored descriptive of each band (1) the x- and (2) y-coordinates of the upper-left corner, (3) the width of a horizontal band or height of a vertical band, (4) a confidence value associated with the band, and (5) a histogram describing the projection of the band across its 8-pixel width or height. The number of entries in the histogram equals the width of a horizontal band or the height of a vertical band; each entry is a value representing from 0 to 8 indicating the number of white pixels in a single column of a horizontal band or in a single row of a vertical band.

In this first stage of the exemplary embodiment, the horizontal bands are constructed so that the x-value of the upper-left corner is zero and the y-values are determined so that the bands are evenly spaced from the top to the bottom of the image; the vertical bands are constructed so that the y-value of the upper-left corner is zero and the x-values are determined so that the bands are evenly spaced from the left to the right of the image. The width of a horizontal band or height of a vertical band is set equal to the total image width or height, respectively. The confidence value assigned is lower for horizontal bands near the top or bottom of the image or for vertical bands near the left or right boundary of the image as compared to the confidence value used for the center portion of the image, reflecting the probability that such bands may not intersect the printed area. The number of bands is variable and determined by the detection effort setting. A higher effort setting causes more bands to be examined. While bands are uniformly spaced in some embodiments non-uniform spaced bands may be used instead.

The second stage in the computation is to examine the histogram for each band and determine a set of candidate perimeter points, locations which may mark the boundary between the margin and the printed area for the given band. Two sets of points, e.g., edge locations, are generated for each band: for a horizontal band, one set of points marking the left margin and another marking the right margin; for a vertical band, one set of points marking the top margin and another marking the bottom margin.

An innovation of the method is the use of fuzzy logic. Noise and irregularities in the image make it impossible to determine with certainty where the margin ends and the printed area begins. This difficulty is handled by generating up to three candidate perimeter points on each end of each band and assigning a confidence value to each based on a combination of several criteria.

Points at a large change in color receive a higher confidence value. Points at a change away from margin color (pixel value 1), with the margin color being toward the image boundary receive a higher confidence value. Points at a change away from extra-margin color (pixel value 0), with the extra-margin color being toward the outside of the image receive a higher confidence value. Points belonging to a band with higher confidence value receive higher confidence value. Points nearer the appropriate end of the band receive a higher confidence value.

Comparisons to page and margin color are preceded by dilation and erosion operations with a window size set to the maximum size of specks in that type of region.

Robustness of the calculation is enhanced and sensitivity to specific parameter values is reduced by performing the calculation several times with varying parameter values combining the results.

Ultimately, in some embodiments, four fuzzy sets of candidate perimeter points are produced, one for each side of the image, each containing up to three members for each band.

The third step in the computation is the determination of candidate edge line segments from the candidate perimeter points. For this purpose is employed the Hough transform, a mathematical tool well understood in the art. The Hough transform is used for the purpose of locating line structures in a set of points. The Hough transform employs a two-dimensional accumulator, indexed by the slope and intercepts of potential lines. For each point in the given set, every location in the accumulator whose slope-intercept value corresponds to a line containing the given point is incremented. A large value in the accumulator indicates that the set of points contains a strong line structure at the given slope and intercept value. An innovation of the present invention is the incorporation of fuzzy logic into the Hough transform, whereby the accumulator is not incremented by a fixed amount for each point but according to the confidence value associated with the point. While the Hough transform is well suited for use in the described method, in some embodiments, other line fitting/detection methods are used in place of the Hough transform. Computing a line using a least median squares method is one alternative approach which may be used. Also there are a variety of "segmentation" or "classification" algorithms that divide the points into groups, each group representing a single line which may be used for line detection.

For each of the four sides of the image, a set of three candidate edge line segments is derived from the associated set of perimeter points by means of the Hough transform. In the computation of each successive candidate edge, those perimeter points located close to previously-determined candidate edges have their confidence values reduced. Each candidate edge also has an associated confidence value, determined based on the confidence values of the points comprising the edge, the length of the edge, and its position close to or far from the boundary of the image.

The fourth stage in the computation is the calculation of confidence values for each pair of opposite or adjacent candidate edges. Opposite pairs of edges are top and bottom, or left and right. Adjacent pairs of edges are top and left, or top and right, or bottom and left, or bottom and right, each corresponding to a corner of the printed area. As there are three candidate edges identified for each edge of the printed area, there are nine pairs of edges in each of the foregoing categories. Each pair has a confidence value calculated based on the confidence values of the two constituent edges, how close the angle between the two constituent edges comes to the ideal value (zero in the case of opposite edges, or a right angle in the case of adjacent edges), and the distance between opposite edges.

The fifth stage in the computation is selection of the quadrilateral composed of candidate edges for each of the four sides having the highest confidence value. As there are three candidate edges for each of the four sides, the total number of possible quadrilaterals is 3*3*3*3=81. The confidence value for a quadrilateral is determined as a combination of the confidences for the individual edges and the confidences for each of the pairs of opposite or adjacent edges constituting the quadrilateral.

The sixth stage in the computation, used in some exemplary embodiments, is recalculation of the edge line segment for each of the four edges of the quadrilateral, based on a comparison of the contents of the image with the previously-defined candidate edges constituting the quadrilateral. This uses essentially the same algorithm as the first and second stages described above, except that a larger number of bands are examined and the bands do not cross the entire image, just a fixed distance to either side of the edge line. Perimeter points with a low confidence value are discarded.

The seventh stage in the computation is selection of a skew angle based on the edge line segments. The angle will be set to the average angles of the edge line segments that are closest together.

The eighth stage in the computation is determination of a bounding box for the printed area. The bounding box is determined in coordinates rotated by the skew angle determined in the seventh stage. Essentially the bounding box is determined as the smallest rectangle which includes each of the perimeter points calculated in the sixth stage, except that perimeter points on the left and right which are too high or low to lie between the top and bottom of the box and perimeter points on the top and bottom which are too far left or right to lie between the left and right edges of the bounding box are ignored.

In some embodiments the bounding box and skew angle are supplied to an image processing routine which performs de-skewing of the scanned image using the supplied information. The de-skewed image is output in a printed form, displayed on a display device, and/or stored in a memory device for later use. In other embodiments, the bounding box and skew angle information are simply stored on a data storage device for future use and/or output, e.g., to a printer or display. Thus, the processing of the invention which may be implemented using a computer to implement the processing operations, results in a physical result, e.g., the storage or output of an image in a concrete tangible form such as hard copy or as in the form of a machine readable medium physically altered to store the information and/or image.

While various embodiments have been discussed in the summary above, it should be appreciated that not necessarily all embodiments include the same features and some of the features described above are not necessary but can be desirable in some embodiments. Numerous additional features, benefits and embodiments of the invention will be discussed below in the detailed description.

DETAILED DESCRIPTION

FIG. 33 depicts an exemplary embodiment of the invention. The detailed description is presented from the lowest levels first, culminating in a detailed explanation of FIG. 33.

Figure 1:
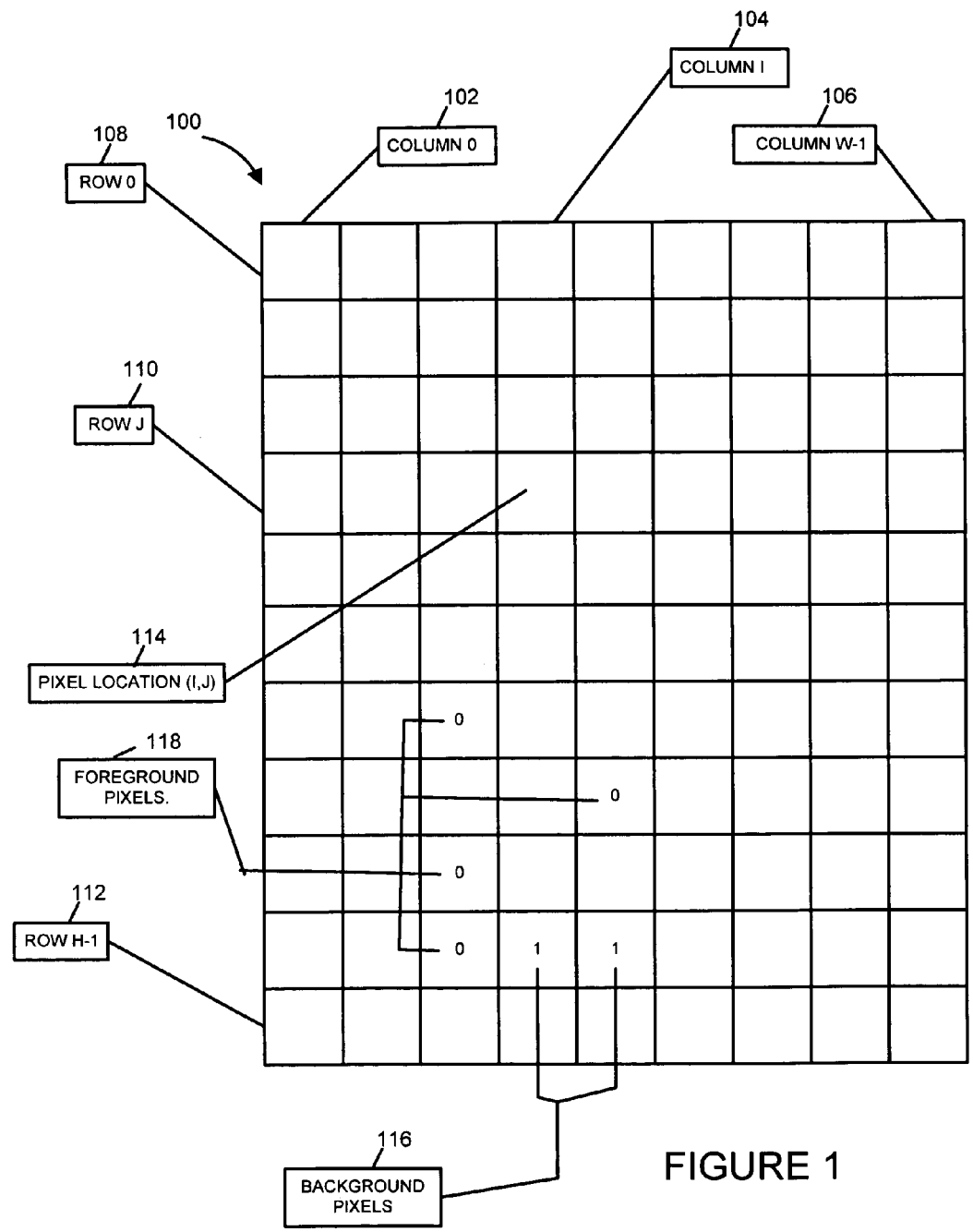
FIG. 1 illustrates an exemplary layout of a rectangular pixel array.
Figure 2:
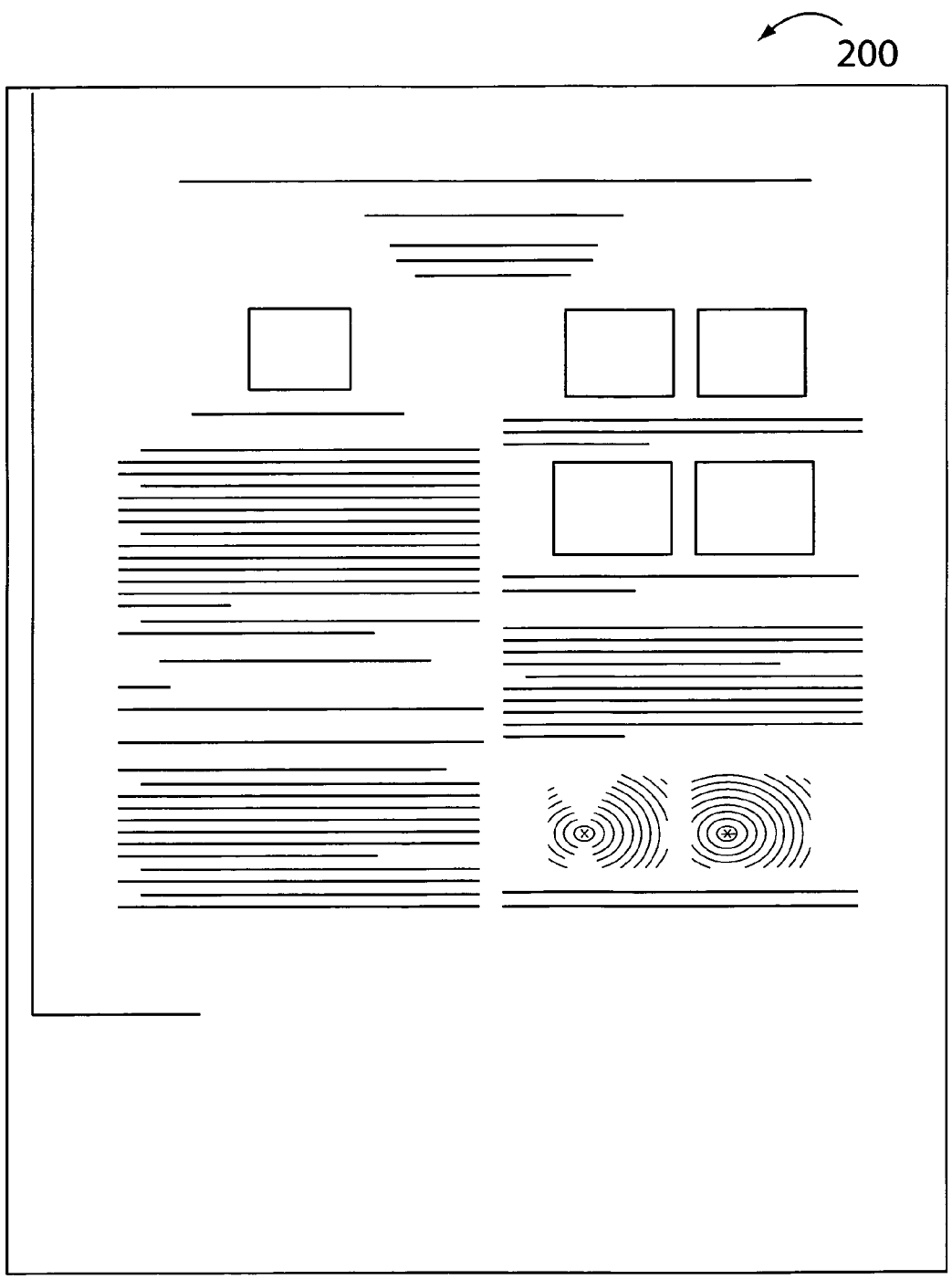
FIG. 2 is an example of an exemplary digitized form with little rotation error.
Figure 3:
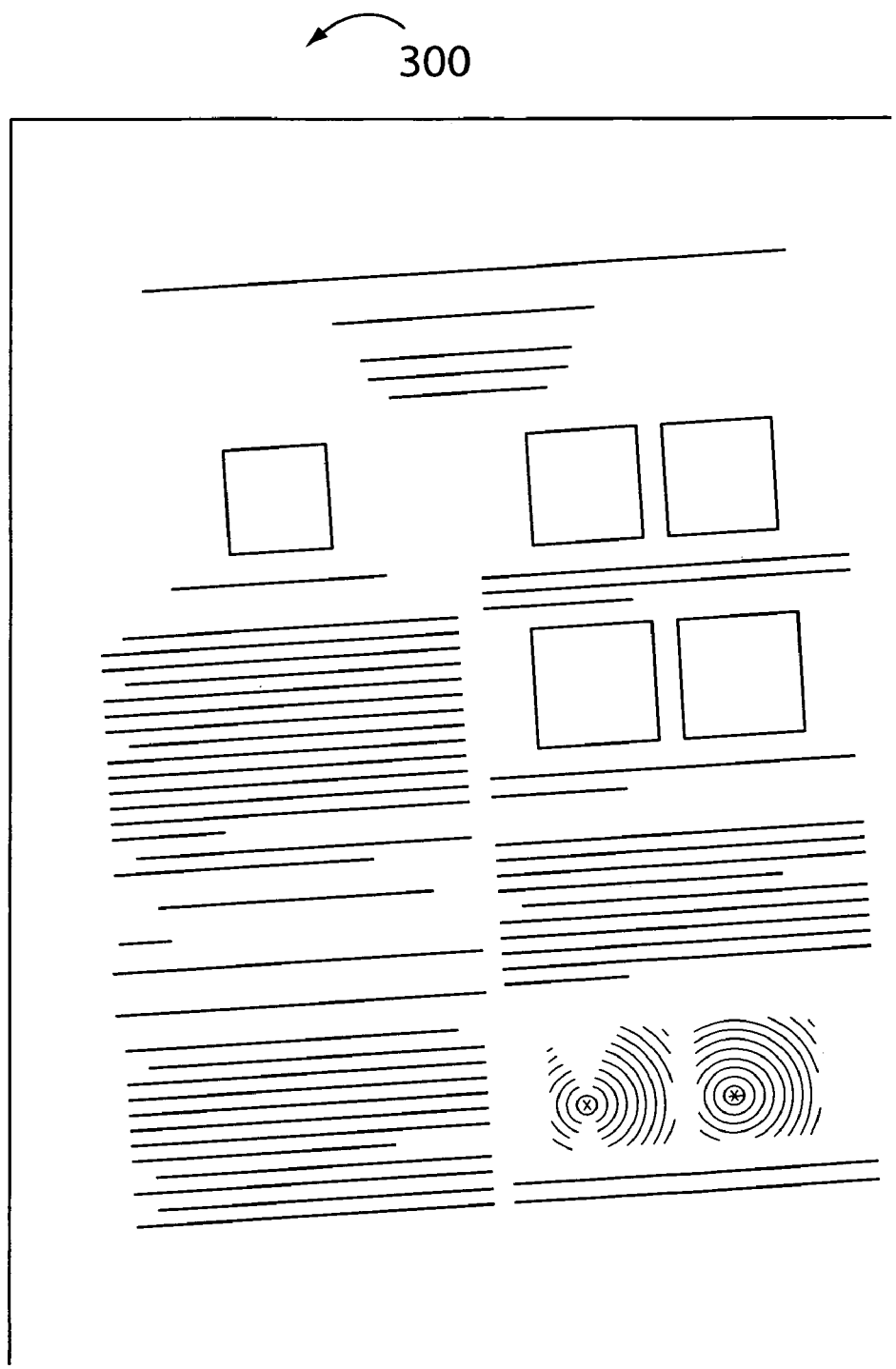
FIG. 3 is an example of an exemplary digitized form with significant rotation error.
Figure 4:
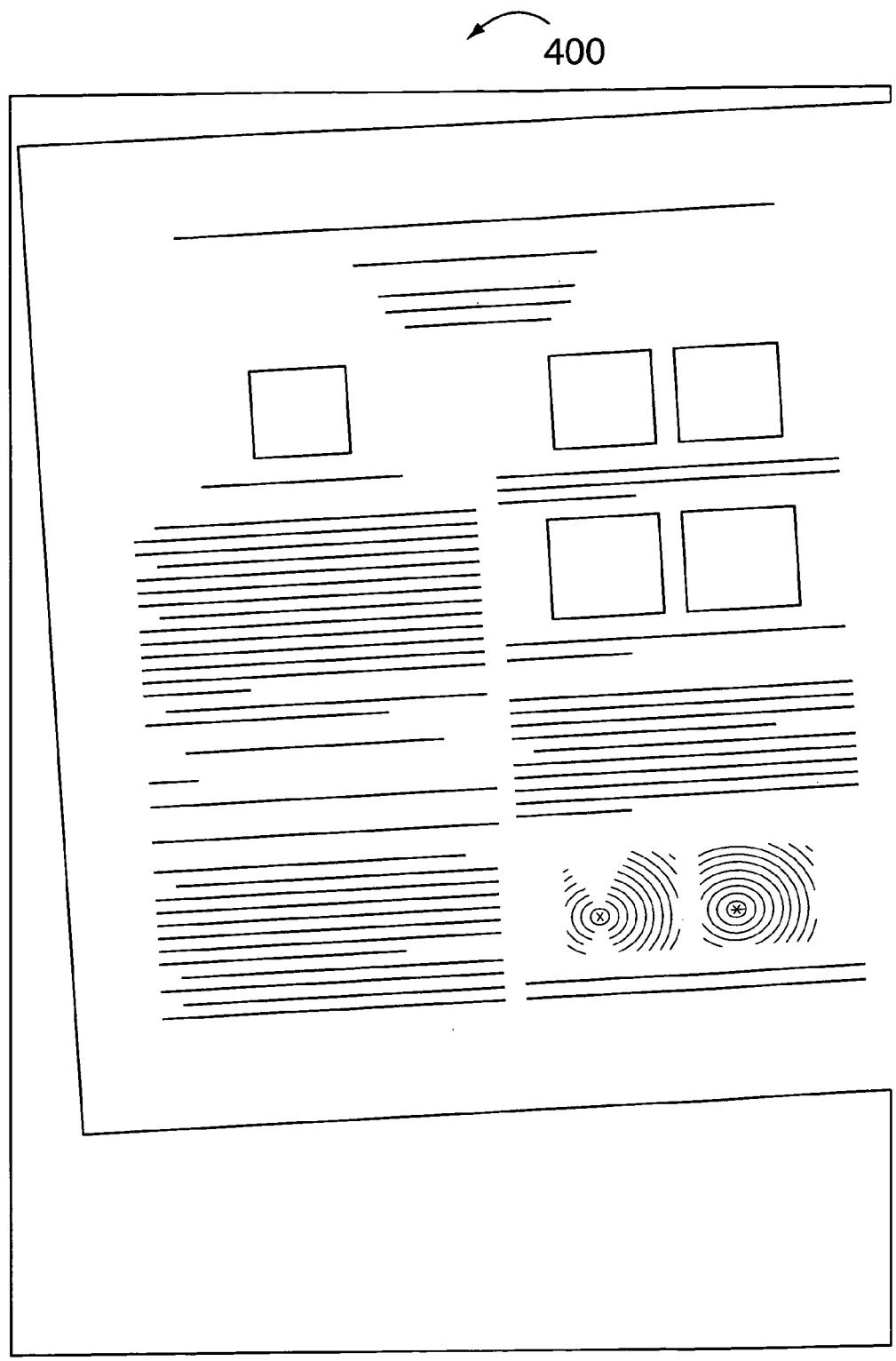
FIG. 4 is an example of an exemplary digitized form with significant rotation error and highly visible page boundaries.
Figure 5:
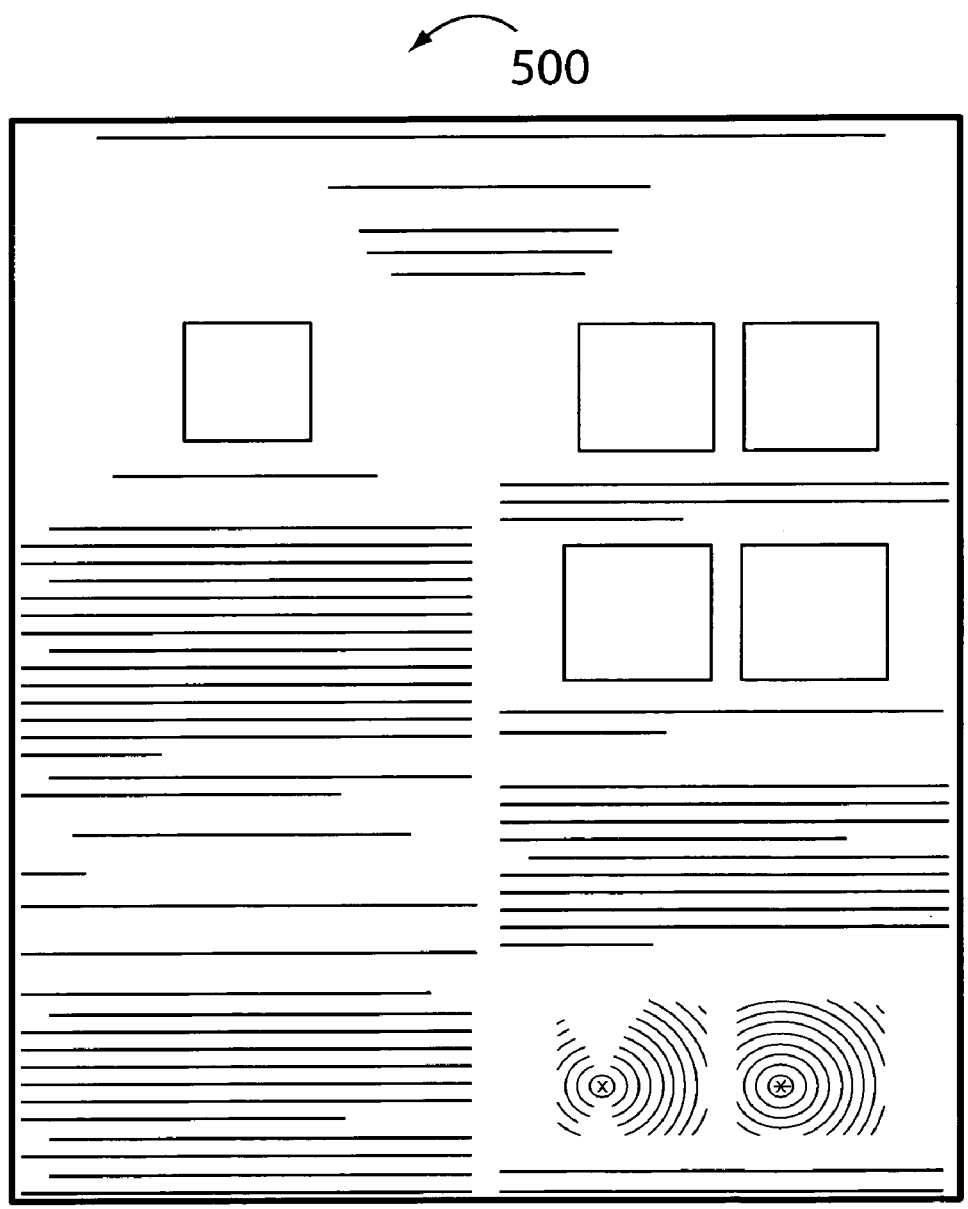
FIG. 5 is an example of an exemplary digitized form with significant rotation error, showing the bounding rectangle of the printed area.
Figure 6:
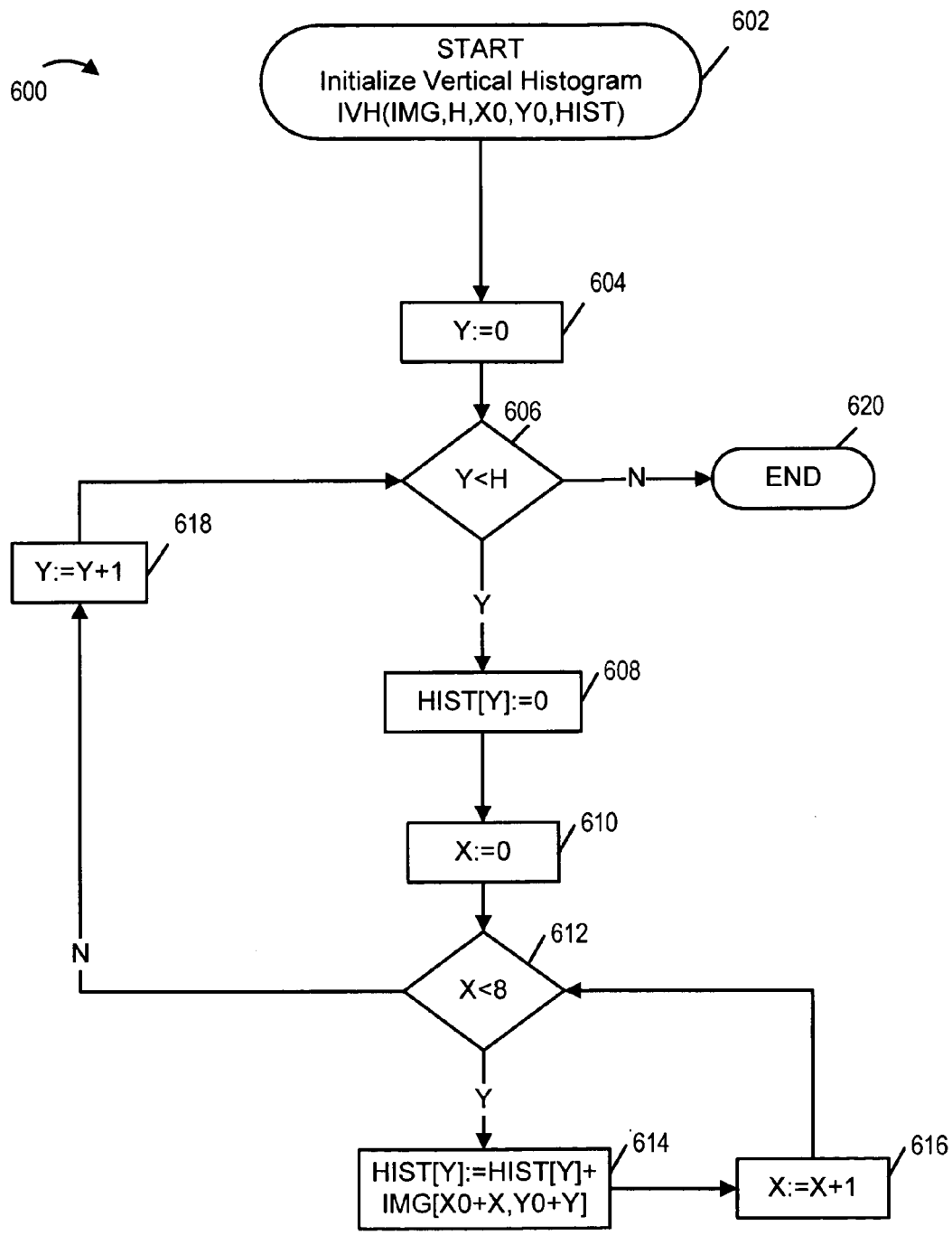
FIG. 6 depicts an exemplary method of calculating a histogram for a vertical strip of an image in accordance with the present invention.

FIG. 6 shows an exemplary Initialize Vertical Histogram (IVH) routine implemented in accordance with the invention. This purpose of this routine is to populate a histogram of pixel values over a vertical strip of the image. Arguments to the procedure are the matrix IMG of pixel values, the height H of the strip, the coordinates X0 and Y0 of the upper-left corner of the strip, and the array HIST to be populated (having H elements). The width of the strip is fixed at 8 pixels.

The routine 600 starts in step 602. From start step 602, where the routine begins execution, operation proceeds to step 604, wherein the coordinate position Y is initialized to 0 in preparation for looping over each of the rows of the strip. Control is then transferred to step 606.

Step 606 provides the exit from the loop over the rows of the strip. The value of Y is compared to H. If Y is less than H, control is transferred to step 608. Otherwise control is transferred to the end 620 of the procedure.

In step 608, the value HIST[Y] of the histogram for row with index Y is initialized to zero. Control is then transferred to step 610.

In step 610, the coordinate position X is initialized to 0 in preparation for a loop over each of the pixels within the current row. Control is then transferred to step 612.

Step 612 provides the exit from the loop over the pixels of the row. The value of X is compared to 8. If X is less than 8, control is transferred to step 614. Otherwise control is transferred to step 618.

In step 614, the value HIST[Y] of the histogram at position Y is augmented by the addition of the pixel value IMG[X0+X,Y0+Y] at position (X0+X,Y0+Y). Control is then transferred to step 616.

In step 616, the value of X is incremented in preparation for the next trip through the loop over each of the pixels of the row. Control is then transferred to step 612.

In step 618, the value of Y is incremented in preparation for the next trip through the loop over the rows of the strip. Control is then transferred to step 606.

Figure 7:
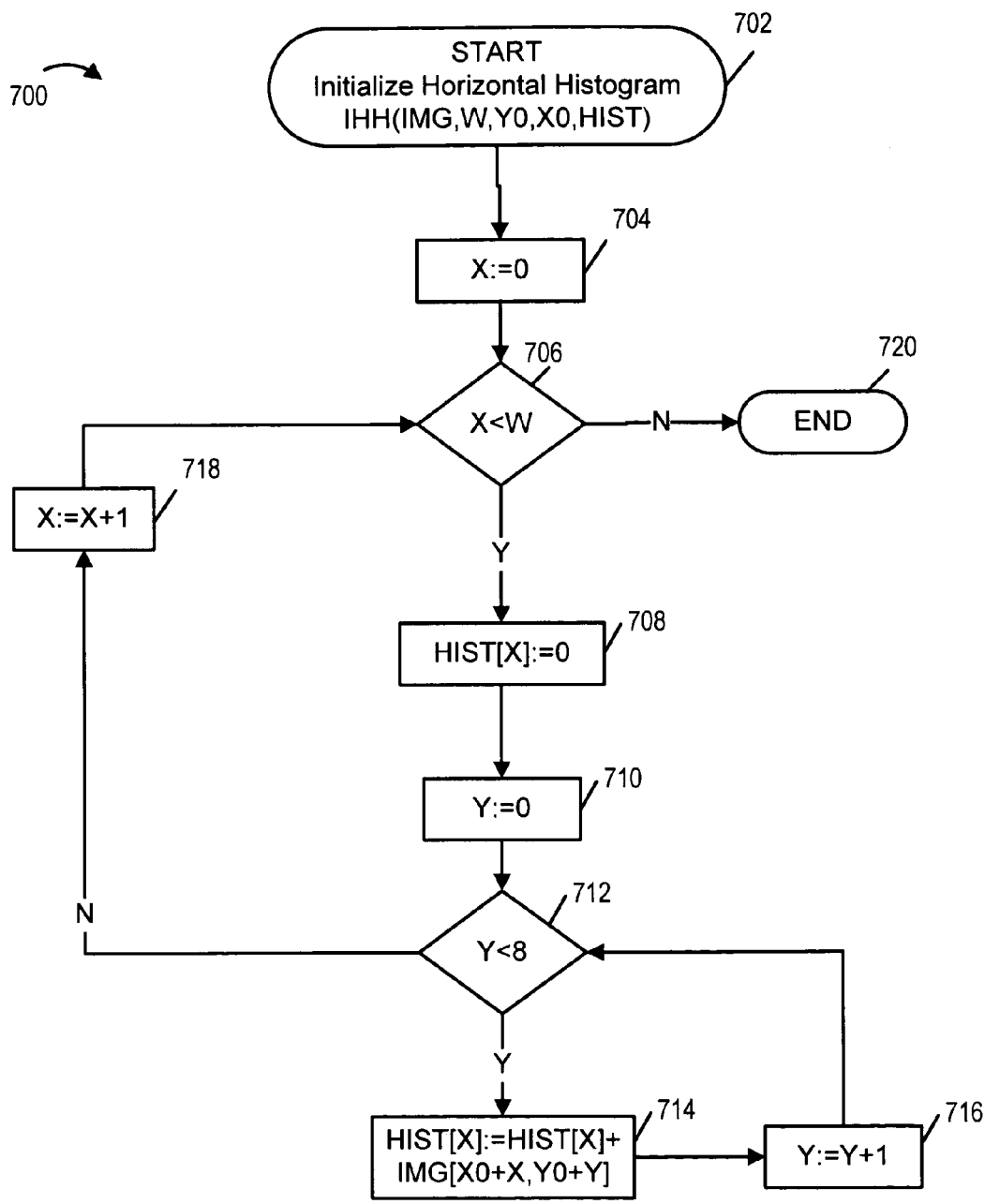
FIG. 7 depicts an exemplary method of calculating a histogram for a horizontal strip of an image in accordance with the present invention.

FIG. 7 shows an exemplary Initialize Horizontal Histogram (IHH) routine implemented in accordance with the invention. This purpose of this routine is to populate a histogram of pixel values over a horizontal strip of the image. Arguments to the procedure are the matrix IMG of pixel values, the width W of the strip, the coordinates X0 and Y0 of the upper-left corner of the strip, and the array HIST to be populated (having W elements). The height of the strip is fixed at 8 pixels.

The routine 700 starts in step 702. From start step 702, where the routine begins execution, operation proceeds to step 704, wherein the coordinate position X is initialized to 0 in preparation for looping over each of the columns of the strip. Control is then transferred to step 706.

Step 706 provides the exit from the loop over the columns of the strip. The value of X is compared to W. If X is less than W, control is transferred to step 708. Otherwise control is transferred to the end 720 of the procedure.

In step 708, the value HIST[X] of the histogram for column with index X is initialized to zero. Control is then transferred to step 710.

In step 710, the coordinate position Y is initialized to 0 in preparation for a loop over each of the pixels within the current column. Control is then transferred to step 712.

Step 712 provides the exit from the loop over the pixels of the column. The value of Y is compared to 8. If Y is less than 8, control is transferred to step 714. Otherwise control is transferred to step 718.

In step 714, the value HIST[X] of the histogram at position X is augmented by the addition of the pixel value IMG[X0+X,Y0+Y] at position (X0+X,Y0+Y). Control is then transferred to step 716.

In step 716, the value of Y is incremented in preparation for the next trip through the loop over each of the pixels of the column. Control is then transferred to step 712.

In step 718, the value of X is incremented in preparation for the next trip through the loop over the columns of the strip. Control is then transferred to step 706.

Figure 8:
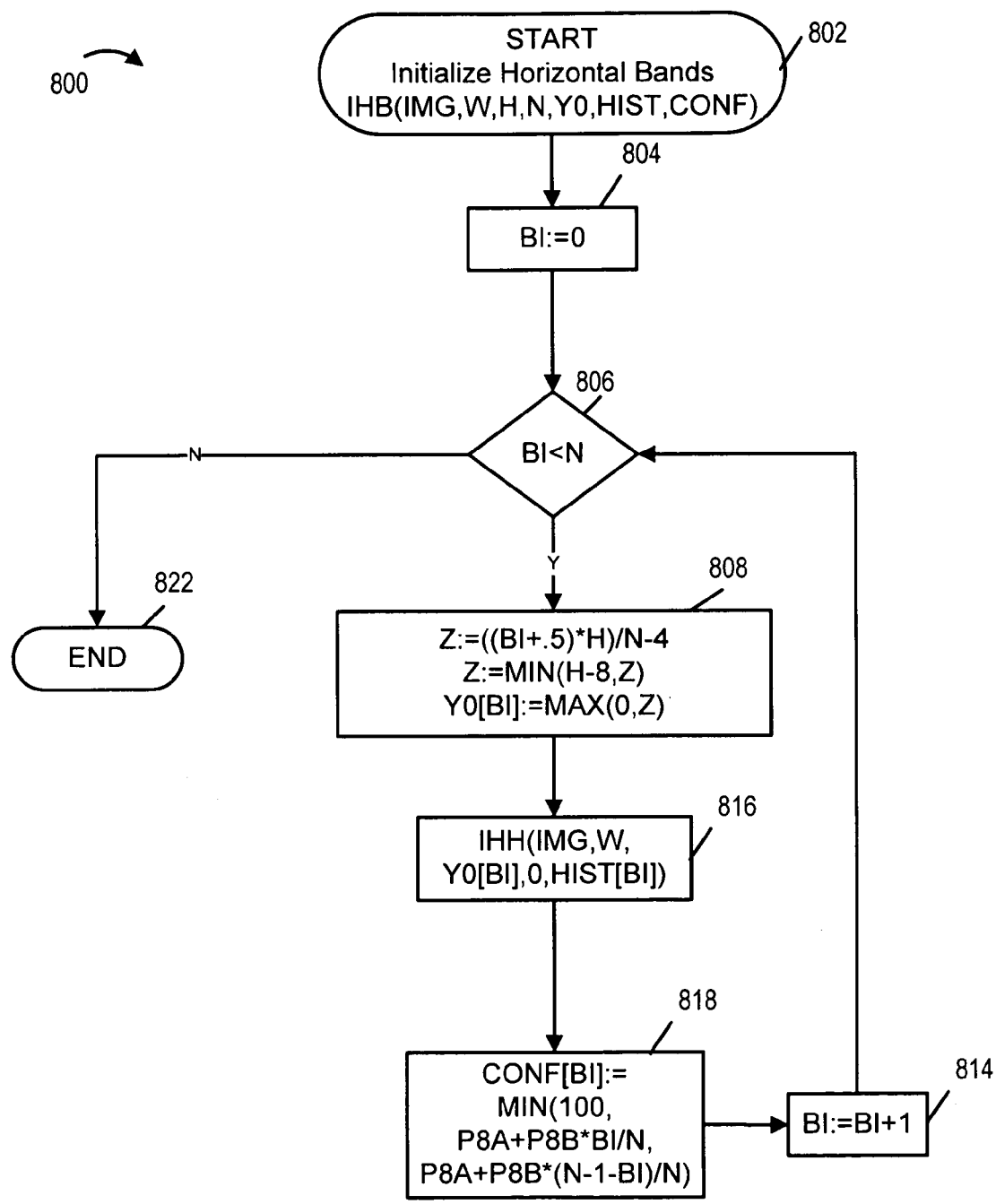
FIG. 8 depicts an exemplary method of calculating a set of horizontal "bands" comprising together histogram, coordinate, and confidence information for horizontal strips of an image in accordance with the present invention.

FIG. 8 shows an exemplary Initialize Horizontal Bands (IHB) routine implemented in accordance with the invention. This routine initializes a set of horizontal bands by calculating the following information for each band, indexed by a value BI: A base y-value Y0[BI], a histogram profile HIST[BI] (a table of values indexed by x-position value X), and a confidence value CONF[BI]. Arguments to this procedure are the matrix IMG of pixel values, the width W and height H of the image, the number N of bands to be created, an N-element array Y0 to be filled with the starting y-positions of the bands, an N×W array HIST to be filled with histogram values for the N bands, and an N-element array CONF to be filled with confidence values for the N bands; the bands are indexed by values of BI ranging from 0 (inclusive) to N (exclusive).

The routine 800 starts in step 802. From start step 802, where the routine begins execution, operation proceeds to step 804, wherein the band index BI is set to the initial value 0 in preparation for a loop over bands to be created.

Step 806 provides the exit from the loop over bands to be created. In step 806, the value of BI is compared to N. If the value of BI is less than that of N, operation proceeds to the body 808 of the loop. Otherwise, operation proceeds to the end 822 of the routine. In step 808, the base y-value Y0[BI] for horizontal band BI is calculated. This calculation is performed in such a way as to space the bands evenly from the top to the bottom of the image, while keeping each band within the image boundaries. First the temporary value Z is calculated according to the formula Z=((BI+0.5)*H)/N−4, the division operation being rounded to the nearest integer. The value 4, representing the offset from the center of the band (with total height 8) to the top edge, is subtracted. Then Z is modified so as not to exceed H−8, so that the band will not extend beyond the bottom edge of the image. Finally Y0[BI]

is calculated as the larger of Z or 0, so that the band will not extend beyond the top edge of the image. Control then passes to step 816.

In step 816, the histogram for the current bands is populated by the command IHH(IMG,W,Y0[BI],0,HIST[BI]). Control then passes to step 818.

In step 818 a preliminary confidence value CONF[BI] for horizontal band BI is calculated according to the formula MIN(100,P8A+P8B*BI/N,P8A+P8B*(N−1-BI)/N), the result of the division operation being rounded to the nearest integer. The effect of this calculation, for properly chosen parameter values P8A and P8B, is to set the confidence value to the maximum 100 for bands near the center of the image, but to decrease the confidence value for bands nearer the top or bottom of the image. The values of P8A and P8B may be chosen to fine-tune the performance of the algorithm. For exemplary values 100 for P8A and 350 for P8B, the confidence value is set to 30 for the very first and last bands, increasing gradually toward the middle of the range of bands; the confidence is set to the maximum 100 for bands in the middle 60% of the range. Control is then transferred to step 814.

In step 814 the value of BI is incremented in preparation for the next trip through the loop over each of the bands to be created. Control is then transferred to step 806.

Figure 9:
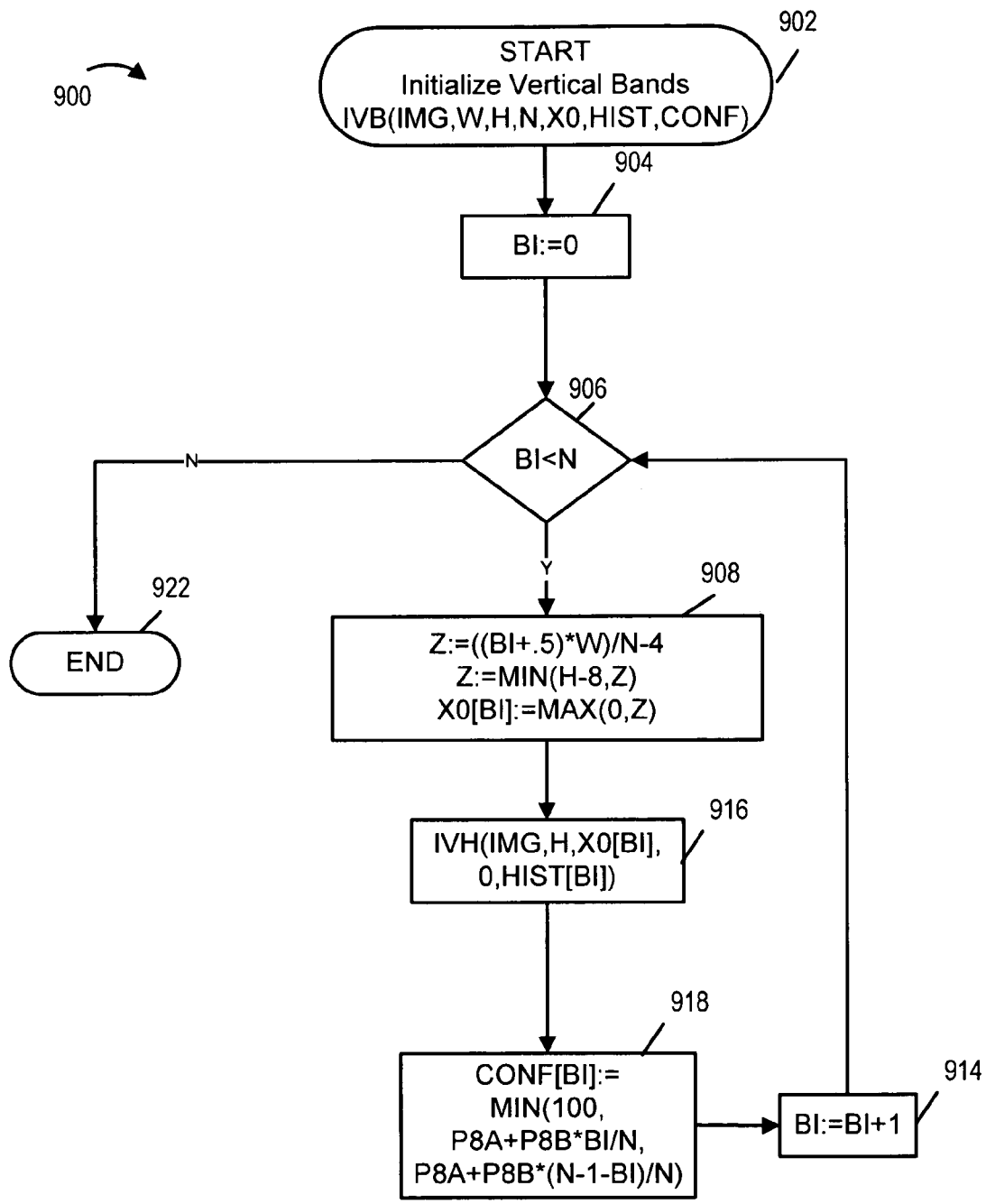
FIG. 9 depicts an exemplary method of calculating a set of vertical "bands" comprising together histogram, coordinate, and confidence information for vertical strips of an image in accordance with the present invention.

FIG. 9 shows an exemplary Initialize Vertical Bands (IVB) routine implemented in accordance with the invention. This routine initializes a set of vertical bands by calculating the following information for each band, indexed by a value BI: A base x-value X0[BI], a histogram profile HIST[BI] (a table of values indexed by y-position value Y), and a confidence value CONF[BI]. Arguments to this procedure are the matrix IMG of pixel values, the width W and height H of the image, the number N of bands to be created, an N-element array X0 to be filled with the starting x-positions of the bands, an N×H array HIST to be filled with histogram values for the N bands, and an N-element array CONF to be filled with confidence values for the N bands; the bands are indexed by values of BI ranging from 0 (inclusive) to N (exclusive).

The routine 900 starts in step 902. From start step 902, where the routine begins execution, operation proceeds to step 904, wherein the band index BI is set to the initial value 0 in preparation for a loop over bands to be created.

Step 906 provides the exit from the loop over bands to be created. In step 906, the value of BI is compared to N. If the value of BI is less than that of N, operation proceeds to the body 908 of the loop. Otherwise, operation proceeds to the end 922 of the routine.

In step 908, the base x-value X0[BI] for horizontal band BI is calculated. This calculation is performed in such a way as to space the bands evenly from the top to the bottom of the image, while keeping each band within the image boundaries. First the temporary value Z is calculated according to the formula Z=((BI+0.5)*W)/N−4, the division operation being rounded to the nearest integer. The value 4, representing the offset from the center of the band (with total width 8) to the left edge, is subtracted. Then Z is modified so as not to exceed W-8, so that the band will not extend beyond the right edge of the image. Finally X0[BI] is calculated as the larger of Z or 0, so that the band will not extend beyond the left edge of the image. Control then passes to step 916.

In step 916, the histogram for the current bands is populated by the command IVH(IMG,H, X0[BI],0,HIST[BI]). Control then passes to step 918.

In step 918 a preliminary confidence value CONF[BI] for horizontal band BI is calculated according to the formula MIN(100,P8A+P8B*BI/N,P8A+P8B*(N−1-BI)/N), the result of the division operation being rounded to the nearest integer, the effect of this calculation being to set the confidence value to the maximum 100 for bands near the center of the image, but to decrease the confidence value for bands nearer the left or right of the image. Control is then transferred to step 914.

In step 914 the value of BI is incremented in preparation for the next trip through the loop over each of the bands to be created. Control is then transferred to step 906.

Figure 10:
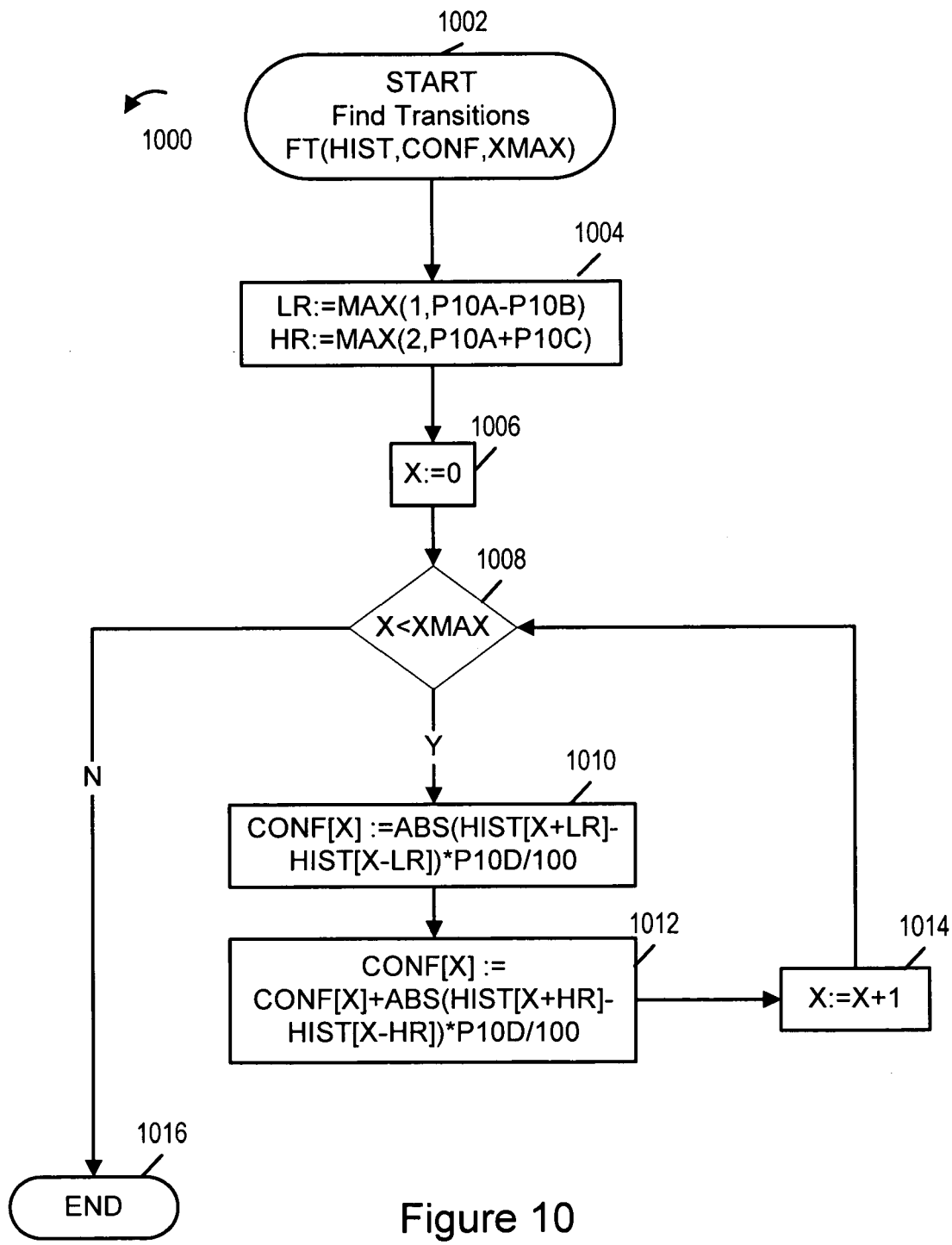
FIG. 10 depicts an exemplary method of finding transition points in a vertical or horizontal histogram in accordance with the present invention.

FIG. 10 shows an exemplary Find Transitions (FT) routine implemented in accordance with the invention. This routine makes a preliminary location of transition values in preparation for locating perimeter points of a band, calculating a table CONF of confidence values, indexed by a value X. Input Arguments to the procedure are a table HIST of histogram values, a table CONF of confidence values to be calculated, and the total number XMAX of entries in each HIST and CONF.

The routine 1000 starts in step 1002. From start step 1002, where the routine begins execution, operation proceeds to step 1004, wherein the temporary values of LR (lower radius) and HR (higher radius) are calculated. LR is calculated according to the formula MAX(1,P10A-P10B) and HR according to the formula MAX(2,P10A+P10C). The nonnegative parameter values P10A, P10B, and P10C may be adjusted to fine-tune the performance of the algorithm; exemplary values are 1 for P10A, 1 for P10B, and 4 for P10C. As a result of this calculation, the value of LR will be not greater than that of HR and in no case will the value of LR be less than 1 nor that of HR be less than 2. Control is then transferred to step 1006.

In step 1006, the value of X is initialized to zero in preparation for a loop over each of the values of X. Control is then transferred to step 1008.

Step 1008 provides the exit from a loop over the possible values of X. The value of X is compared to that of XMAX. If X is less than XMAX, control is transferred to step 1010; otherwise control is transferred to the end 1016 of the procedure.

In step 1010, the value of CONF[X] is calculated as the absolute value of the difference between HIST[X-LR] and HIST[X+LR], multiplied by the scaling parameter P10D and divided to 100, rounded to the nearest integer. The parameter P10D may be adjusted to fine-tune the performance of the algorithm; an exemplary value is 50. In this step, for values of X less than LR, the index X-LR is out of range for the array HIST, and the value 0 is used in place of HIST[X-LR]. Similarly, for values of X greater than XMAX-LR-1, the index X+LR is out of range for the array HIST, and the value 0 is used in place of HIST[X+LR]. Control is then transferred to step 1012.

In step 1012, the value of CONF[X] is modified by the addition of the absolute value of the difference between HIST [X-HR] and HIST[X+HR], multiplied by the scaling parameter P10D and divided to 100, rounded to the nearest integer. Robustness of performance is enhanced by repetition of a similar operation with different parameter values in steps 1010 and 1012. In this step, for values of X less than HR, the index X-HR is out of range for the array HIST, and the value 0 is used in place of HIST[X-HR]. Similarly, for values of X greater than XMAX-HR-1, the index X+HR is out of range for the array HIST, and the value 0 is used in place of HIST [X+HR]. Control is then transferred to step 1014.

In step 1014, the value of X is incremented in preparation for the next trip through the loop. Control is then transferred to step 1008.

Figure 11:
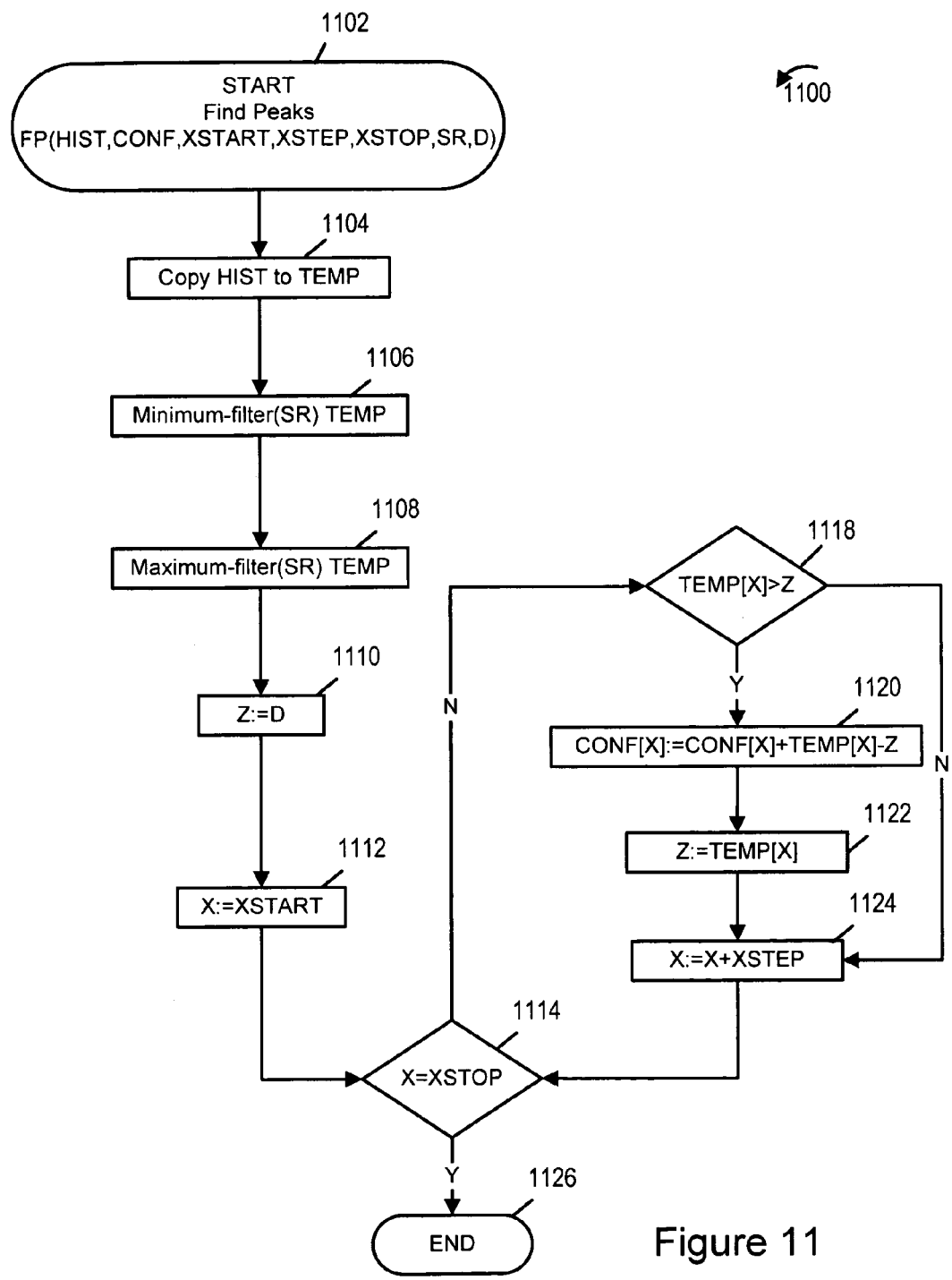
FIG. 11 depicts an exemplary method of enhancing confidence values associated with peak transition values in accordance with the present invention.

FIG. 11 shows an exemplary Find Peaks (FT) routine implemented in accordance with the invention. This routine enhances the confidence value (stored in CONF) associated with positions corresponding to histogram values exceeding each of the other histogram values between the given position and the edge. Input Arguments to the procedure are a table HIST of histogram values, a table CONF of confidence values to be modified, starting and stopping index values XSTART and XSTOP, an index increment value XSTEP, a speck radius value SR, and a minimum acceptable deviation value D. XSTEP will take value either 1 or −1; specifying this as an input parameter rather than a fixed value allows processing to proceed from either end of the array.

The routine 1100 starts in step 1102. From start step 1102, where the routine begins execution, operation proceeds to step 1104, wherein the contents of the array HIST are copied to the temporary TEMP. Control is then transferred to step 1106.

In step 1106, the contents of TEMP are modified by a minimum-filter operation, in which the value at each location X is replaced by the minimum of the values at locations from X−SR to X+SR, inclusive. The purpose of this step and the one following are to diminish the effect of small specks, either light or dark, on the image. Control is then transferred to step 1108.

In step 1108, the contents of TEMP are modified by a maximum-filter operation, in which the value at each location X is replaced by the maximum of the values at locations from X−SR to X+SR, inclusive. Control is then transferred to step 1110.

In step 1110, the temporary value Z, representing essentially the largest histogram value yet encountered, is initialized to the minimum acceptable deviation value D. Control is then transferred to step 1112.

In step 1112, the index value X is initialized to its starting value XSTART, in preparation for looping over each of the index values. Control is then transferred to step 1114.

Step 1114 provides the exit from a loop over the index values. The value of X is compared to XSTOP. If they are equal, control is transferred to the end 1126 of the procedure. Otherwise, control is transferred to step 1118.

In step 1118, the value of TEMP[X] is compared to Z. If TEMP[X] fails to exceed Z, control is transferred to step 1124 in preparation for the next trip through the loop. Otherwise, control is transferred to step 1120.

In step 1120, the value of CONF [X] is enhanced by the addition of the quantity TEMP[X]−Z. Control is then transferred to step 1122.

In step 1122, the value of Z is updated to the value of TEMP[X], Control is then transferred to step 1124.

In step 1124, the value of X is incremented by XSTEP in preparation for the next trip through the loop Control is then transferred to step 1114.

Figure 12:
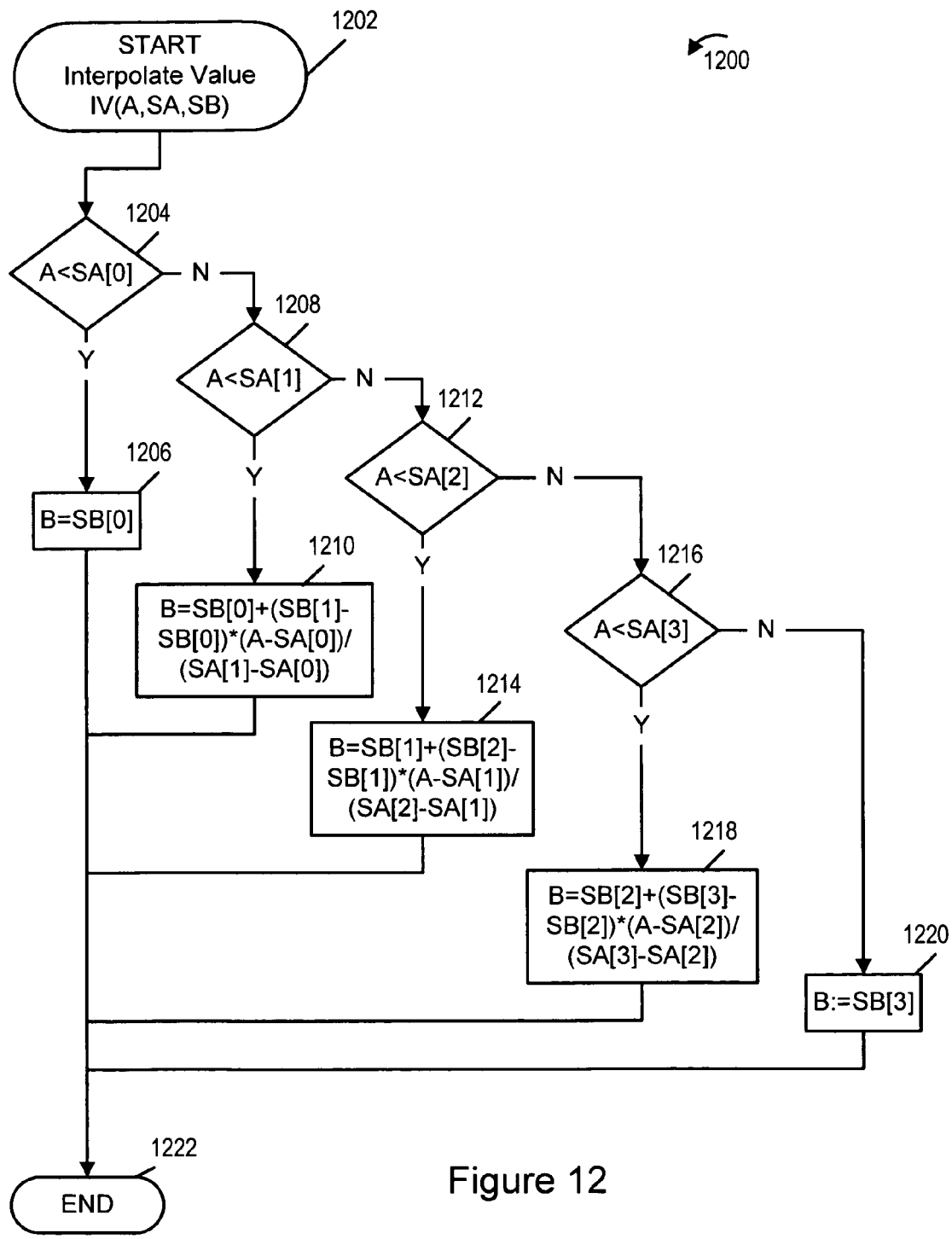
FIG. 12 depicts an exemplary method of determining parameter values by interpolating values from a given list in accordance with the present invention.

FIG. 12 shows an exemplary Interpolate Value (IV) routine implemented in accordance with the invention. This routine is a general-purpose utility routine which calculates function values based on linear interpolation among four function sample input values SA[0] . . . SA[3] and four corresponding function sample output values SB[0] . . . SB[3]. Input Arguments to the procedure are the arrays SA and SB and a new input value A to the function. The single output value is the output value B from the function.

The routine 1200 starts in step 1202. From start step 1202, where the routine begins execution, operation proceeds to step 1204, wherein the value of the input argument A is compared to the first (minimum) sample input value SA[0]. If A is less than SA[0], control is transferred to step 1206. Otherwise control is transferred to step 1208.

In step 1206, it is known that the value of the input argument A is less than the first (minimum) sample input value SA[0]. The output value B is therefore defined to equal the first sample output value SB[0]. Control is then transferred to the end 1222 of the procedure.

In step 1208, the value of the input argument A is compared to the second sample input value SA[1]. If A is less than SA[1], control is transferred to step 1210. Otherwise control is transferred to step 1212.

In step 1210, it is known that the value of the input argument A lies between the first sample input value SA[0] and the second sample input value SA[1]. The output value B is calculated by linear interpolation of the sample output values SB[0] and SB[1] between the sample input values SA[0] and SA[1] according to the formula B=SB[0]+(SB[1]−SB[0])*(A−SA[0])/(SA[1]−SA[0]), where the result of the division is rounded off to the nearest integer. Control is then transferred to the end 1222 of the procedure.

In step 1212, the value of the input argument A is compared to the third sample input value SA[2]. If A is less than SA[2], control is transferred to step 1214. Otherwise control is transferred to step 1216.

In step 1214, it is known that the value of the input argument A lies between the second sample input value SA[1] and the third sample input value SA[2]. The output value B is calculated by linear interpolation of the sample output values SB[1] and SB[2] between the sample input values SA[1] and SA[2] according to the formula B=SB[1]+(SB[2]−SB[1])*(A−SA[1])/(SA[2]−SA[1]), where the result of the division is rounded off to the nearest integer. Control is then transferred to the end 1222 of the procedure.

In step 1216, the value of the input argument A is compared to the fourth (maximum) sample input value SA[3]. If A is less than SA[3], control is transferred to step 1218. Otherwise control is transferred to step 1220.

In step 1218, it is known that the value of the input argument A lies between the third sample input value SA[2] and the fourth sample input value SA[3]. The output value B is calculated by linear interpolation of the sample output values SB[2] and SB[3] between the sample input values SA[2] and SA[3] according to the formula B=SB[2]+(SB[3]−SB[2])*(A−SA[2])/(SA[3]−SA[2]), where the result of the division is rounded off to the nearest integer. Control is then transferred to the end 1222 of the procedure.

In step 1220, it is known that the value of the input argument A equals or exceeds the fourth (maximum) sample input value SA[3]. The output value B is set equal to the fourth sample output value SB[3]. Control is then transferred to the end 1222 of the procedure.

Figure 13:
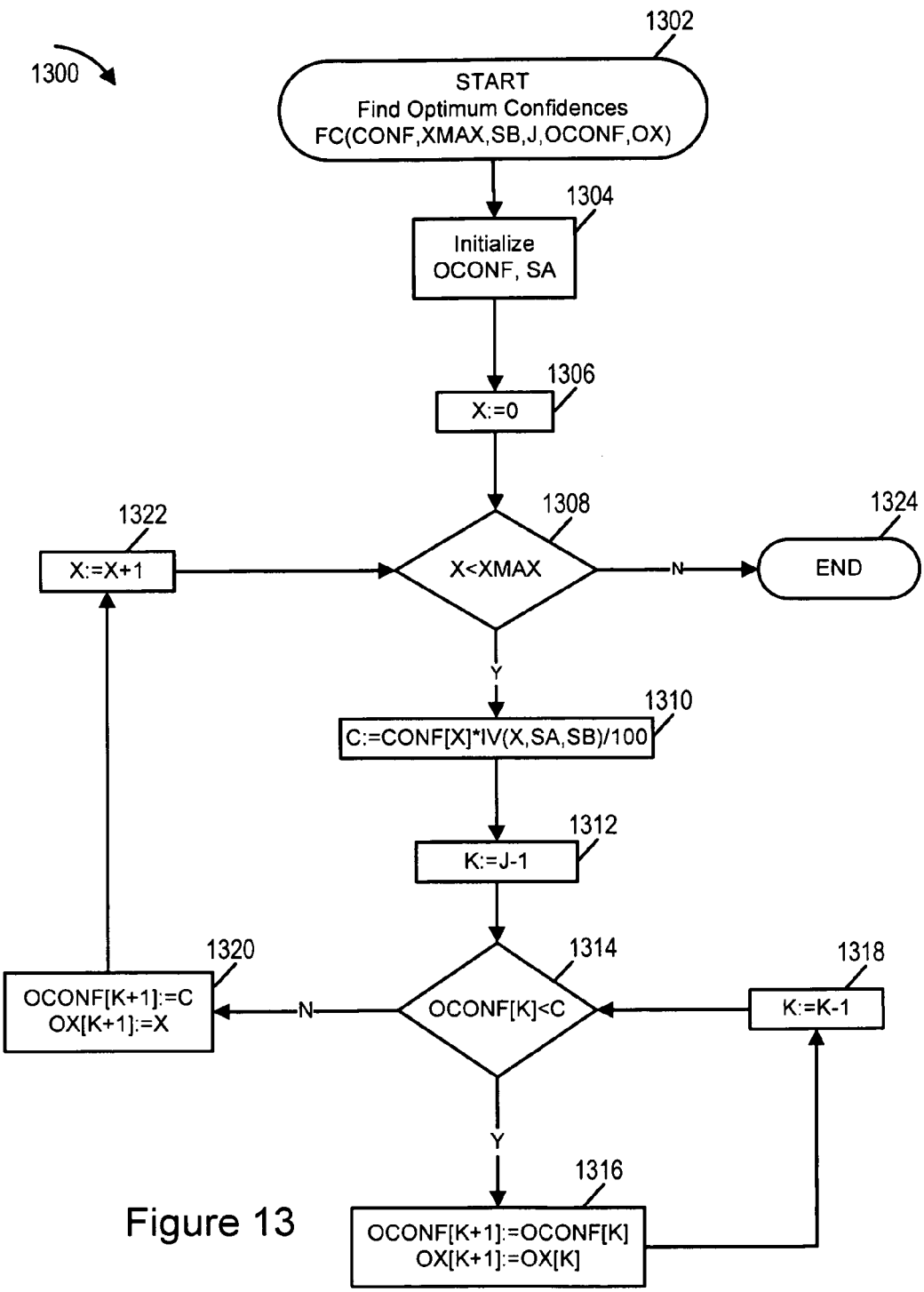
FIG. 13 depicts an exemplary method of identifying the several highest confidence values in a table in accordance with the present invention.

FIG. 13 shows an exemplary Find Optimum Confidences (FC) routine implemented in accordance with the invention. This purpose of this routine is to identify the highest several confidence values associated with a band, representing the positions within the band most likely to represent an edge of the band. The number of such optimum confidence values to be identified is given by the parameter J; the results of this identification are a set of confidence values stored in entries 0 . . . . (J−1) of the array OCONF, sorted from highest to lowest, and corresponding coordinate positions stored in entries 0 . . .(J−1) of the array OX. The confidence values are modified by a factor which enhances the confidence associated with a position close to one end of the band and diminishes the confidence associated with a position close to the other end of the band. This factor is controlled by the input parameter SB, which is an array of four confidence-adjustment factors, each a value between 0 and 100 and associated with a given position within the array, and to be used for interpolation, Arguments to the procedure are the array CONF of confidence values, XMAX indicating the number of elements in CONF, the array SB of four confidence-adjustment factors, the number J of optimum confidence values to be identified, the array OCONF, in which to store the optimum confidence values, and the array OX in which to store the associated coordinate positions.

In addition to entries 0 .... (J−1), the array OCONF also includes an entry indexed by the value −1 and another indexed by the value J. These do not represent a optimum confidence value but are used for more efficient functioning of the algorithm. Similarly, the array OX includes an extra entry indexed by the value J.

The routine 1300 starts in step 1302. From start step 1302, where the routine begins execution, operation proceeds to step 1304, wherein the arrays OCONF and an array SA of four interpolation points are initialized. The entry OCONF[−1] is initialized to a control value which is greater than any possible genuine confidence value. Other entries of OCONF are initialized to the value −1, which is less than any possible genuine confidence value. The four entries of SA are initialized as fractions of the width XMAX of the band. SA[Z] is initialized to the value $(Z*(XMAX-1)/3$ for $Z=0,1,2,3$, the result of the division being rounded off to the nearest integer. Control is then transferred to step 1306.

In step 1306, the coordinate position X is initialized to 0 in preparation for looping over each of the coordinate position values. Control is then transferred to step 1308.

Step 1308 provides the exit from the loop over the coordinate position values. The value of X is compared to XMAX. If X is less than XMAX, control is transferred to step 1310. Otherwise control is transferred to the end 1324 of the procedure.

In step 1310, a confidence adjustment factor is calculated as IV(X,SA,SB), by interpolating among the four input values SB[Z] according to the position of X within the band, and a temporary modified confidence value C is calculated as CONF[X]*IV(X,SA,SB)/100, the result of the division being rounded to the nearest integer. Control is then transferred to step 1312.

In step 1312, the value of the optimum confidence index K is initialized to the value J−1 in preparation for a loop over each of the optimum confidence values identified so far, from least to greatest (decreasing K). Control is then transferred to step 1314.

In step 1314, the value of OCONF[K], the Kth optimum confidence value identified so far, is compared to the temporary modified confidence value C. In this step the value of K may range anywhere from −1 to (J−1), inclusive. If OCONF [K] is less than C, control is transferred to step 1316. Otherwise, control is transferred to step 1320. Two special circumstances deserve special notice in this step. If K has the value J−1 and the comparison fails, then the value C will not be added to the list of optimum confidence values. If K has the value −1, then the comparison is guaranteed to fail, because of how OCONF[−1] was initialized in step 1304. Thus in no case will the loop fail to terminate.

In step 1316, the values of OCONF[K] and OX[K] are moved to the next higher positions in their respective arrays, in preparation for inserting the new confidence value into the list of optimum confidence values at some as-yet undetermined position not exceeding K. Control is then transferred to step 1318.

In step 1318, the value of K is decremented in preparation for the next trip through the loop over each of the optimum confidence values identified so far. Control is then transferred to step 1314.

In step 1320, the current modified confidence value C and the corresponding coordinate value X are inserted into the list of optimum confidence values at position K+1. Two special circumstances deserve special notice in this step. If K has the value J−1, then the insertion occurs at location J, which is not considered to represent one of the optimum confidence values; this is what happens when the current modified confidence value C fails to exceed any of the optimum confidence values identified so far. If K has the value −1, then the current modified confidence value C exceeded each of the genuine optimum confidence values (stored at positions 0 ... (J−1), and is thus stored at the head position 0 of the list. In no case is the control value OCONF[−1] modified. Control is then transferred to step 1322.

In step 1322, the value of X is incremented in preparation for the next trip through the loop over each of the coordinate positions. Control is then transferred to step 1308.

Figure 14:
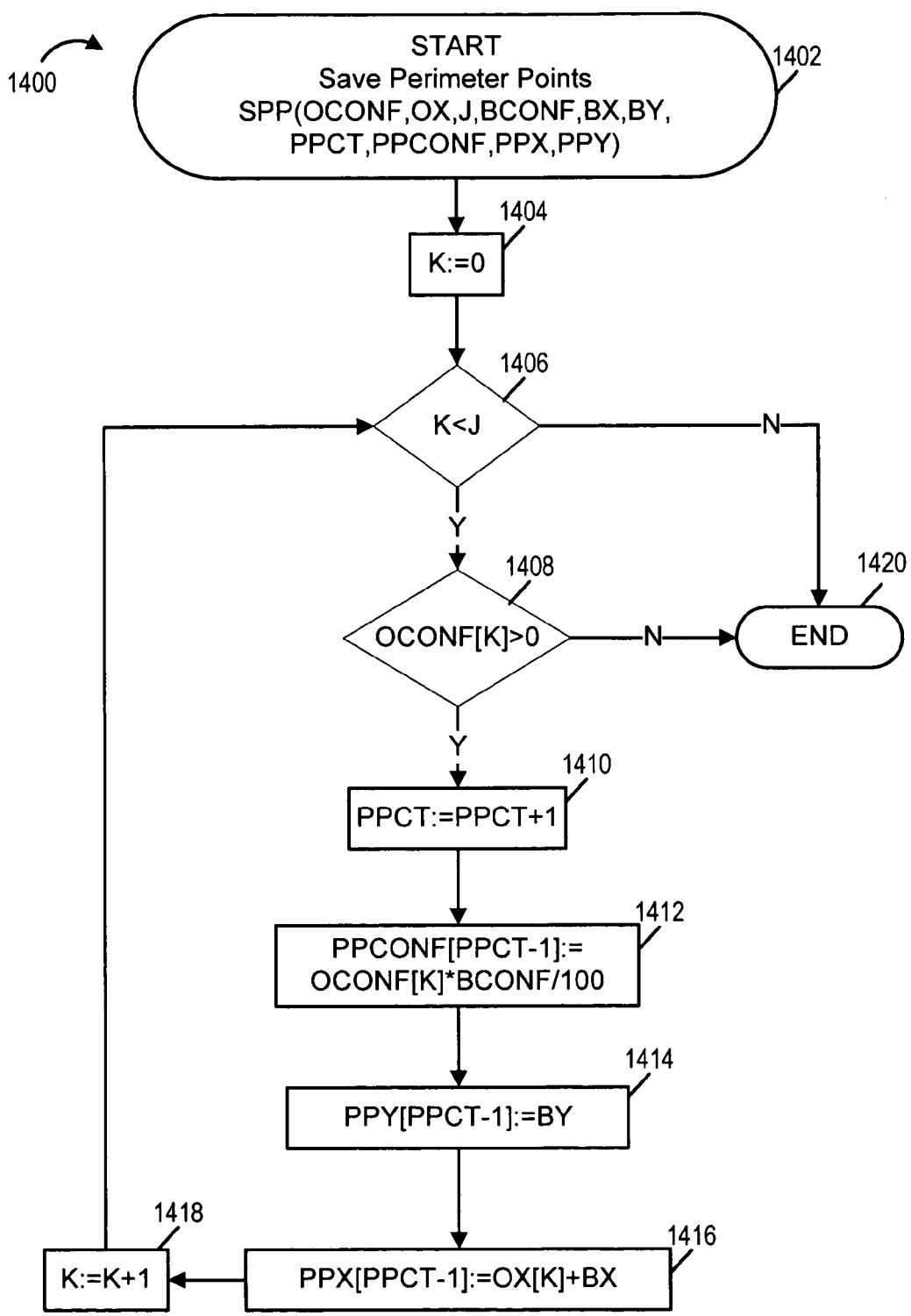
FIG. 14 depicts an exemplary method of saving previously-located perimeter points to a list in accordance with the present invention.

FIG. 14 shows an exemplary Save Perimeter Points (SPP) routine implemented in accordance with the invention. This purpose of this routine is to save as "perimeter points" relevant information on locations of optimum confidence identified by the FC procedure. It is assumed that several such points may have already been saved; this procedure augments the pre-existing list of information rather than replacing it. The input/output parameter PPCT indicates the number of perimeter points found; the value of this parameter may be modified by this procedure. The array PPCONF stores confidence values for each perimeter point. The arrays PPX and PPY store a pair of coordinate values for each perimeter point. It is presumed that the arrays PPCONF, PPX, and PPY have space sufficient to store each of the perimeter points found. In addition to PPCT, PPCONF, PPX, and PPY, input Arguments to the procedure are the array OCONF of optimum confidence values calculated previously by the procedure TCF and the corresponding array OX of corresponding x-values, the number J of perimeter points to be saved, and a band confidence value BCONF and band coordinate values BX and BY calculated previously by the procedure IHB or IVB. While this procedure is described in terms appropriate for a horizontal band, a vertical band can be processed with no changes to the procedure by interchanging the arguments PPX, PPY and BX,BY.

The routine 1400 starts in step 1402. From start step 1402, where the routine begins execution, operation proceeds to step 1404, wherein the optimum confidence value index K is initialized to the value 0 in preparation for a loop over optimum confidence values. Control is then transferred to step 1406.

Step 1406 provides the exit from the loop over optimum confidence values. The value of K is compared to J. If K is less than J, control is transferred to step 1408. Otherwise control is transferred to the end 1420 of the procedure.

In step 1408, the value of OCONF[K] is compared to 0. Only optimum confidence values exceeding zero are saved as perimeter points. Since the procedure FTC generates the entries of OCONF in decreasing order, a non-positive value of OCONF[K] indicates there are no more positive optimum confidence values for this band. Therefore if the value of OCONF[K] does not exceed 0, control is transferred to the end 1420 of the procedure. Otherwise control is transferred to step 1410.

In step 1410, the value of PPCT is incremented to indicate the addition of another perimeter point to the list. Control is then transferred to step 1412.

In step 1412, the confidence value PPCONF[PPCT−1] for the new perimeter point is calculated as the product of the optimum confidence value OCONF[K] and the confidence value BCONF for the given band, renormalized by division by 100, the result of this division being rounded to the nearest integer. Control is then transferred to step 1414.

In step 1414, the y-value PPY[PPCT−1] for the new perimeter point is saved as the y-value BY for the given band. Control is then transferred to step 1416.

In step 1416, the x-value PPX[PPCT−1] for the new perimeter point is saved as the sum of the x-value OX[K] corresponding to the current optimum confidence value and the x-vale BX for the given band. Control is then transferred to step 1418.

In step 1418, the value of K is incremented in preparation for the next trip through the loop over each of the optimum confidence values. Control is then transferred to step 1406.

Figure 15:
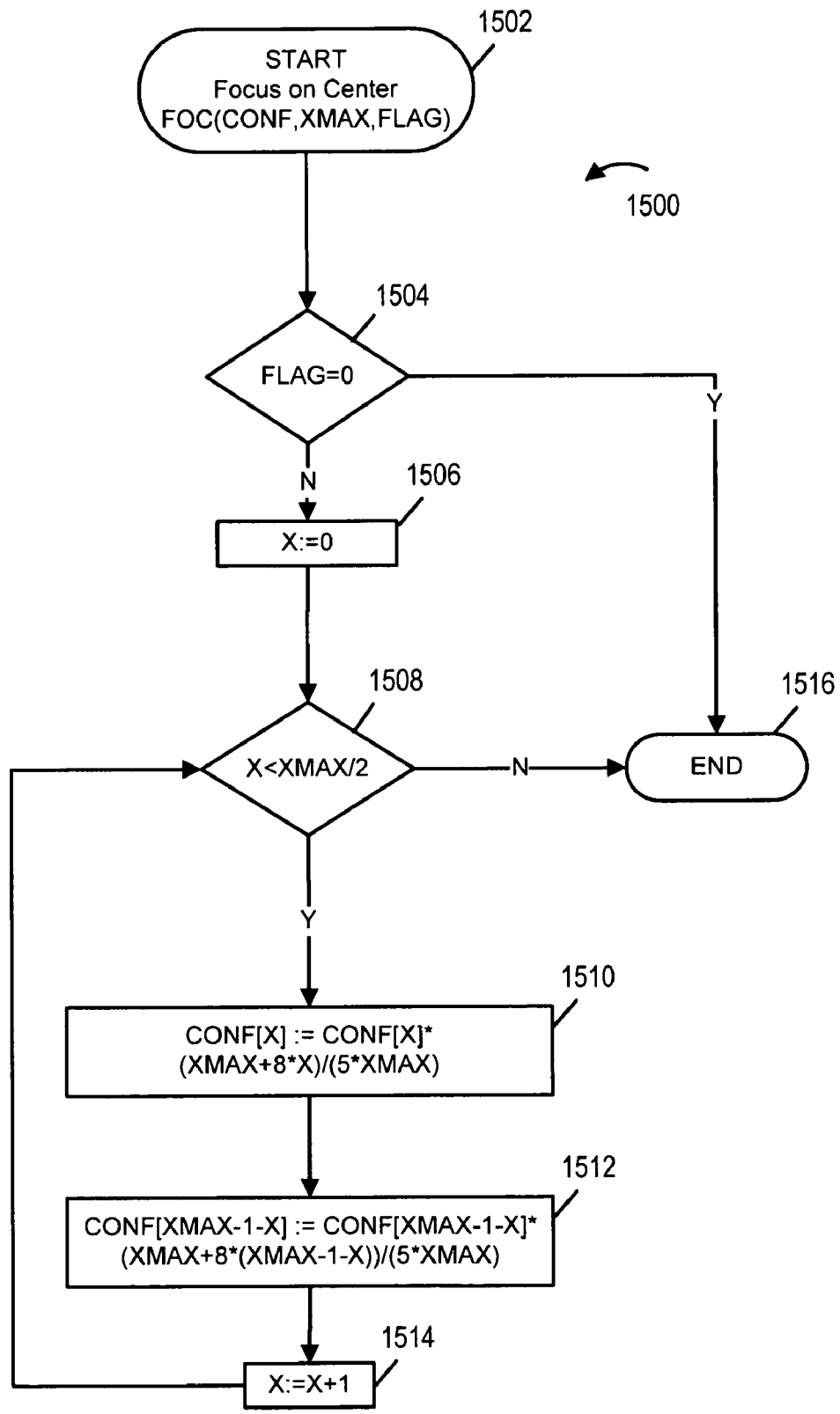
FIG. 15 depicts an exemplary method of diminishing confidence values associated with locations near the end of a band in accordance with the present invention.

FIG. 15 shows an exemplary Focus On Center (FOC) routine implemented in accordance with the invention. This purpose of this routine is to diminish the confidence associated with coordinate positions near either end of a band, in such a way that the confidence levels are reduced to one-fifth of their previous value near each end of a band and increase gradually to their full original value at the center of the band. Input Arguments to the procedure are the array CONF of confidence values, the number XMAX of entries in CONF, and an integer value FLAG indicating whether the operation is to be performed (in FLAG is nonzero) or not (if FLAG is zero).

The routine 1500 starts in step 1502. From start step 1502, where the routine begins execution, operation proceeds to step 1504, wherein the value of FLAG is compared to zero. If the value of FLAG equals zero, control is transferred directly to the end 1516 of the procedure. Otherwise, control is transferred to step 1506.

In step 1506, the value of the coordinate position X is initialized to 0 in preparation for a loop over the first half of coordinate positions. Control is then transferred to step 1508.

Step 1508 provides the exit from the loop over coordinate values. The value of X is compared to XMAX/2. If X is less than XMAX/2, control is transferred to step 1510.

Otherwise control is transferred to the end 1516 of the procedure.

In step 1510, the value of CONF[X] (in the first half of the array) is modified to the new value CONF[X]*(XMAX+8*X)/(5*XMAX), the result of the division being rounded to the nearest integer. Control is then transferred to step 1512.

In step 1512, the value of CONF[XMAX−1−X] (in the second half of the array) is modified to the new value CONF[XMAX−1−X]*(XMAX+8*(XMA−1−X))/(5*XMAX), the result of the division being rounded to the nearest integer. Control is then transferred to step 1514.

In step 1514, the value of X is incremented in preparation for the next trip through the loop over coordinate positions. Control is then transferred to step 1508.

Figure 16:
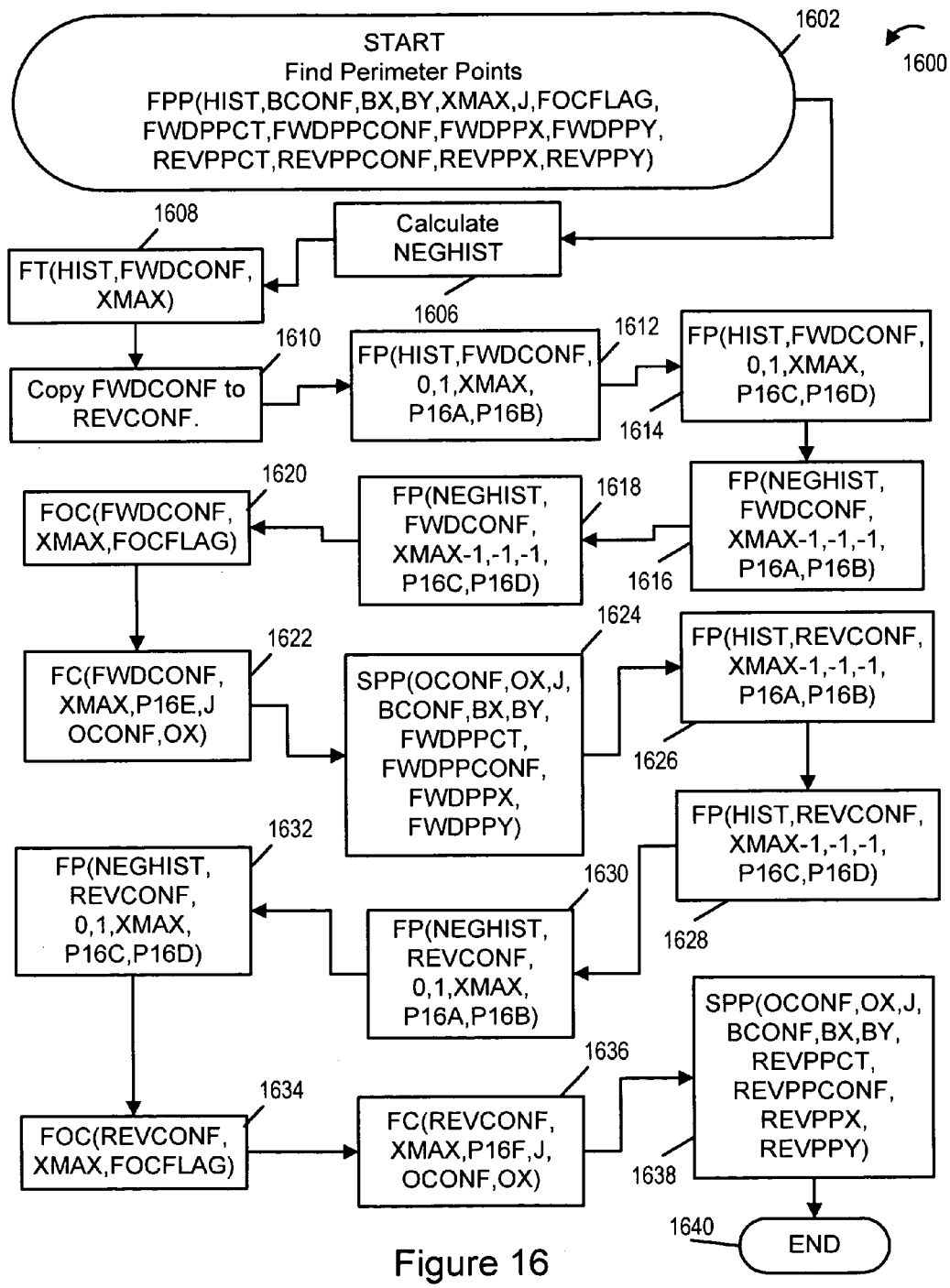
FIG. 16 depicts an exemplary method of locating a saving perimeter points associated with a band in accordance with the present invention.

FIG. 16 shows an exemplary Find Perimeter Points (FPP) routine implemented in accordance with the invention. This purpose of this routine is to locate candidate perimeter points associated with a single band and add information concerning such to several tables. It is assumed that several such points may have already been determined for other bands; this procedure augments the pre-existing list of information rather than replacing it. Perimeter points are sought both moving forward from the start of the band (starting at the left for a horizontal band, or at the top for a vertical band) and moving backward from the end of the band (ending at the right for a horizontal band, or at the bottom for a vertical band), and the perimeter points found in each search are added to two separate lists. FWDPPCT and REVPPCT indicate the total number of perimeter points found in the forward and reverse direction, respectively; the values of these parameters are modified by this procedure if perimeter points are found. FWDPPCONF and REVPPCONF are arrays indicating a confidence level associated with each perimeter point found in the forward or reverse direction, respectively. FWDPPX, FWDPPY, REVPPX, and REVPPY are arrays holding x- and y-values for perimeter points found in the forward or reverse directions, respectively. In addition to FWDPPCT, REVPPCT, FWDPPCONF, REVPPCONF, FWDPPX, FWDPPY, REVPPX, and REVPPY, Arguments to the procedure are: an array HIST of histogram information for the band, a confidence value BCONF associated with the band, an x-value BX and y-value BY associated with the band, the number XMAX of entries in the array HIST, the number J of perimeter points to be indentified in each direction, and an integer value FOCFLAG indicating whether perimeter point confidence values should be diminished toward the ends of the band.

The routine 1600 starts in step 1602. From start step 1602, where the routine begins execution, operation proceeds to step 1606, wherein a temporary array NEGHIST of complementary histogram values is calculated by subtracting each corresponding entry of HIST from 255; as noted in the discussion of the IHB and IVB routines, no entry of HIST can exceed 255. Control is then transferred to step 1608.

In step 1608, a preliminary calculation of confidence values in the forward direction (stored in a temporary array FWDCONF) is made by the operation FT(HIST,FWDCONF, XMAX); thus the first criterion of confidence for a perimeter point is the size of the transition in histogram values at the given point. Control is then step 1610.

In step 1610, the preliminary confidence values calculated in step 1608 are copied from the array FWDCONF to a temporary array REVCONF indicating confidence values in the reverse direction, as the size of a histogram value transition is independent of the direction of search. Control is then transferred to step 1612.

In step 1612, the first of four searches for peak values in the forward direction is performed by the operation FP(HIST, FWDCONF,0, 1,XMAX,P16A,P16B) and the confidence values in FWDCONF are adjusted accordingly. Robustness of performance is enhanced by performing the search several times with variations. This first search uses a smaller speck radius value indicated by the parameter P16A and a larger minimum allowable deviation value indicated by the parameter P16B. The values of P16A and P16B may be adjusted to fine-tune the performance of the algorithm; exemplary values for P16A and P16B are 0 and 68, respectively. Control is then transferred to step 1614.

In step 1614, the second of four searches for peak values in the forward direction is performed by the operation FP(HIST, FWDCONF,0,1,XMAX,P16C,P16D) and the confidence values in FWDCONF are adjusted accordingly. This second search uses a larger speck radius value indicated by the parameter P16C and a smaller minimum allowable deviation value indicated by the parameter P16D. The values of P16C and P16D may be adjusted to fine-tune the performance of the algorithm; exemplary values for P16C and P16D are 2 and 38, respectively. Control is then transferred to step 1616.

In step 1616, the third of four searches for peak values in the forward direction is performed by the operation FP(NEGHIST,FWDCONF,XMAX−1,−1,−1,P16A,P16B) and the confidence values in FWDCONF are adjusted accordingly. This third search uses the smaller speck radius value P16A and the larger minimum allowable deviation value P16B. This search is performed using the complementary histogram array NEGHIST in the reverse direction, which is roughly equivalent to searching in the forward direction using the positive histogram array HIST. Control is then transferred to step 1618.

In step 1618, the fourth of four searches for peak values in the forward direction is performed by the operation FP(NEGHIST,FWDCONF,XMAX−1,−1,−1,P16C,P16D) and the confidence values in FWDCONF are adjusted accordingly. This fourth search uses the larger speck radius value P16C and the smaller minimum allowable deviation value P16D. As in step 1616, this search is performed using the complementary histogram array NEGHIST in the reverse direction. Control is then transferred to step 1620.

In step 1620 the confidences of peak values near the edges of the band are possibly diminished (as dictated by the parameter FOCFLAG) by the operation FOC(FWDCONF, XMAX, FOCFLAG). Control is then transferred to step 1622.

In step 1622 optimum confidence values in the array FWD-CONF are identified by the operation FC(FWDCONF, XMAX,P16E,J,OCONF,OX), storing the results in the temporary arrays OCONF and OX. The parameter P16E is an array of four confidence diminishment values indicating the greater propensity of perimeter points to be located near the front of the band. This parameter may be adjusted to fine-tune the performance of the algorithm; exemplary values are P16E[0]=110, P16E[1]=90, P16E[2]=25, and P16E[3]=0. Control is then transferred to step 1624.

In step 1624 the optimum confidence values identified by step 1622 are saved as perimeter points by the operation SPP(OCONF,OX,J,BCONF,BX,BY,FWDPPCT,FWDPP-CONF,FWDPPX, FWDPPY), modifying the value of FWD-PPCT and storing new values in the arrays FWDPPCONF, FWDPPX and FWDPPY. Control is then transferred to step 1626.

In step 1626, the first of four searches for peak values in the reverse direction is performed by the operation FP(HIST, REVCONF,XMAX−1,−1,−1,P16A,P16B) and the confidence values in REVCONF are adjusted accordingly. Control is then transferred to step 1628.

In step 1628, the second of four searches for peak values in the forward direction is performed by the operation FP(HIST, REVCONF,XMAX−1,−1,−1,P16C,P16D) and the confidence values in REVCONF are adjusted accordingly. This second search uses a larger speck radius value indicated by the parameter P16C and a smaller minimum allowable deviation value indicated by the parameter P16D. Control is then transferred to step 1630.

In step 1630, the third of four searches for peak values in the forward direction is performed by the operation FP(NEGHIST,REVCONF,0,1,XMAX,P16A,P16B) and the confidence values in REVCONF are adjusted accordingly. This third search uses the smaller speck radius value P16A and the larger minimum allowable deviation value P16B. This search is performed using the complementary histogram array NEGHIST in the forward direction, which is roughly equivalent to searching in the reverse direction using the positive histogram array HIST. Control is then transferred to step 1632.

In step 1632, the fourth of four searches for peak values in the forward direction is performed by the operation FP(NEGHIST,REVCONF,0,1,XMAX,P16C,P16D) and the confidence values in REVCONF are adjusted accordingly. This fourth search uses the larger speck radius value P16C and the smaller minimum allowable deviation value P16D. As in step 1630, this search is performed using the complementary histogram array NEGHIST in the reverse direction. Control is then transferred to step 1634.

In step 1634 the confidences of peak values near the edges of the band are possibly diminished (as dictated by the parameter FOCFLAG) by the operation FOC(REVCONF, XMAX, FOCFLAG). Control is then transferred to step 1636.

In step 1636 optimum confidence values in the array REV-CONF are identified by the operation FC(REVCONF, XMAX,P16F,J,OCONF,OX), storing the results in the temporary arrays OCONF and OX. The parameter P16F is an array of four confidence diminishment values indicating the greater propensity of perimeter points to be located near the front of the band; the values are identical to those found in the array P16E, but in reverse order. Control is then transferred to step 1638.

In step 1638 the optimum confidence values identified by step 1636 are saved as perimeter points by the operation SPP(OCONF,OX,J,BCONF,BX,BY,REVPPCT,REVPP-CONF,REVPPX, REVPPY), modifying the value of REVP-PCT and storing new values in the arrays REVPPCONF, REVPPX and REVPPY. Control is then transferred to the end 1640 of the procedure.

Figure 17:
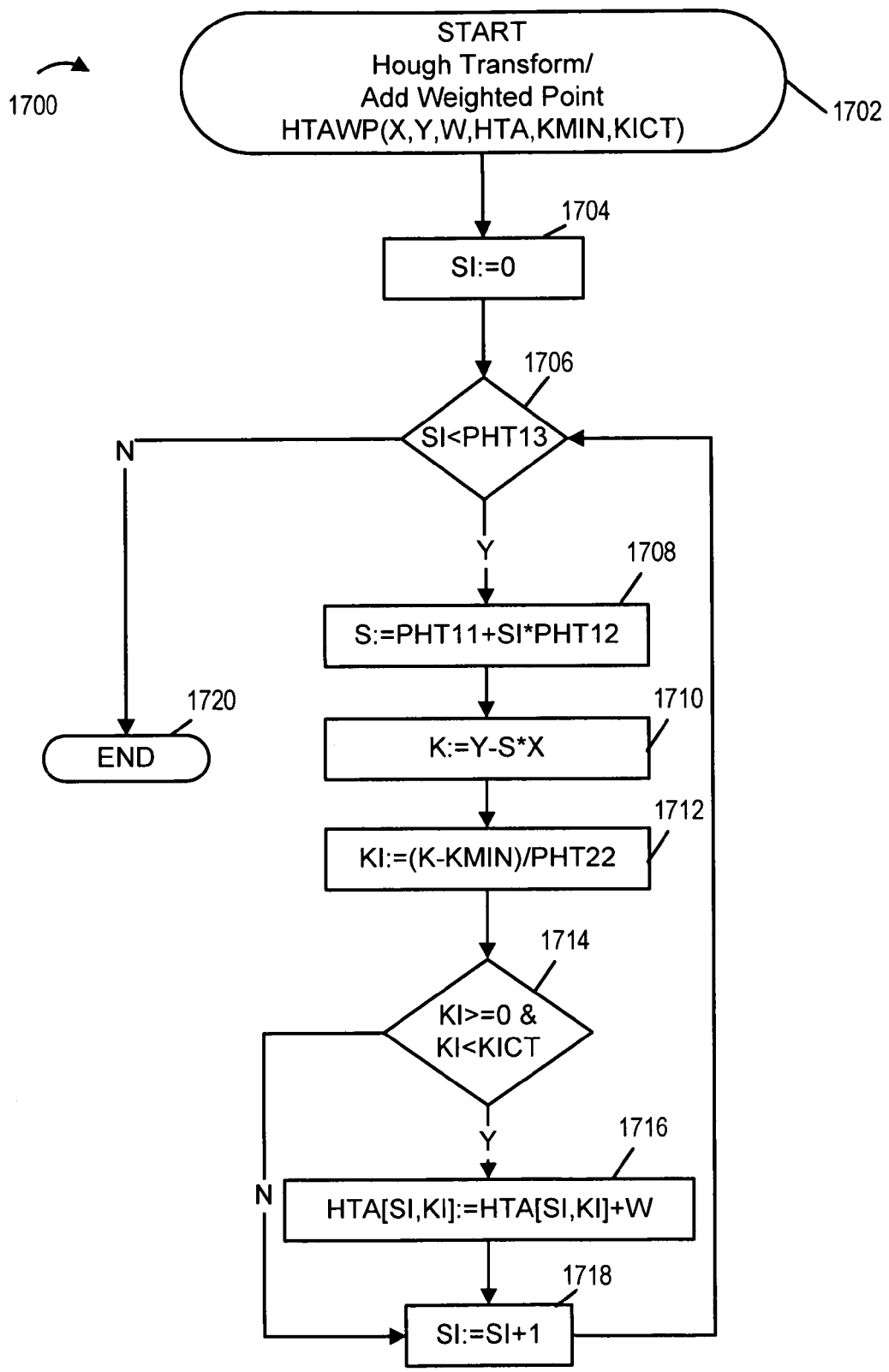
FIG. 17 depicts an exemplary method of adding a point with weighting based on confidence value to the Hough transform accumulator array in accordance with the present invention.

FIG. 17 shows an exemplary Hough Transform/Add Weighted Point (HTAWP) routine implemented in accordance with the invention. This purpose of this routine is to add a perimeter point, with weighting, to the accumulator used by the Hough Transform to find linear boundaries. Arguments to the procedure are the coordinates X and Y of the point to be added, the associated weighting factor W, the array HTA serving as the accumulator for the Hough transform, the minimum allowable intercept value KMIN, and the total number KICT of allowable intercept index values. Note that while this routine and other Hough transfom routines are described in terms appropriate for the location of roughly horizontal lines, roughly vertical lines may be located as well by the simple interchange of the arguments X and Y.

The routine 1700 starts in step 1702. From start step 1702, where the routine begins execution, operation proceeds to step 1704, wherein the value of the slope index SI is set to 0 in preparation for a loop over each of the slope index values. Control is then transferred to step 1706.

Step 1706 provides the exit from the loop over slope index values. The value of SI is compared to PHT13. If SI is less than PHT13, control is transferred to step 1708. Otherwise control is transferred to the end 1720 of the procedure. The parameter PHT13 indicates the total number of distinct slope values considered. The value of this parameter may be adjusted to fine-tune the performance of the algorithm; an exemplary value is 83.

In step 1708, a slope value S is calculated by the formula PHT11+SI*PHT12. The parameter PHT11 indicates the minimum possible slope value; the parameter PHT12 indicates the increment between successive slope values. The values of these parameters may be adjusted to fine-tune the performance of the algorithm; exemplary values are −0.36397 for PHT11 and 0.0087269 for PHT12. Control is then transferred to step 1710.

In step 1710, an intercept value K is calculated according the formula K:=Y−S*X. Control is then transferred to step 1712.

In step 1712, an intercept index value KI is calculated by (K−MIN)/PHT22, the result of the division being rounded to the nearest integer. PHT22 is a parameter representing the increment between successive intercept values, The value of PHT22 may be adjusted to fine-tune the performance of the algorithm; an exemplary value is 10. Control is then transferred to step 1714.

In step 1714, the intercept index value KI is compared to 0 and KICT to determine whether it lies within the allowable range. If the comparison succeeds, control is transferred to step 1716. Otherwise, control is then transferred to step 1718.

In step 1716, the Hough Transform accumulator array HTA is incremented by the amount W at the location indexed by SI and KI. Control is then transferred to step 1718.

In step 1718, the slope index SI is incremented in preparation for the next trip though the loop over slope values. Control is then transferred to step 1706.

Figure 18:
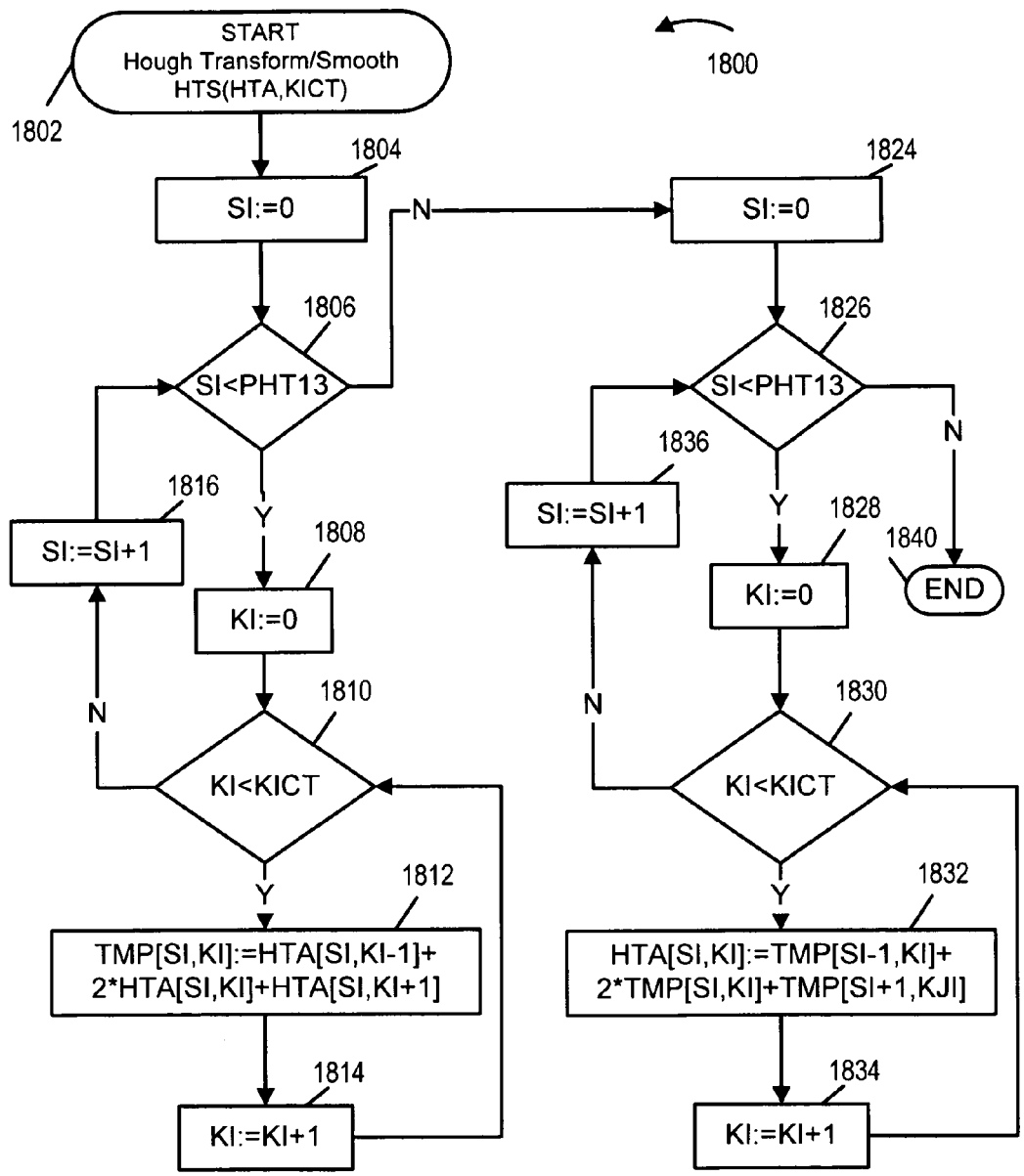
FIG. 18 depicts an exemplary method of smoothing the contents of a Hough transform accumulator array in accordance with the present invention.

FIG. 18 shows an exemplary Hough Transform/Smooth (HTS) routine implemented in accordance with the invention. This purpose of this routine is to smooth the values stored in the Hough transform accumulator. Arguments to the procedure are the array HTA serving as the Hough transform accumulator and the total number KICT of allowable intercept index values.

The routine 1800 starts in step 1802. From start step 1802, where the routine begins execution, operation proceeds to step 1804, wherein the value of the slope index SI is set to 0 in preparation for a loop over each of the slope index values. Control is then transferred to step 1806.

Step 1806 provides the exit from the loop over slope index values. The value of SI is compared to PHT13. If SI is less than PHT13, control is transferred to step 1808. Otherwise control is transferred to step 1824.

In step 1808, the intercept index KI is set to 0 in preparation for a loop over each of the intercept index values. Control is then transferred to step 1810.

Step 1810 provides the exit from the loop over intercept index values. The value of KI is compared to KICT. If KI is less than KICT, control is transferred to step 1812. Otherwise control is transferred to step 1816.

In step 1812 a smoothed Hough transform accumulator value (along the intercept axis) is calculated by the formula HTA[SI,K−1]+2*HTA[SI,KI]+HTA[SI,KI+1] and the result is stored in the [SI,KI] location of a temporary array TMP. Control is then transferred to step 1814.

In step 1814, the value of the intercept index KI is incremented in preparation for the next trip through the loop over increment index values. Control is then transferred to step 1810.

In step 1816, the value of the slope index SI is incremented in preparation for the next trip through the loop over slope index values. Control is then transferred to step 1806.

In step 1824, the value of the slope index SI is set to 0 in preparation for a loop over each of the slope index values. Control is then transferred to step 1826.

Step 1826 provides the exit from the loop over slope index values. The value of SI is compared to PHT13. If SI is less than PHT13, control is transferred to step 1828. Otherwise control is transferred to the end 1840 of the procedure.

In step 1828, the intercept index KI is set to 0 in preparation for a loop over each of the intercept index values. Control is then transferred to step 1830.

Step 1830 provides the exit from the loop over intercept index values. The value of KI is compared to KICT. If KI is less than KICT, control is transferred to step 1832. Otherwise control is transferred to step 1836.

In step 1832 a smoothed Hough transform accumulator value (along the slope axis) is calculated by the formula TMP[SI−1,KI]+2*TMP[SI,KI]+TMP[SI+1,KI] and the result is stored in the [SI,KI] location of the Hough transform accumulator HTA Control is then transferred to step 1834.

In step 1834, the value of the intercept index KI is incremented in preparation for the next trip through the loop over increment index values. Control is then transferred to step 1830.

In step 1836, the value of the slope index SI is incremented in preparation for the next trip through the loop over slope index values. Control is then transferred to step 1826.

In the foregoing, it may occur that indices KI−1, KI+1, SI−1, or SI+1 refer to addresses outside the bounds of the array HTA. In such cases, the value referenced is defined to be the nearest location within the array bounds.

Figure 19:
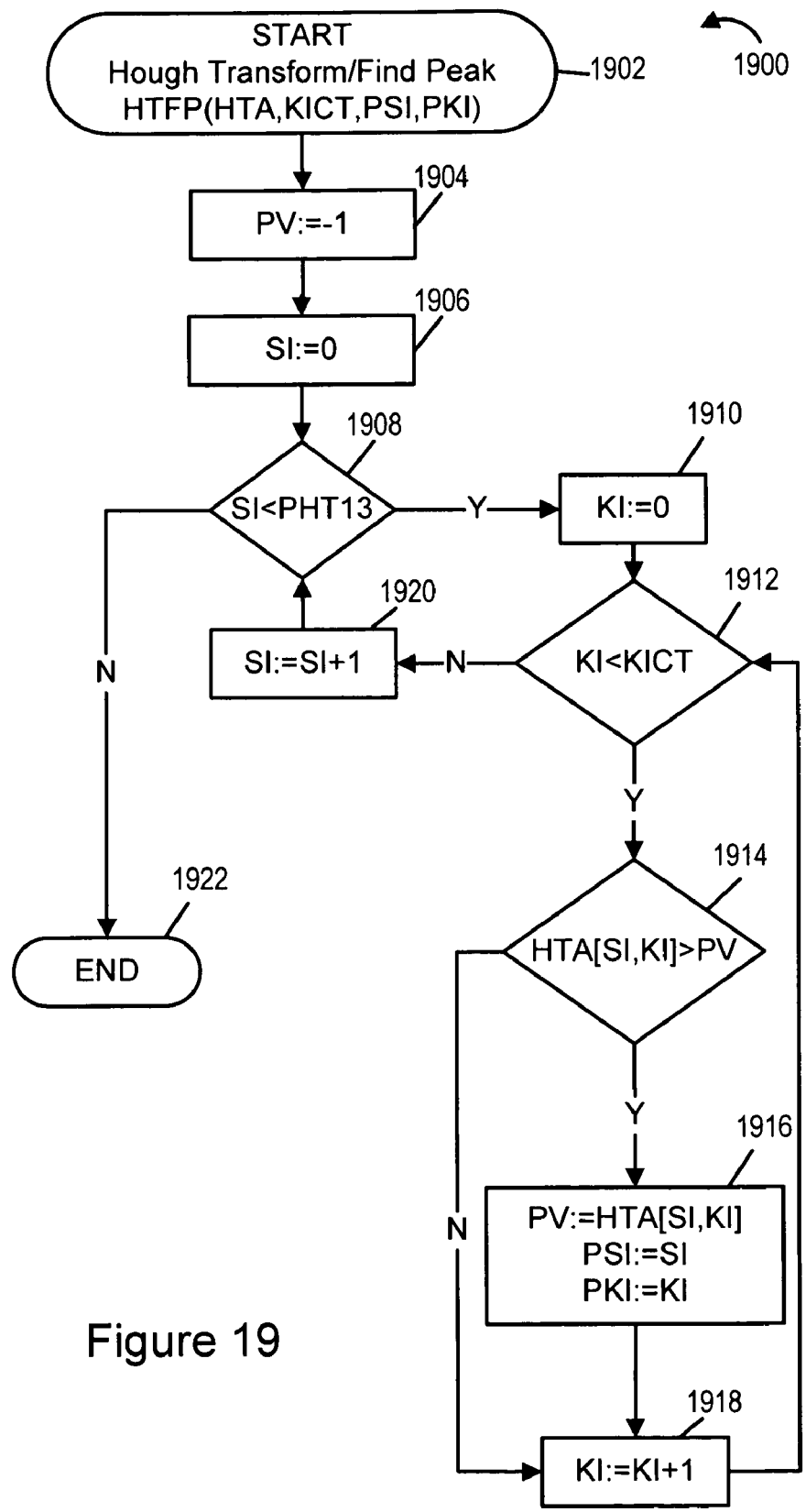
FIG. 19 depicts an exemplary method of locating the peak value in a Hough transform accumulator array in accordance with the present invention.

FIG. 19 shows an exemplary Hough Transform/Find Peak (HTFP) routine implemented in accordance with the invention. This purpose of this routine is to locate the largest entry in the Hough transform accumulator array HTA, which according to the theory of the Hough transform indicates the strongest straight line among the points added to the array. Input Arguments to the procedure are the array HTA serving as the Hough transform accumulator and the total number KICT of allowable intercept index values. Output values from the procedure are the peak slope index value PSI and the peak intercept index value PKI.

The routine 1900 starts in step 1902. From start step 1902, where the routine begins execution, operation proceeds to step 1904, wherein the temporary variable PV representing the peak value located so far is set to −1 (which, being less than any value stored in the array HTA, ensures that PV will be updated in value at least once during the execution of the procedure). Control is then transferred to step 1906.

In step 1906, the value of the slope index SI is set to 0 in preparation for a loop over each of the slope index values. Control is then transferred to step 1908.

Step 1908 provides the exit from the loop over slope index values. The value of SI is compared to PHT13. If SI is less than PHT13, control is transferred to step 1910.

Otherwise control is transferred to the end 1922 of the procedure. In step 1910, the intercept index KI is set to 0 in preparation for a loop over each of the intercept index values. Control is then transferred to step 1912.

Step 1912 provides the exit from the loop over intercept index values. The value of KI is compared to KICT. If KI is less than KICT, control is transferred to step 1914. Otherwise control is transferred to step 1920.

In step 1914, the value of the Hough transform accumulator HTA at the current location is compared to the peak value PV located so far. If HTA[SI,KI] exceeds PV, then this location shall become the new peak value and control is hence transferred to step 1916. Otherwise, this value is to be ignored, and control is transferred to step 1918.

In step 1916 the values of PV, PSI, and PKI are replaced by the new peak value and its location indices SI and KI. Control is then transferred to step 1918.

In step 1918, the value of the intercept index KI is incremented in preparation for the next trip through the loop over increment index values. Control is then transferred to step 1912.

In step 1920, the value of the slope index SI is incremented in preparation for the next trip through the loop over slope index values. Control is then transferred to step 1908.

Figure 20:
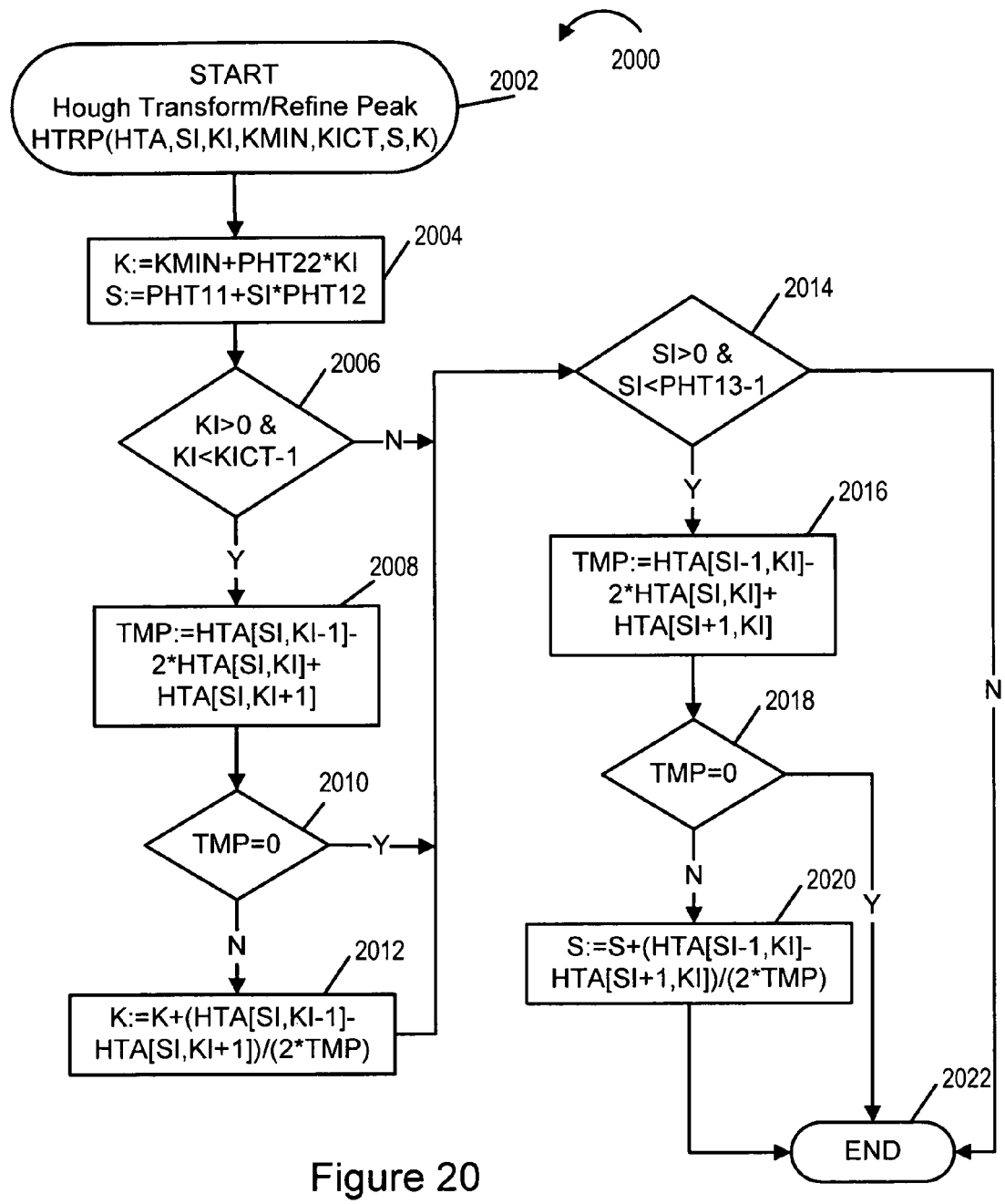
FIG. 20 depicts an exemplary method of refining by interpolation the peak location in a Hough transform accumulator array in accordance with the present invention.

FIG. 20 shows an exemplary Hough Transform/Refine Peak (HTRP) routine implemented in accordance with the invention. This purpose of this routine is to convert the peak discrete index values determined by HTRP to a continuous slope-increment pair describing a line, possibly interpolating between the quantized slope-intercept values indicated by the array HTA. Input Arguments to the procedure are the array HTA serving as the Hough transform accumulator, the peak slope index value SI and the peak intercept index value KI, the minimum allowable intercept value KMIN, and the number KICT of intercept index values. Output values from the procedure are the peak slope value S and the peak intercept value K.

The routine 2000 starts in step 2002. From start step 2002, where the routine begins execution, operation proceeds to step 2004, wherein an initial calculation of K and S is made using the dequantization formula KMIN+PHT22*KI and PHT11+PHT12*SI. Control is then transferred to step 2006.

In step 2006, two comparisons are made to determine whether the value of the intercept index KI is within range for a possible quadratic interpolation. If the test succeeds, control is transferred to step 2008. Otherwise, control is transferred to step 2014.

In step 2008, a temporary variable TMP is calculated as part of a quadratic interpolation operation on the quantity K according to the formula HTA[SI,KI−1]−2*HTA[SI,KI]+HTA[SI,KI+1]. Control is then transferred to step 2010.

In step 2010, the temporary variable TMP is compared to zero, a nonzero value being required to complete the quadratic interpolation operation. If TMP does not equal zero, control is transferred to step 2012. Otherwise, control is transferred to step 2014.

In step 2012, the quadratic interpolation operation on K is completed by adding the quantity (HTA[SI,KI−1]−HTA[SI,KI+1])/(2*TMP). Control is then transferred to step 2014.

In step 2014, two comparisons are made to determine whether the value of the slope index SI is within range for a possible quadratic interpolation. If the test succeeds, control is transferred to step 2016. Otherwise, control is transferred to the end 2022 of the procedure.

In step 2016, a temporary variable TMP is calculated as part of a quadratic interpolation operation on the quantity S according to the formula HTA[SI−1,KI]−2*HTA[SI,KI]+HTA[SI+1,KI]. Control is then transferred to step 2018.

In step 2018, the temporary variable TMP is compared to zero, a nonzero value being required to complete the quadratic interpolation operation. If TMP does not equal zero, control is transferred to step 2020. Otherwise, control is transferred to the end 2022 of the procedure.

In step 2020, the quadratic interpolation operation on S is completed by adding the quantity (HTA[SI−1,KI]−HTA[SI+1,KI])/(2*TMP). Control is then transferred to the end 2022 of the procedure.

Figure 21:
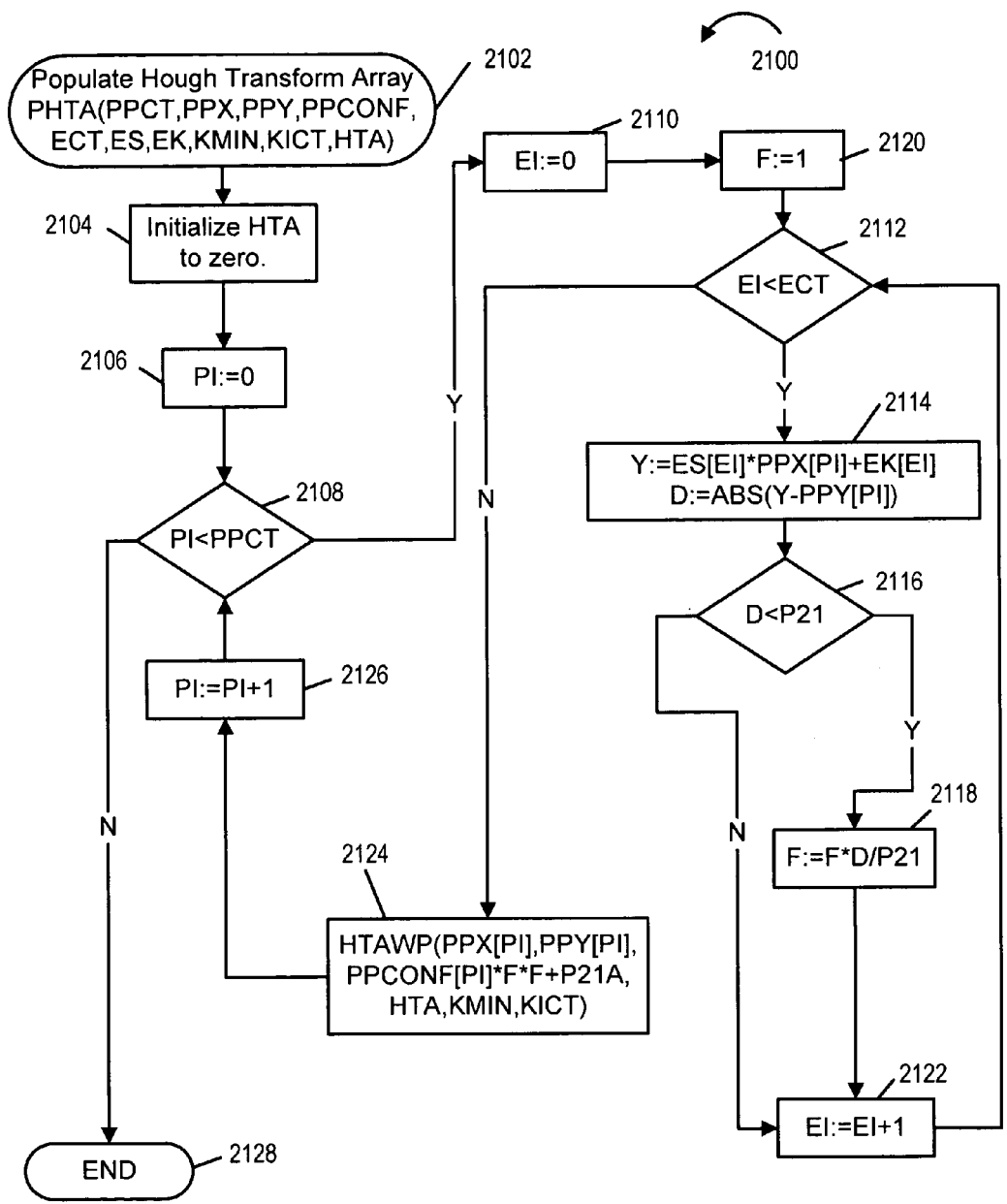
FIG. 21 depicts an exemplary method of populating a Hough transform accumulator array with a set of perimeter points in accordance with the present invention.

FIG. 21 shows an exemplary Populate Hough Transform Array (PHTA) routine implemented in accordance with the invention. This purpose of this routine is to populate the Hough transform accumulator array with perimeter points located by the FPP procedure, in preparation for locating an edge (boundary line), while giving reduced weight to points near an already-located edge. Input Arguments to the procedure are the number PPCT of perimeter points, the arrays PPX and PPY of x- and y-values for the perimeter points, the array PPCONF of confidence values for perimeter points, the number ECT of previously-located edges, the arrays ES and EK of slopes and intercepts for previously-located edges, and KMIN and KICT and the Hough transform accumulator array HTA to be populated. While this procedure is described in terms appropriate for the location of an approximately horizontal edge, the same routine serves to located an approximately vertical edge by the simple expedient of interchanging the arguments PPX and PPY.

The routine 2100 starts in step 2102. From start step 2102, where the routine begins execution, operation proceeds to step 2104, wherein the contents of the Hough transform accumulator array HTA are initialized to zero. Control is then transferred to step 2106.

In step 2106, the value of the perimeter point index PI is set to 0 in preparation for a loop over each of the perimeter points. Control is then transferred to step 2108.

Step 2108 provides the exit from the loop over perimeter points. The value of PI is compared to PPCT. If PI is less than PPCT, control is transferred to step 2110. Otherwise control is transferred to the end 2128 of the procedure.

In step 21 10, the edge index EI is set to 0 in preparation for a loop over each of the previously-located edges. Control is then transferred to step 2120.

In step 2120, the temporary variable F, representing a weight renormalization factor, is initialized to 1. Control is then transferred to step 2112.

Step 2112 provides the exit from the loop over previously-located edges. The value of EI is compared to ECT. If EI is less than ECT, control is transferred to step 2114. Otherwise control is transferred to step 2124.

In step 2114, the temporary variable D, representing the distance of the current perimeter from the current previously-located edge is calculated by the two-step formula Y:=ES[EI]*PPX[PI]+EK[EI], D:=ABS(Y−PPY[PI]). Here ABS( ) represent the absolute-value function. Control is then transferred to step 2116.

In step 2116 the distance D is compared to the distance threshold indicated by the parameter P21. The value of P21 may be adjusted to fine-tune the performance of the algorithm; an exemplary value is 40. If D is less than P21, control is transferred to step 2118. Otherwise, control is transferred to step 2122, skipping step 2118.

In step 2118, the temporary variable F, representing a weight renormalization factor, is modified by multiplication by the factor D/P21. This factor may range from 0 when D equals 0 to 1 when D equals P21. Control is then transferred to step 2122.

In step 2122, the value of the edge index EI is incremented in preparation for the next trip through the loop over previously-located edges. Control is then transferred to step 2112.

In step 2124, the given perimeter point is added to the Hough transform accumulator array with weight PPCONF[PI]*F*F+P21A, by the command HTAWP(PPX[PI],PPY[PI], PPCONF[PI]*F*F+P21A, HTA, KMIN,KICT). The value of the parameter P21A may be adjusted to fine-tune the performance of the algorithm; an exemplary value is 5. Control is then transferred to step 2126.

In step 2126, the value of the perimeter point index PI is incremented in preparation for the next trip through the loop over perimeter points. Control is then transferred to step 2108.

Figure 22:
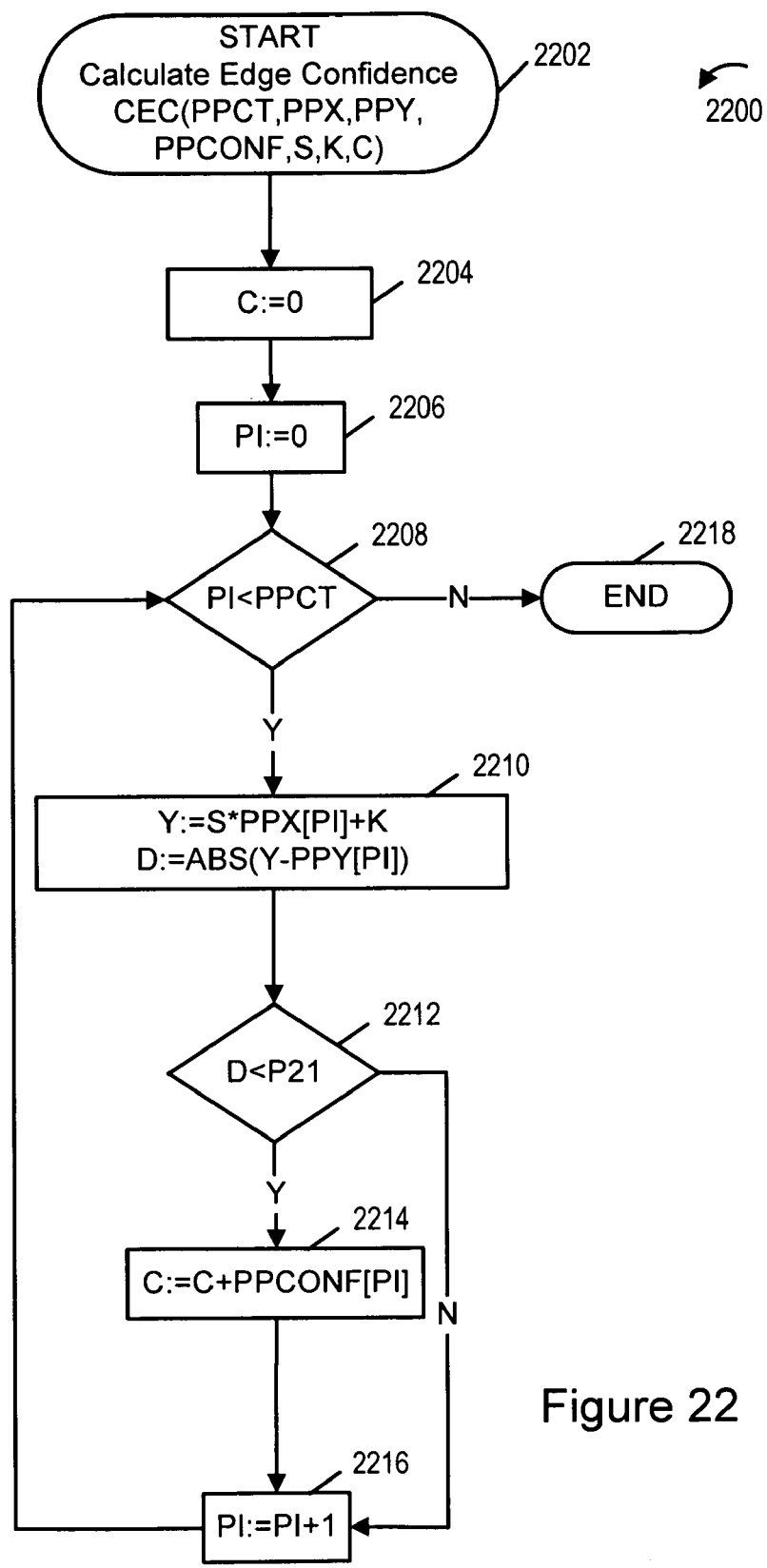
FIG. 22 depicts an exemplary method of calculating the confidence value associated with an edge in accordance with the present invention.

FIG. 22 shows a Calculate Edge Confidence (CEC) routine implemented in accordance with the invention. This purpose of this routine is to calculate a confidence value for a located edge as a total of confidences of perimeter points associated with the edge. Input Arguments to the procedure are the number PPCT of perimeter points, the arrays PPX and PPY of x- and y-values for the perimeter points, the array PPCONF of confidence values for perimeter points, the slope value S for the given edge, and the intercept value K for the given edge. The sole output value is the confidence value C. While this procedure is described in terms appropriate for the location of an approximately horizontal edge, the same routine serves to locate an approximately vertical edge by the simple expedient of interchanging the arguments PPX and PPY.

The routine 2200 starts in step 2202. From start step 2202, where the routine begins execution, operation proceeds to step 2204, wherein the value of the edge confidence C is initialized to zero. Control is then transferred to step 2206.

In step 2206, the value of the perimeter point index PI is set to 0 in preparation for a loop over each of the perimeter points. Control is then transferred to step 2208.

Step 2208 provides the exit from the loop over perimeter points. The value of PI is compared to PPCT. If PI is less than PPCT, control is transferred to step 2210. Otherwise control is transferred to the end 2218 of the procedure.

In step 2210, the temporary variable D, representing the distance of the current perimeter from the current previously-located edge is calculated by the two-step formula Y:=S*PPX[PI]+K, D:=ABS(Y−PPY[PI]). Here ABS( ) represent the absolute-value function. Control is then transferred to step 2212.

In step 2212 the distance D is compared to the distance threshold indicated by the parameter P21. If D is less than P21, control is transferred to step 2214. Otherwise, control is transferred to step 2216, skipping step 2214.

In step 2214, the value of C is modified by the addition of the confidence value PPCONF[PI] for the given perimeter point. Control is then transferred to step 2216.

In step 2216, the value of the perimeter point index PI is incremented in preparation for the next trip through the loop over perimeter points. Control is then transferred to step 2208.

Figure 23:
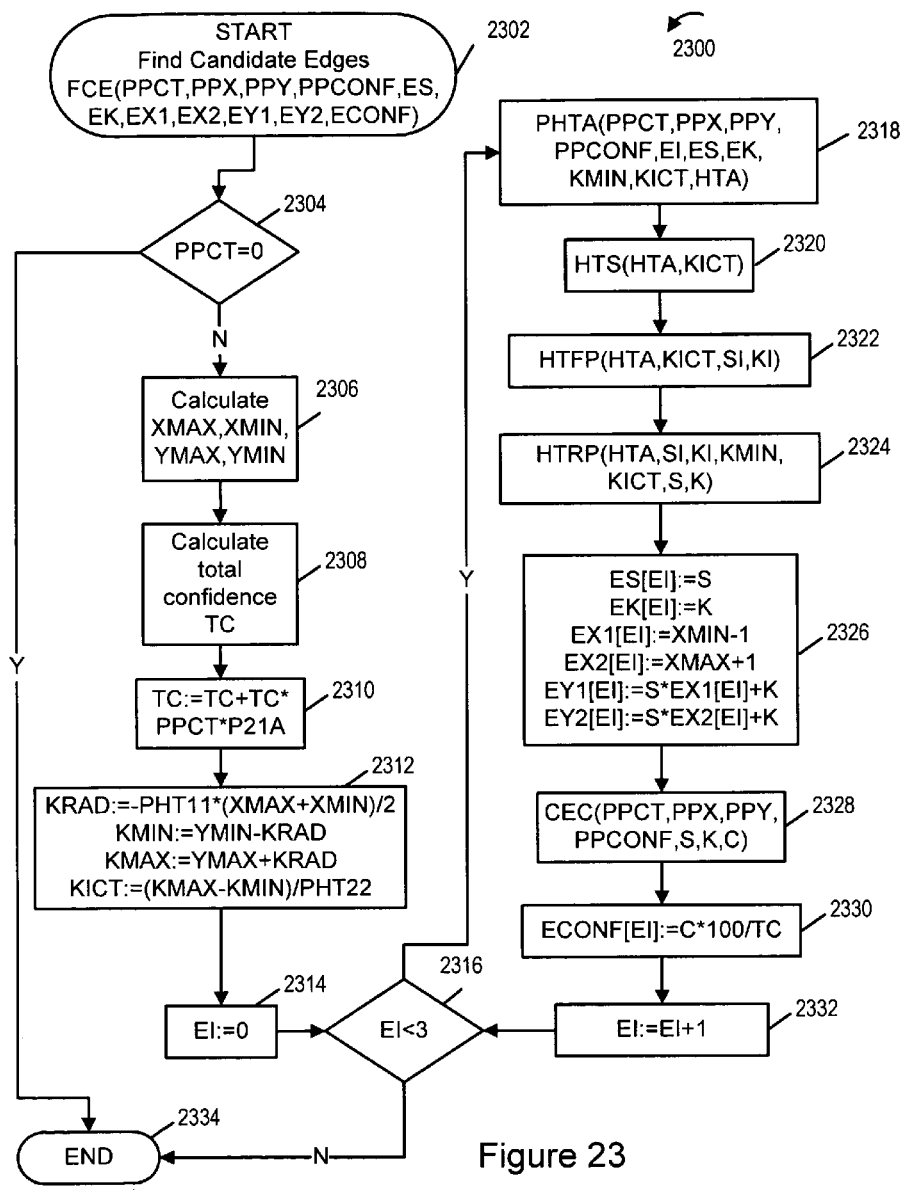
FIG. 23 depicts an exemplary method of finding a set of candidate edges given a set of perimeter points in accordance with the present invention.

FIG. 23 shows a Find Candidate Edges (FCE) routine implemented in accordance with the invention. This purpose of this routine is to determine a set of three candidate edges from a previously determined set of perimeter points. Input Arguments to the procedure are the number PPCT of perimeter points, the arrays PPX and PPY of x- and y-values for the perimeter points, the array PPCONF of confidence values for perimeter points, an array ES of three slope values to be calculated for the three edges, an array EK of three intercept values to be calculated for the three edges, an array EXI of three x-values to be calculated for the points at one end of each of the three edges to be determined, an array EX2 of three x-values to be calculated for the points at the other end of each of the three edges to be determined, an array EY1 of three y-values to be calculated for the points at one end of each of the three edges to be determined, an array EY2 of three y-values to be calculated for the points at the other end of each of the three edges to be determined, and an array ECONF of three edge confidence values corresponding to the three edges to be determined. While this procedure is described in terms appropriate for the location of an approximately horizontal edge, the same routine serves to located an approximately vertical edge by the simple expedient of interchanging the arguments PPX and PPY.

The routine 2300 starts in step 2302. From start step 2302, where the routine begins execution, operation proceeds to step 2304, wherein the number PPCT of perimeter points is compared to zero. As no edge can be located if there are no perimeter points, if PPCT equals zero, control is transferred to the end 2334 of the program. Otherwise, control is transferred to step 2306.

In step 2306, the value of the temporary variable XMIN is calculated as the minimum value of the entries of the array PPX. Similarly, the temporary variable XMAX is calculated as the maximum value of the entries of the array PPX, the temporary variable YMIN is calculated as the minimum value of the entries of the array PPY, and the temporary variable YMAX is calculated as the maximum value of the entries of the array PPY. Control is then transferred to step 2308.

In step 2308, a total confidence value TC is calculated as the sum of each of the entries of the array PPCONF. Control is then transferred to step 2310.

In step 2310, the total confidence value TC is modified by the addition of the quantity TC*PPCT*P21A. This modification increases the probability of locating a long, weak boundary rather than a short one. Control is then transferred to step 2312.

In step 2312, the minimum intercept value KMIN used in the Hough transform and the number KICT of slope values to be considered by the Hough transform are calculated by the sequence of operations KRAD:=−PHT11*(XMAXtXMIN)/2, KMIN:=YMIN−RAD, KMAX:=YMAX+KRAD, KICT:=(KMAX−KMIN)/PHT22, where KRAD and KMAX are temporary variables. Control is then transferred to step 2314.

In step 2314, the edge index EI is initialized to zero in preparation for a loop over the three candidate edges to be determined. Control is then transferred to step 2316.

Step 2316 provides the exit from the loop over candidate edges. The value of EI is compared to 3. If EI is less than 3, control is transferred to step 2318. Otherwise control is transferred to the end 2334 of the procedure.

In step 2318, the Hough transform accumulator array is populated by the operation PHTA(PPCT,PPX,PPY,PPCONF, EI,ES,EK,KMIN,KICT,HTA). Here HTA is a temporary array with KICT*PHT13 entries. Control is then transferred to step 2320.

In step 2320 a smoothing operation is performed on the Hough transform accumulator array HTA by the operation HTS(HTA,KICT). Control is then transferred to step 2322.

In step 2322, a peak is located in the Hough transform accumulator array by the operation HTFP(HTA,KICT,SI, KI). Here SI and KI are temporary variables. Control is then transferred to step 2324.

In step 2324, the peak located in step 2322 is refined by the operation HTRP(HTA,SI,KI,KMIN,KICT,S,K). Here S and K are temporary variables representing the slope and intercept of a newly-located candidate edge. Control is then transferred to step 2326.

In step 2326, the characteristics of the newly-located candidate edge are stored in various arrays by the operations ES[EI]:=S, EK[EI]:=K, EX1[EI]:=XMIN−1, EX2[EI]:=XMAX+1, EY1[EI]:=S*EX1[EI]+K, EY2[EI]:=S*EX2[EI]+K. Control is then transferred to step 2328.

In step 2328, a confidence value C is calculated for the newly-located candidate edge by the operation CEC(PPCT, PPX,PPY,PPCONF,S,K,C). Control is then transferred to step 2330.

In step 2330, the confidence value C is modified by multiplication by 100 and division by the previously-calculated total confidence value TC and the result stored in the array ECONF. Control is then transferred to step 2332.

In step 2332, the value of the edge index EI is incremented in preparation for the next trip through the loop over candidate edges. Control is then transferred to step 2316.

Figure 24:
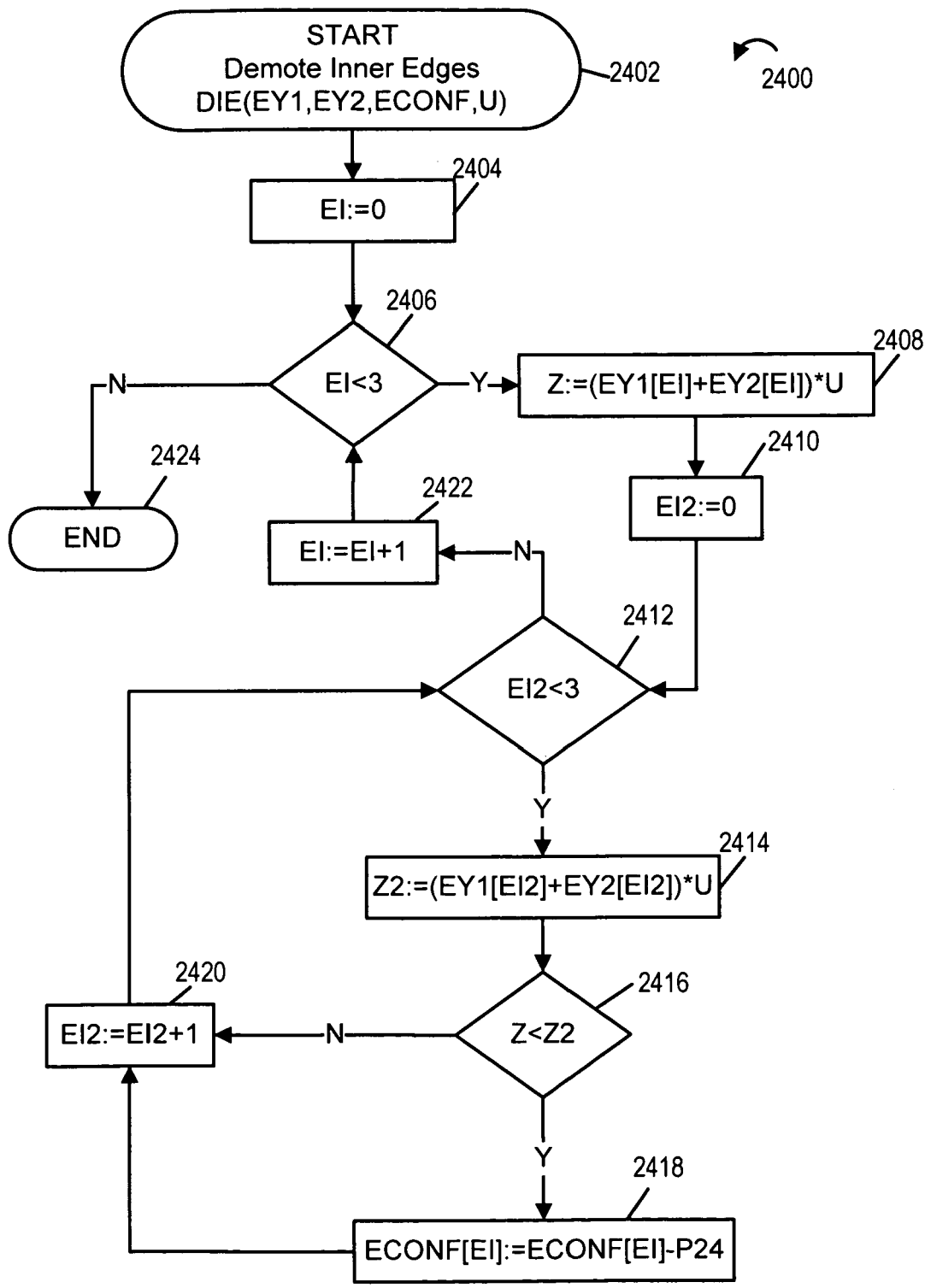
FIG. 24 depicts an exemplary method of decreasing the confidence level of candidate edges located farther from the edge of the image than other candidate edges in accordance with the present invention.

FIG. 24 shows an exemplary Demote Inner Edges (DIE) routine implemented in accordance with the invention. This purpose of this routine is to reduce the confidence value associated with candidate edges located closer to the center of the image than alternate candidate edges. Input Arguments to the procedure are the three-element array EY1 of first y-values associated with each candidate edge, the three-element array EY2 of second y-values associated with each candidate edge, the three-element array ECONF of confidence values associated with each candidate edge, and a variable U indicating whether y-values are increasing toward the center or the edge of the page; U takes the value −1 when processing candidate top or left edges and takes the value +1 when processing candidate right or bottom edges. While this procedure is described in terms appropriate for the location of an approximately horizontal edge, the same routine serves to locate an approximately vertical edge by the simple expedient of substituting EX1 and EX2 for EY1 and EY2.

The routine 2400 starts in step 2402. From start step 2402, where the routine begins execution, operation proceeds to step 2404, wherein the first edge index EI is set to 0 in preparation for an outer loop over candidate edges. Control is then transferred to step 2406.

Step 2406 provides the exit from the outer loop over candidate edges. The value of EI is compared to 3. If EI is less than 3, control is transferred to step 2408. Otherwise control is transferred to the end 2424 of the procedure.

In step 2408, a temporary variable Z indicating the nearness of the candidate edge with index EI to the image boundary is calculated from the formula (EY1[EI]+EY2[EI])*U. Control is then transferred to step 2410.

In step 2410, the second edge index EI2 is set to 0 in preparation for an inner loop over candidate edges. Control is then transferred to step 2412.

Step 2412 provides the exit from the inner loop over candidate edges. The value of EI2 is compared to 3. If EI2 is less than 3, control is transferred to step 2414. Otherwise control is transferred to step 2422.

In step 2414, a temporary variable Z2 indicating the nearness of the candidate edge with index EI2 to the image boundary is calculated from the formula (EY1[EI2]+EY2[EI2])*U. Control is then transferred to step 2416.

In step 2416, the nearness Z to the image boundary of the candidate edge with index EI is compared to the nearness Z2 to the image boundary of the candidate edge with index EI2. If Z is less than Z2, control is transferred to step 2418. Otherwise, control is transferred to step 2420, skipping step 2418.

In step 2418 the confidence ECONF[EI] associated with the candidate edge with index EI is reduced by the subtraction of the quantity P24. The value of the parameter P24 may be adjusted to fine-tune the performance of the algorithm; an exemplary value is 10. Control is then transferred to step 2420.

In step 2420, the value of the second edge index EI2 is incremented in preparation for the next trip through the inner loop over candidate edges. Control is then transferred to step 2412.

In step 2422, the value of the first edge index EI is incremented in preparation for the next trip through the outer loop over candidate edges. Control is then transferred to step 2406.

Figure 25:
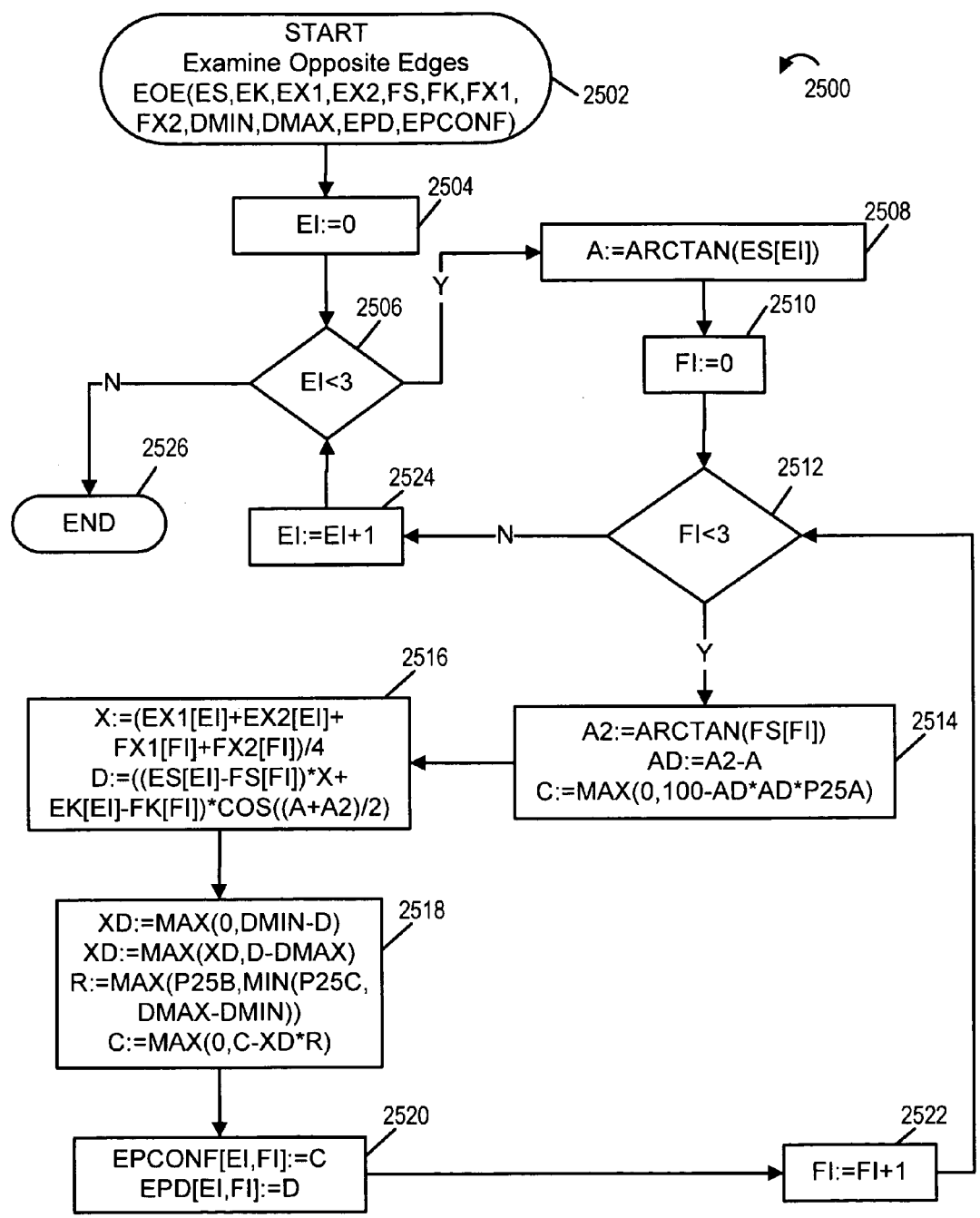
FIG. 25 depicts an exemplary method of determining a confidence value associated with a pair of opposite candidate edges and calculating the distance between an opposite pair of candidate edges in accordance with the present invention.

FIG. 25 shows an exemplary Examine Opposite Edges (EOE) routine implemented in accordance with the invention. This purpose of this routine is to examine pairs of candidate edges taken from two distinct sets determined to represent opposite sides of the page (left and right, or top and bottom) and associate with each pair a confidence value and a distance between the two edges of the pair. As each set of candidate edges has three members, there are nine pairs of edges to be considered. Arguments to the procedure are a set of three-element arrays ES, EK, EX1, and EX2 representing the slopes, intercepts, first x-values, and second x-values of a first set of candidate edges, a second set of three-element arrays FS, FK, FX1, and FX2 representing the slopes, intercepts, first x-values, and second x-values of a second set of candidate edges, a minimum allowable distance value DMIN, a maximum allowable distance value DMAX, a 3×3 array EPD to hold the distance values associated with each pair of edges, and a 3×3 array EPCONF to hold the confidence values associated with each pair of edges. While this procedure is described in terms appropriate for the location of an approximately horizontal pair of edges (top and bottom), the same routine serves to located an approximately vertical edge by the simple expedient of using arrays of y-values for the arguments EX1, EX2, FX1, and FX2.

The routine 2500 starts in step 2502. From start step 2502, where the routine begins execution, operation proceeds to step 2504, wherein the first edge index EI is set to 0 in preparation for a loop over candidate edges in the first set. Control is then transferred to step 2506.

Step 2506 provides the exit from the loop over first candidate edges. The value of EI is compared to 3. If EI is less than 3, control is transferred to step 2508. Otherwise control is transferred to the end 2526 of the procedure.

In step 2508, a temporary variable A, representing an angle associated with the first edge have index value EI, is calculated from the formula ARCTAN(ES[EI]). Control is then transferred to step 2508.

In step 2510, the second edge index FI is set to 0 in preparation for a loop over second candidate edges. Control is then transferred to step 2512.

Step 2512 provides the exit from the loop over second candidate edges. The value of FI is compared to 3. If FI is less than 3, control is transferred to step 2514. Otherwise control is transferred to step 2524.

In step 2514, a temporary variable C representing the confidence associated with the current pair of edges is initially calculated by the steps, A2:=ARCTAN(FS[FI]), AD:=A2-A, C:=MAX(0,100-AD*AD*P25A), the result of the computation being rounded to the nearest integer, where A2 represents an angle associated with the second edge and AD represents the difference between the angles associated with the two edges. As a result of this computation C takes the value 100 when the two edges have identical slopes and decreases as the difference between the orientations of the two edges increases, reaching a minimum value 0 for some difference angle value implied by the value of the parameter P25A. The value of P25A may be adjusted to fine-tune the performance of the algorithm; an exemplary value is 17,778. Control is then transferred to step 2516.

In step 2516, a temporary variable D representing the distance between the two edges under consideration is calculated by the steps X:=(EX1[EI]+EX2[EI]+FX1[FI]+FX2[FI])/4, D:=((ES[EI]−FS[FI])*X+EK[EI]−FK[FI])*COS((A+A2)/2), the results of both steps being rounded to the nearest integer and X being a temporary variable. Control is then transferred to step 2518.

In step 2518 the confidence associated with the pair of edges under consideration is reduced by a quantity reflective of the extent to which the distance between the two edges falls outside the specified range as described by DMIN and DMAX. This is done by the steps XD:=MAX(0,DMIN−D), XD:=MAX(XD,D−DMAX), R:=MAX(P25B,MIN(P25C, DMAX−DMIN)), C:=MAX(0,C−XD*R), XD and R being temporary variables. The values of the parameters P25B and P25C may be adjusted to fine-tune the performance of the algorithm; exemplary values are 1 for P25B and 500 for P25C. Control is then transferred to step 2520.

In step 2520 the results of the foregoing computations are stored in the proper locations within the arrays EPD and EPCONF by the operations EPCONF[EI,FI]:=C and EPD[EI,FI]:=D. Control is then transferred to step 2522.

In step 2522, the value of the second edge index FI is incremented in preparation for the next trip through the loop over second candidate edges. Control is then transferred to step 2512.

In step 2524, the value of the first edge index EI is incremented in preparation for the next trip through the loop over first candidate edges. Control is then transferred to step 2506.

Figure 26:
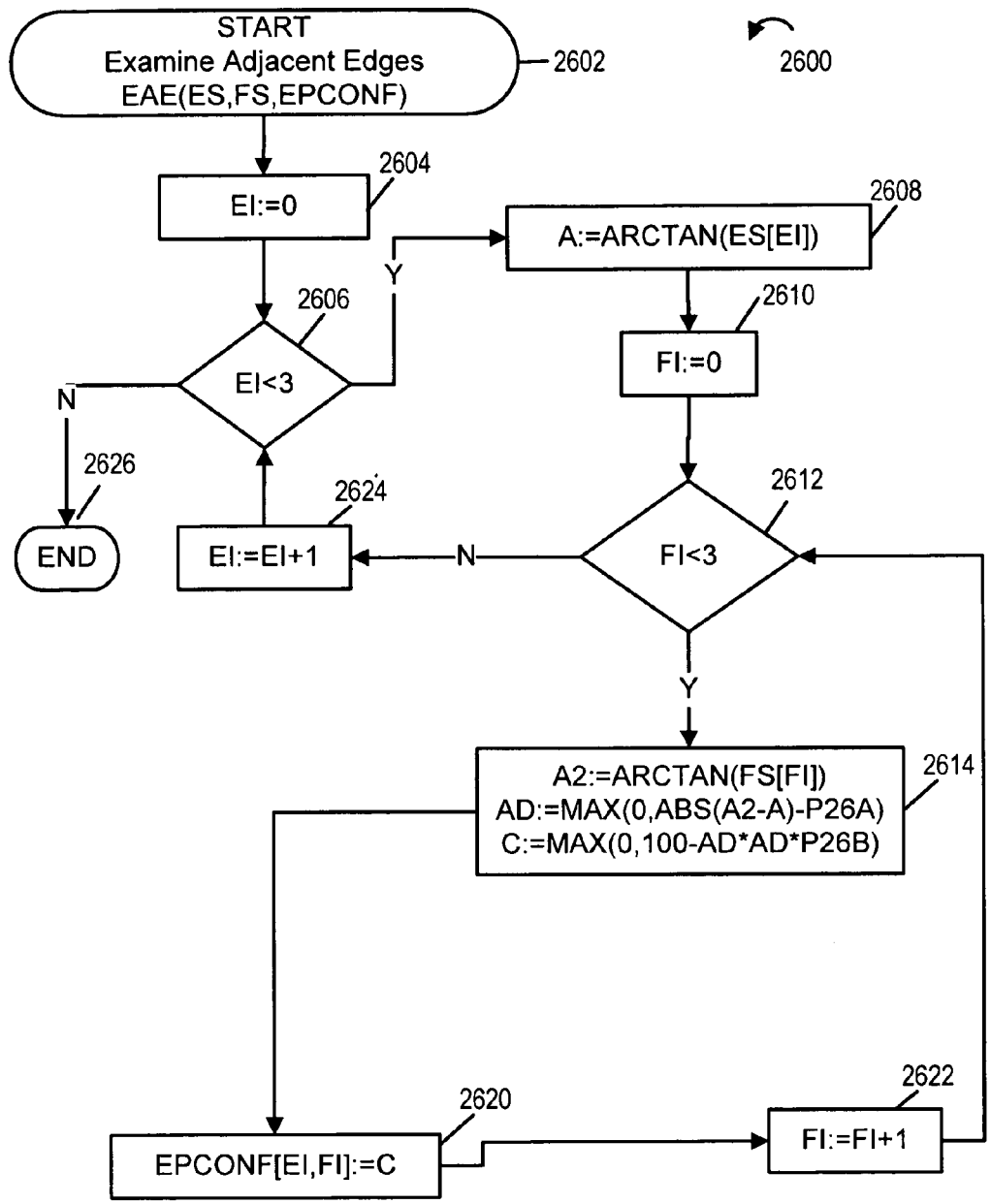
FIG. 26 depicts an exemplary method of determining a confidence value associated with a pair of adjacent candidate edges in accordance with the present invention.

FIG. 26 shows an exemplary Adjacent Opposite Edges (EAE) routine implemented in accordance with the invention. This purpose of this routine is to examine pairs of candidate edges taken from two distinct sets determined to represent adjacent sides of the page (left and top, for example) and associate with each pair a confidence value. As each set of candidate edges has three members, there are nine pairs of edges to be considered. Arguments to the procedure are a three-element array ES representing the slopes of a first set of candidate edges, a three-element array FS representing the slopes of a second set of candidate edges, and a 3×3 array EPCONF to hold the confidence values associated with each pair of edges.

The routine 2600 starts in step 2602. From start step 2602, where the routine begins execution, operation proceeds to step 2604, wherein the first edge index EI is set to 0 in preparation for a loop over candidate edges in the first set. Control is then transferred to step 2606.

Step 2606 provides the exit from the loop over first candidate edges. The value of EI is compared to 3. If EI is less than 3, control is transferred to step 2608. Otherwise control is transferred to the end 2626 of the procedure.

In step 2608, a temporary variable A, representing an angle associated with the first edge have index value EI, is calculated from the formula ARCTAN(ES [EI]). Control is then transferred to step 2610.

In step 2610, the second edge index FI is set to 0 in preparation for a loop over second candidate edges. Control is then transferred to step 2612.

Step 2612 provides the exit from the loop over second candidate edges. The value of FI is compared to 3. If FI is less than 3, control is transferred to step 2614. Otherwise control is transferred to step 2624.

In step 2614, a temporary variable C representing the confidence associated with the current pair of edges is initially calculated by the steps, A2:=ARCTAN(FS[FI]), AD:=MAX(0,ABS(A2-A)-P26A), C:=MAX(0,100-AD*AD*P26B), the result of the computation being rounded to the nearest integer, where A2 represents an angle associated with the second edge and AD roughly represents the difference between the angles associated with the two edges. Note that as the slope for an approximately horizontal edge is stored in the form ratio x-to-y whereas the slope for an approximately vertical edge is stored in the form ratio y-to-x, nearly-perpendicular edges should yield a value of AD close to zero. As a result of this computation C takes the value 100 when the two edges are nearly perpendicular (having slopes such that the difference between A and A2 is less than P26A) decreases as the difference between the orientations of the two edges deviates from a right angle, reaching a minimum value 0 for some difference angle value implied by the value of the parameter P26B. The values of P26A and P26B may be adjusted to fine-tune the performance of the algorithm; exemplary values are 0.025 for P26A and 10,000 for P26B. Control is then transferred to step 2620.

In step 2620 the results of the foregoing computation is stored in the proper locations within the array EPCONF by the operation EPCONF[EI,FI]:=C. Control is then transferred to step 2622.

In step 2622, the value of the second edge index FI is incremented in preparation for the next trip through the loop over second candidate edges. Control is then transferred to step 2612.

In step 2624, the value of the first edge index EI is incremented in preparation for the next trip through the loop over first candidate edges. Control is then transferred to step 2606.

Figure 27:
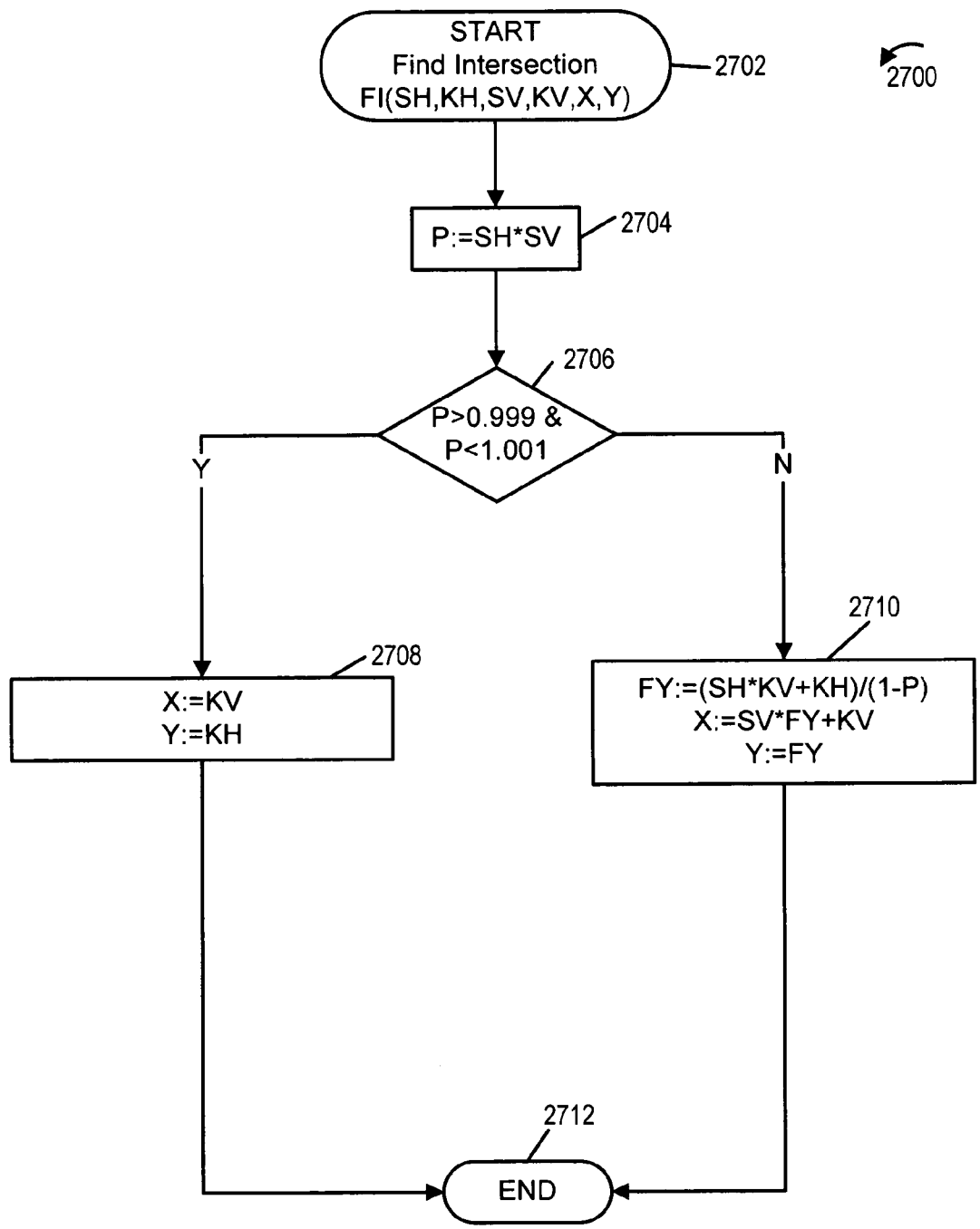
FIG. 27 depicts an exemplary method of finding the intersection point of a pair of lines in accordance with the present invention.

FIG. 27 shows an exemplary Find Intersection (FI) routine implemented in accordance with the invention. This purpose of this routine is to locate the point of intersection of a pair of lines specified by slope and intercept values. Arguments to the procedure are a slope value SH and an intercept value KH for an approximately horizontal line, and slope value SV and an intercept value KV for an approximately vertical line, and the coordinates X and Y of the point of intersection to be determined. Note that for the approximately horizontal line the slope value SH represents y-to-x ratio whereas for the approximately vertical line the slope value SV represents x-to-y ratio.

The routine 2700 starts in step 2702. From start step 2702, where the routine begins execution, operation proceeds to step 2704, wherein the temporary variable P representing the product of the two slopes is calculated as SH*SV. Control is then transferred to step 2706.

In step 2706 the value of P is compared to both 0.999 and 1.001. A value of P lying between these two values indicates that the two lines are essentially parallel. In practice this may not occur because of the restrictions on possible slopes of horizontal and vertical lines. If P lies between 0.999 and 1.001 then control is transferred to step 2708. Otherwise control is transferred to step 2710.

In step 2708, the two lines have been found to be essentially parallel. The point of intersection is defined arbitrarily as X:=KV, Y:=KH. Control is then transferred to the end 2712 of the procedure.

In step 2710, the two lines have been found to be not parallel. The point of intersection is calculated by the steps FY:=(SH*KV+KH)/(1-P), X:=SV*FY+KV, Y:=FY, where FY is a floating-point y-value and X and Y are integer values. Control is then transferred to the end 2712 of the procedure.

Figure 28:
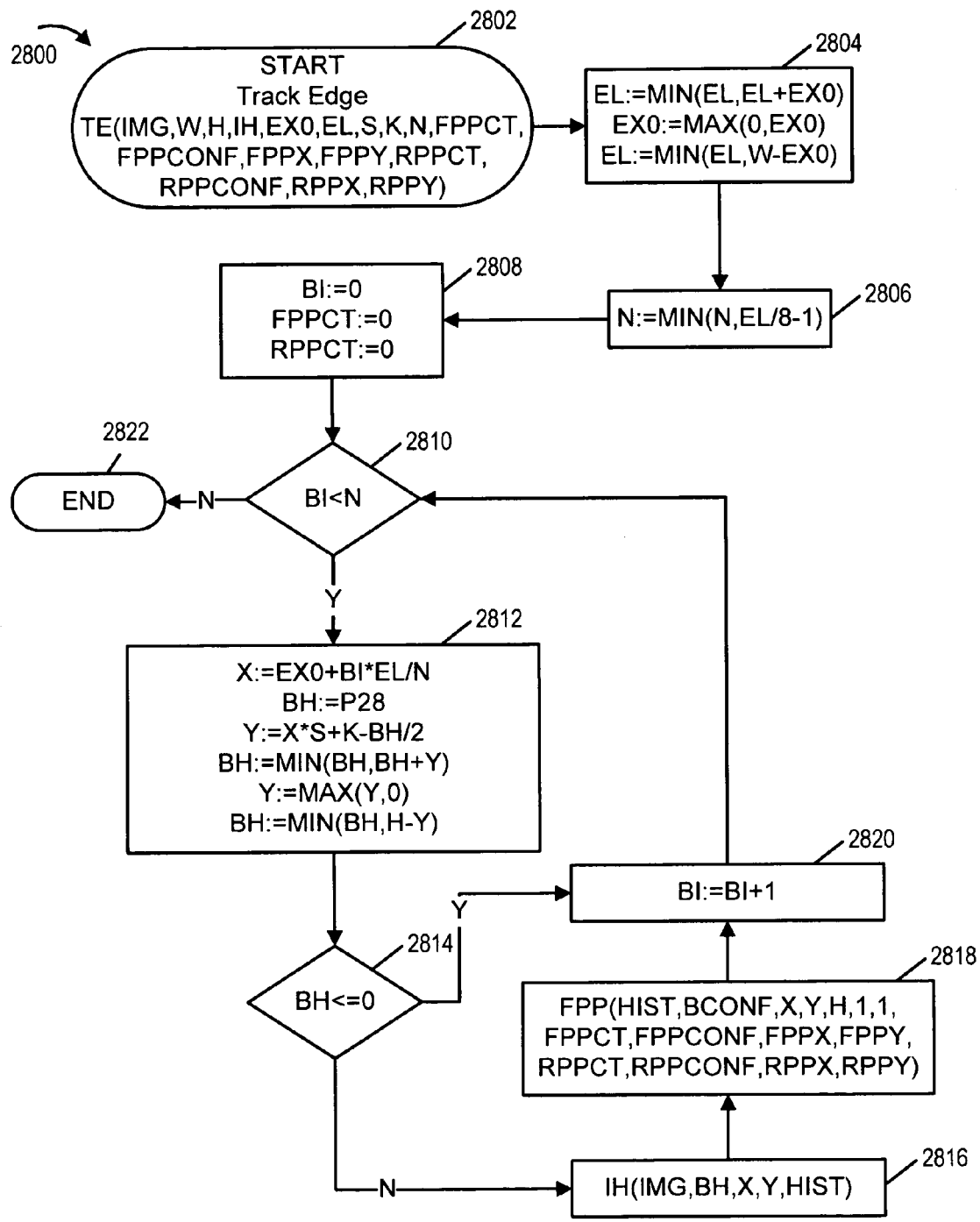
FIG. 28 depicts an exemplary method of locating perimeter points located close to a given candidate edge in accordance with the present invention.

FIG. 28 shows an exemplary Track Edge (TE) routine implemented in accordance with the invention. This purpose of this routine is to identify a set of boundary points lying along a previously-determined line segment representing an edge of the printed area on the page. These points are determined by the previously-defined FPP procedure operating on bands to be constructed roughly perpendicular to the edge. The total number of such points is stored in either FPPCT or RPPCT, depending on criteria external to this procedure. Similarly, confidence values for each point are stored in either the array FPPCONF or the array RPPCONF, x-values for each point are stored in either the array FPPX or the array RPPX, and y-values for each point are stored in either the array FPPY or the array RPPY. In addition to FPPCT, RPPCT, FPPCONF, RPPCONF, FPPX, RPPX, FPPY, and RPPY, Arguments to the procedure are the matrix IMG of pixel values, the width W and height H of the image, a procedure IH which is one of IHH or IVH, the initial x-value EX0 for the edge, the length EL of the edge, the slope S and intercept K of the edge, and the number N of points to be determined. The number FPPCT or RPPCT of points actually located may be less than the number N requested. While this procedure is described in terms appropriate for a horizontal edge, a vertical edge may be processed with no change to the routine by appropriate permutation and substitution of parameters.

The routine 2800 starts in step 2802. From start step 2802, where the routine begins execution, operation proceeds to step 2804, wherein the edge is constrained to lie within the boundaries (decreasing EL and increasing EX0 as necessary) by the image by the sequence of operations EL:=MIN(EL, EL+EX0), EX0:=MAX(0,EX0), EL:=MIN(EL,W−EX0). Control is then transferred to step 2806.

In step 2806, the desired number N of points to be determined is restricted to less than one-eight the length of the edge by the operation N:=MIN(N,EL/8−1), to avoid overlap of bands later in the procedure. Control is then transferred to step 2808.

In step 2808, band index BI is set to 0 in preparation for a loop over bands. In addition the variables FPPCT and RPPCT, representing the number of total number of points located on each of the bands in the forward and reverse directions, are initialized to zero. Control is then transferred to step 2810.

Step 2810 provides the exit from the loop over bands. The value of BI is compared to N. If BI is less than N, control is transferred to step 2812. Otherwise control is transferred to the end 2822 of the procedure.

In step 2812, temporary variables X, Y, and BH, representing the x- and y-positions and height of a new vertical band to be created, are initialized. X is calculated as EX0+BI*EL/N, the result of the division being rounded to the nearest integer. The effect of this calculation is to space the bands with index values 0 . . . N−1 evenly along the edge. BH is initially set to the parameter value P28. The value of this parameter may be adjusted to fine-tune the performance of the algorithm; an exemplary value is 53. Y is initially calculated from the formula X*S+K−BH/2. The effect of this calculation is to center the band vertically on the edge. Y and BH are then modified so that the band does not project beyond either the top or bottom of the image by the sequence of operations BH:=MIN(BH, BH+Y), Y:=MAX(Y,0), BH:=MIN(BH,H-Y). Control is then transferred to step 2814.

In step 2814, the calculated height BH of the band is compared to zero. A non-positive value may occur if the band boundaries calculated in step 2812 fell entirely outside the image boundaries. In such a case (if BH<=0) no point can be determined from the band and control is transferred to step 2820 in preparation for the next trip through the loop. Otherwise, control is transferred to step 2816.

In step 2816, a histogram HIST for the band is populated by the operation IH(IMG,BH,X,Y,HIST). Control is then transferred to step 2818.

In step 2818, a single perimeter point is located for the band in each direction by the operation FPP(HIST,BCONF,X,Y,H, 1,1,FPPCT,FPPCONF,FPPX,FPPY,RPPCT,RPPCONF, RPPX,RPPY). Here the values in the array BCONF are set uniformly to 100. Control is then transferred to step 2820.

In step 2820, the value of the band index BI is incremented in preparation for the next trip through the loop over bands. Control is then transferred to step 2810.

Figure 29:
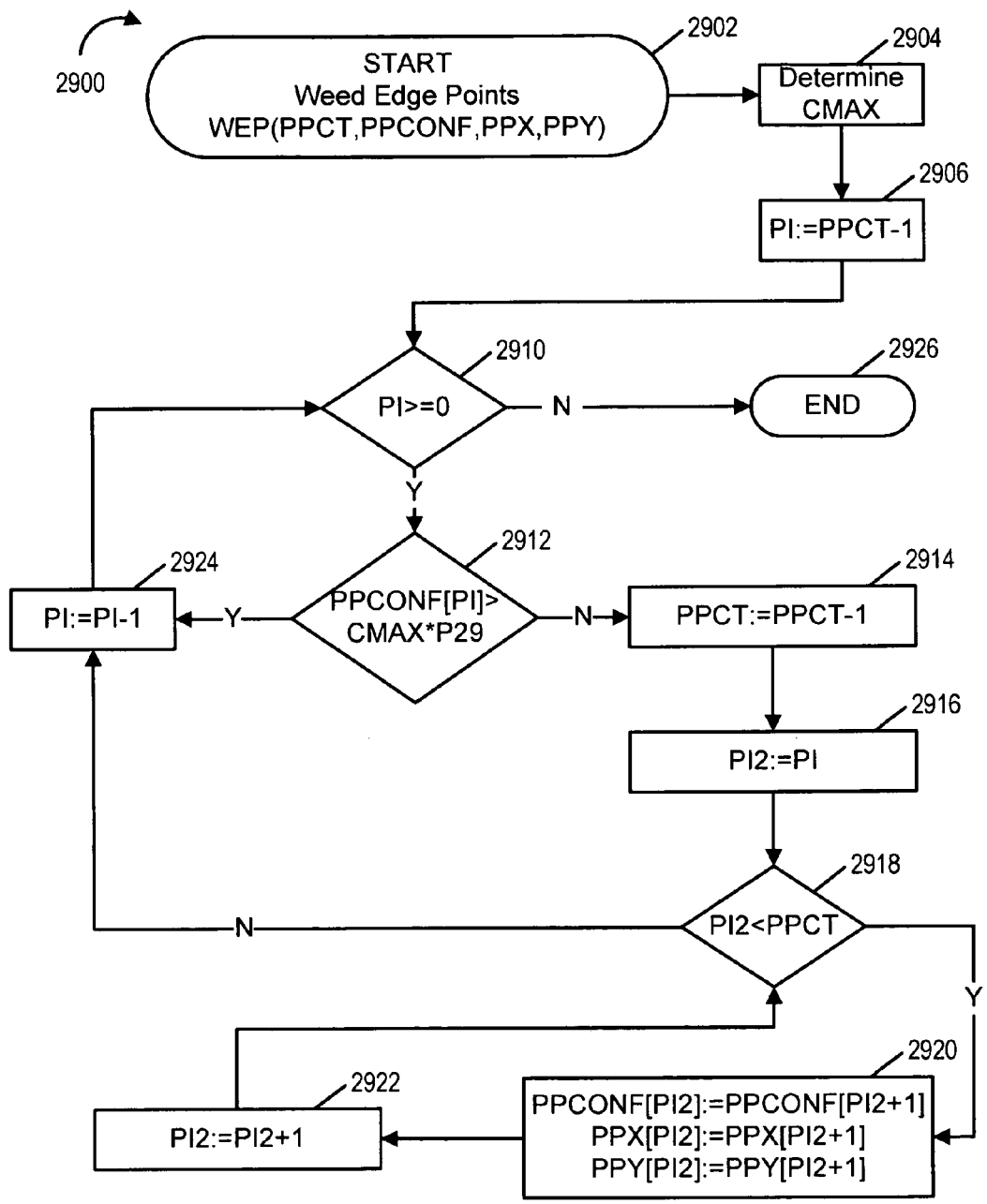
FIG. 29 depicts an exemplary method of removing from a list of perimeter points those points having low confidence values in accordance with the present invention.

FIG. 29 shows an exemplary Weed Edge Points (WEP) routine implemented in accordance with the invention. This purpose of this routine is to eliminate from a previously-determined list of edge points those having confidence values below a certain threshold. Arguments to the procedure are the number PPCT of points in the list (whose value may be reduced by the procedure), an array PPCONF of confidence values associated with the points, and array PPX of x-values associated with the points, and an array PPY of y-values associated with the points.

The routine 2900 starts in step 2902. From start step 2902, where the routine begins execution, operation proceeds to step 2904, wherein the temporary variable CMAX, representing the maximum confidence value for the points in the list, is determined as the maximum of PPCONF[0] . . . PPCONF[PPCT-1]. Control is then transferred to step 2906. In step 2906, the point index PI is set to PPCT-1 in preparation for a (backwards) loop over the points in the list. Control is then transferred to step 2910.

Step 2910 provides the exit from the loop over points in the list. The value of PI is compared to 0. If PI is not less than 0, control is transferred to step 2912. Otherwise control is transferred to the end 2926 of the procedure.

In step 2912, a the confidence value PPCONF[PI] of the current point is compared to the quantity CMAX*P29. The value of the parameter P29 may be adjusted to fine-tune the performance of the algorithm; an exemplary value is 0.3. If PPCONF[PI] is greater than CMAX*P29, the point will be retained in the list and control is transferred to step 2924 in preparation for the next trip through the loop over points in the list. Otherwise, the point will be eliminated from the list and control is transferred to step 2914.

In step 2914, the value of PPCT is decremented by one to reflect the elimination of a point from the list. It remains still to remove the corresponding entries from the arrays PPCONF, PPX, and PPY, and shift the other entries to fill in the gap. Control is then transferred to step 2916.

In step 2916, a second point index PI2 is set to PI in preparation for an inner loop over points in the list. Control is then transferred to step 2918.

Step 2918 provides the exit from the inner loop over points in the list. The value of PI2 is compared to PPCT. If PI2 is less than PPCT, control is transferred to step 2920. Otherwise control is transferred to step 2924.

In step 2920, the next array entries PPCONF[PI2+1], PPX[PI2+1], and PPY[PI2+1] are shifted down to position PI2. Control is then transferred to step 2922.

In step 2922, the value of the second point index PI2 is incremented in preparation for the next trip through the inner loop over points in the list. Control is then transferred to step 2918.

In step 2924, the value of the point index PI is decremented in preparation for the next trip through the (backwards) loop over points in the list. Control is then transferred to step 2910.

Figure 30:
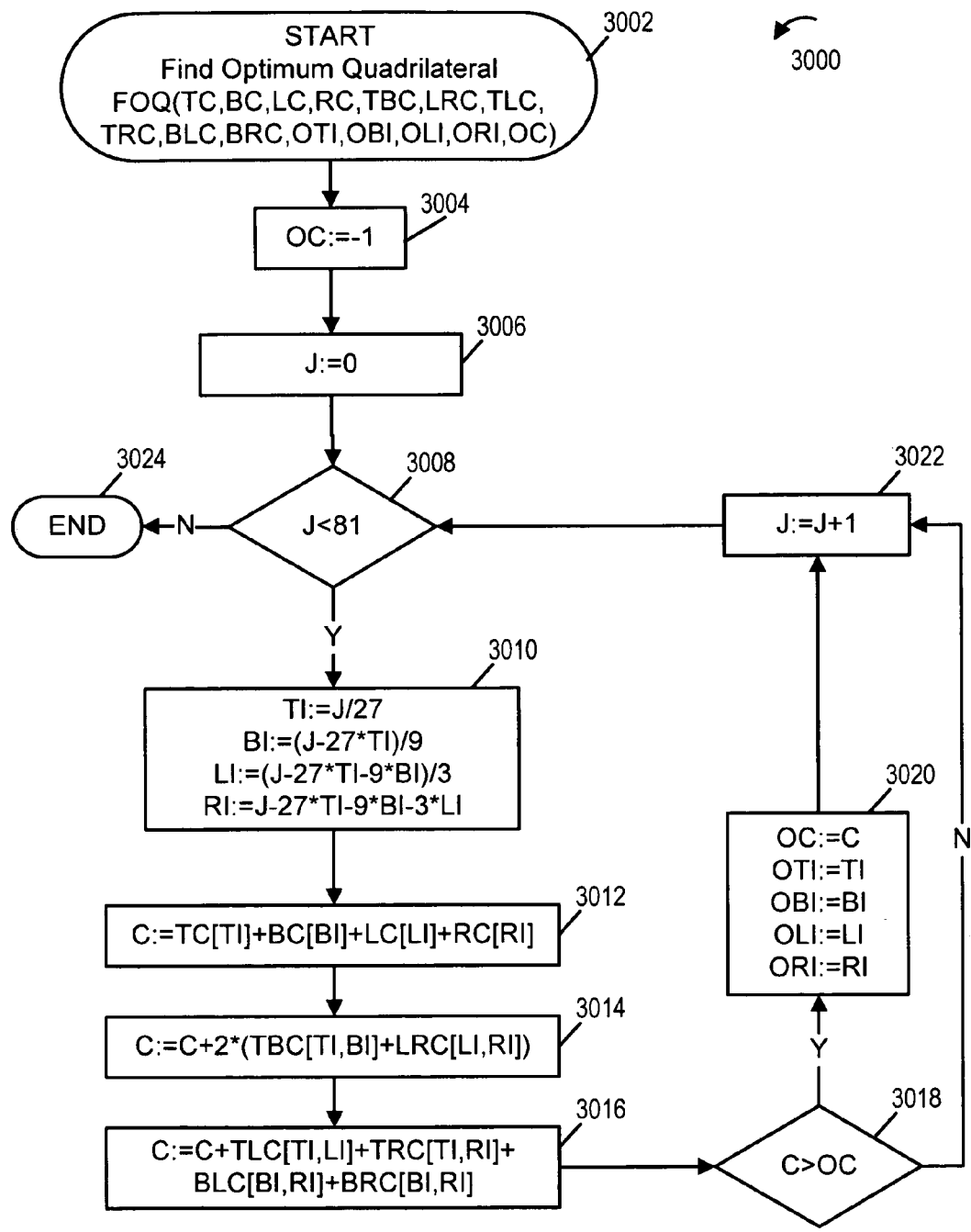
FIG. 30 depicts an exemplary method of choosing the quadrilateral assembled from various candidate edges having the greatest overall confidence values in accordance with the present invention.

FIG. 30 shows an exemplary Find Optimum Quadrilateral (FOQ) routine implemented in accordance with the invention. This purpose of this routine is to choose a quadrilateral from the various possibilities assembled from a previously-determined top candidate edges, bottom candidate edges, left candidate edges and right candidate edges which mazimizes the overall confidence value, which is an amalgam of the confidence values associated with individual edges, pairs of opposite edges, and pairs of adjacent edges. Since there are 3 candidate edges in each of the groups of top edges, bottom edges, left edges, and right edges, the total number of possible quadrilaterals is 3×3×3×3=81. Arguments to the procedure are the 3-element array TC of confidence values for top edges, the 3-element array BC of confidence values for bottom edges, the 3-element array LC of confidence values for left edges, the 3-element array RC of confidence values for right edges, the 3×3 array TBC of confidence values for pairs of top and bottom edges, the 3×3 array LRC of confidence values for pairs of left and right edges, the 3×3 array TLC of confidence values for pairs of top and left edges, the 3×3 array TRC of confidence values for pairs of top and right edges, the 3×3 array BLC of confidence values for pairs of bottom and left edges, the 3×3 array BRC of confidence values for pairs of bottom and right edges, the index OTI of the top edge composing the optimum quadrilateral to be determined, the index OBI of the bottom edge composing the optimum quadrilateral to be determined, the index OLI of the left edge composing the optimum quadrilateral to be determined, the index ORI of the right edge composing the optimum quadrilateral to be determined, and the optimum confidence level OC.

The routine 3000 starts in step 3002. From start step 3002, where the routine begins execution, operation proceeds to step 3004, wherein the optimum confidence level OC is set to −1. This will be replaced by the first genuine confidence level encountered, which is guaranteed to be nonnegative. Control is then transferred to step 3006.

In step 3006, the index J is initialized to 0 in preparation for looping over 81 possible quadrilaterals. Control is then transferred to step 3008.

Step 3008 provides the exit from the loop over each of the possible quadrilaterals. The value of J is compared to 81. If J is less than 81, control is transferred to step 3010. Otherwise control is transferred to the end 3024 of the procedure.

In step 3010 the quadrilateral index value J is decomposed into four separate edge index values: a top index TI, a bottom index BI, a left index LI, and a right index RI, according to the formulas TI:=J/27, BI:=(J−27*TI)/9, LI:=(J−27*TI−9*BI)/3, RI:=J−27*TI−9*BI−3*LI. As J ranges in value from 0 to 80 inclusive, TI, BI, LI, and RI will range over each of the possible combinations of four index values each ranging from 0 to 2 inclusive. Control is then transferred to step 3012.

In step 3012, the overall confidence value C corresponding to the current combination of edges is initialized as the sum TC[TI]+BC[BI]+LC[LI]+RC[RI] of the four individual edge confidences. Control is then transferred to step 3014.

In step 3014, the overall confidence value C is augmented by adding twice the sum TBC[TI,BI]+TLR[LI,RI] of the confidences for the two pairs of opposite edges. Control is then transferred to step 3016.

In step 3016, the overall confidence value C is augmented by adding the sum TLC[TI,LI]+TRC[TI,RI]+BLC[BI,LI]+BRC[BI,RI] of the confidences for the four pairs of adjacent edges. Control is then transferred to step 3018.

In step 3018, the overall confidence value C for the current combination is compared to the optimum confidence value OC so far. If C exceeds OC, control is transferred to step 3020. Otherwise, control is transferred to step 3022, skipping step 3020.

In step 3020, the previous optimum values OTI, OBI, OLI, ORI, and OC are replaced by the values for the current combination, which has been discovered to be a new optimum. Control is then transferred to step 3022.

In step 3022, the value of J is incremented in preparation for the next trip through the loop over each of the quadrilaterals. Control is then transferred to step 3008.

Figure 31:
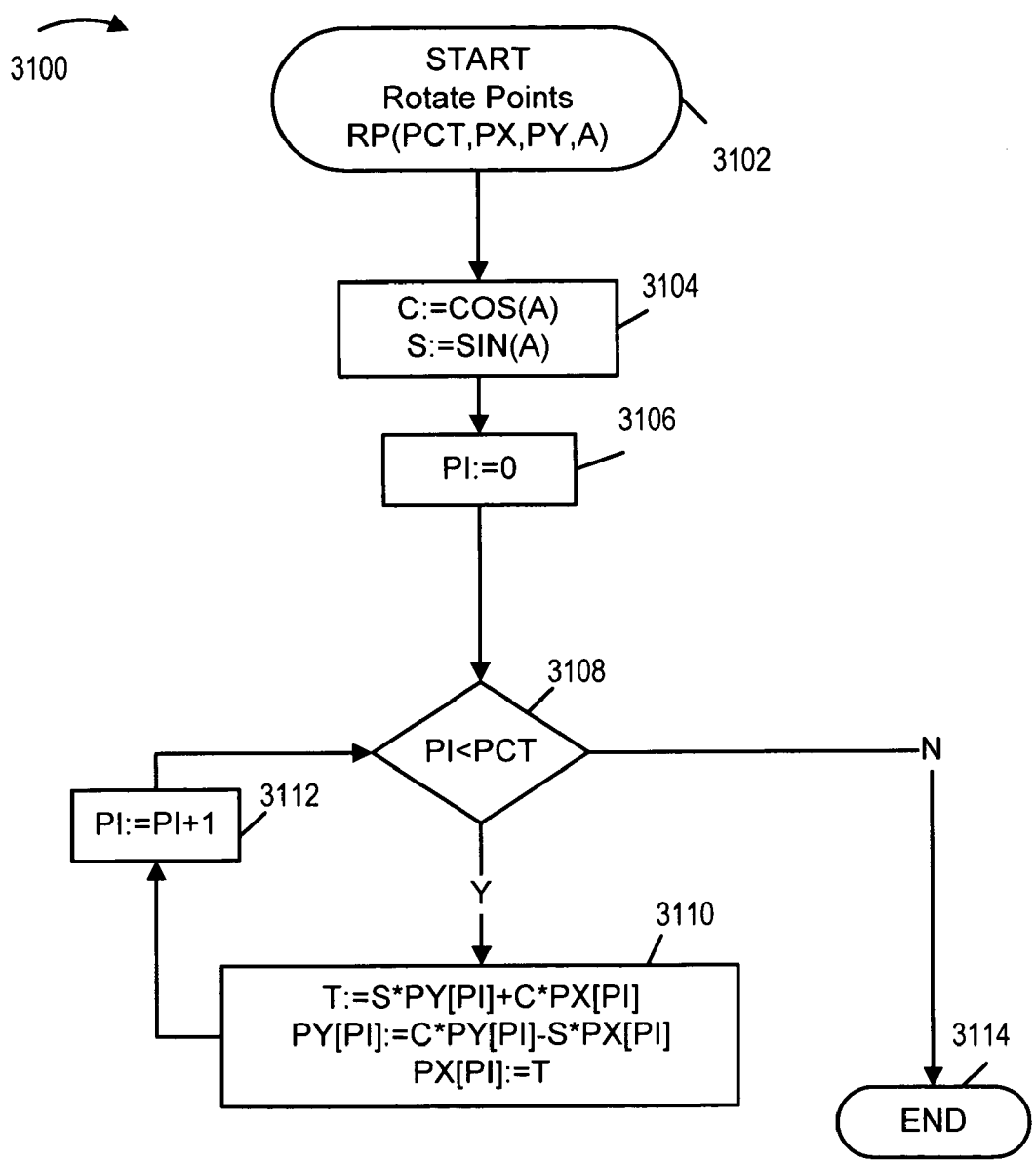
FIG. 31 depicts an exemplary method of rotating the coordinates of the points in a set in accordance with the present invention.

FIG. 31 shows an exemplary Rotate Points (RP) routine implemented in accordance with the invention. This purpose of this routine is to determine rotated x- and y-values for a set of points. Arguments to the procedure are the number PCT of points to be rotated, an array PX of x-values for each point, an array PY of y-values for each point, and the angle A by which the points are to be rotated.

The routine 3100 starts in step 3102. From start step 3102, where the routine begins execution, operation proceeds to step 3104, wherein rotation coefficients C and S are calculated as COS(A) and SIN(A) respectively. Control is then transferred to step 3106. In step 3106, the point index PI is initialized to 0 in preparation for looping over the points. Control is then transferred to step 3108.

Step 3108 provides the exit from the loop over the points. The value of PI is compared to PCT. If PI is less than PCT, control is transferred to step 3110. Otherwise control is transferred to the end 3114 of the procedure.

In step 3110 the rotated x- and y-values are calculated from the formula T:=S*PY[PI]+C*PX[PI], PY[PI]:=C*PY[PI]−S*PX[PI], PX[PI]:=T, where T is a temporary variable. Control is then transferred to step 3112.

In step 3112, the value of PI is incremented in preparation for the next trip through the loop over the points. Control is then transferred to step 3108.

Figure 32:
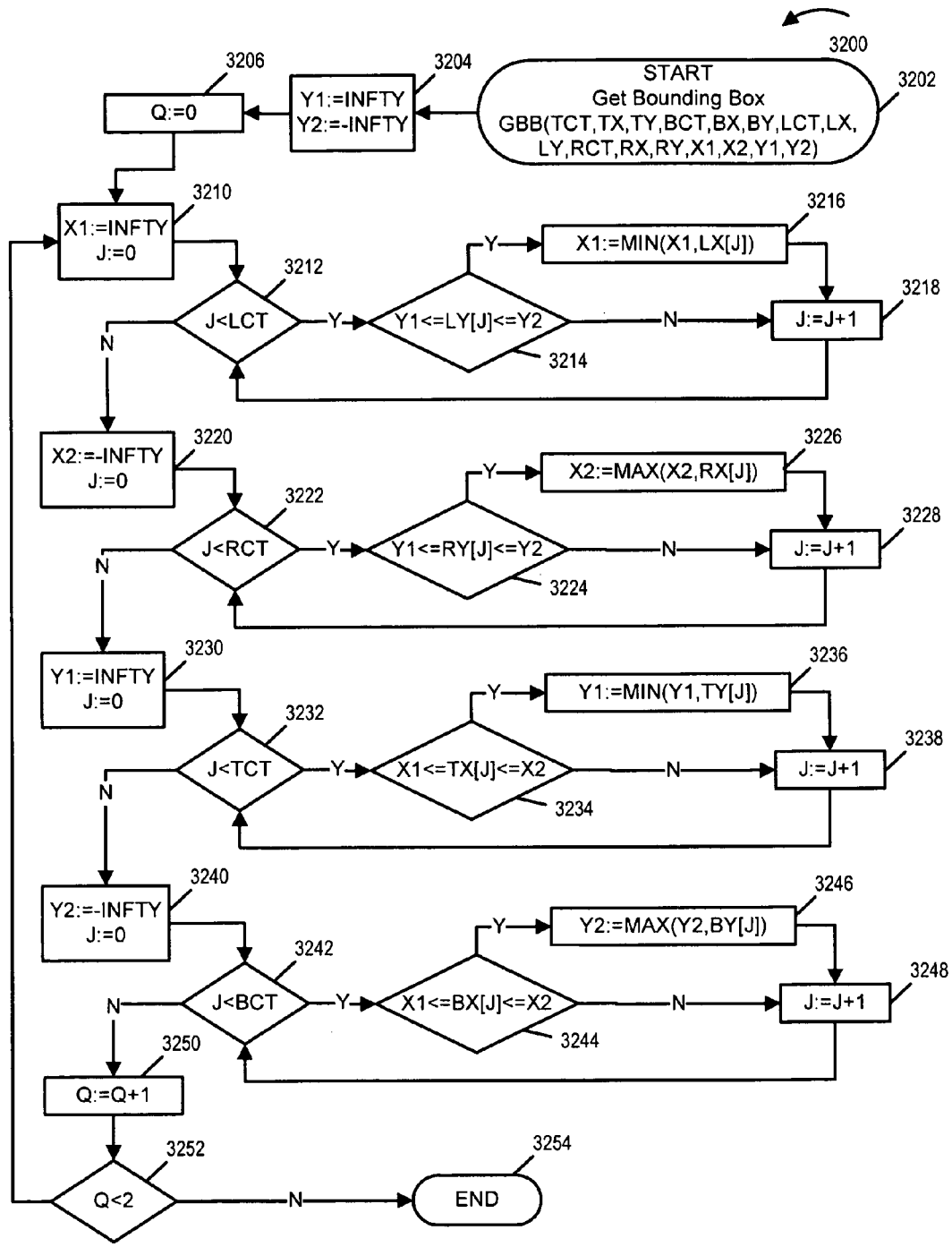
FIG. 32 depicts an exemplary method of determining a bounding rectangle for a set of points in accordance with the present invention.

FIG. 32 shows an exemplary Get Bounding Box (GBB) routine implemented in accordance with the invention. This purpose of this routine is to determine a rectangle of minimum size containing given sets of top edge points, bottom edge points, left edge points, and right edge points. The rectangle is described by a pair of x-values X1 and X2 describing the left and right sides and a pair of y-values Y1 and Y2 describing the top and bottom sides. In a rough sense X1 is defined as the minimum x-value of the points on the left side, X2 as the maximum x-value of the points on the right side, Y1 as the minimum y-value of the points on the top side, and Y2 as the maximum y-value of the points on the bottom side—except that on the left and right sides, points with y-values outside the range Y1 to Y2 are ignored and on the top and bottom sides points with x-values outside the range X1 to X2 are ignored. Arguments to the procedure are the number TCT of points on the top side of the rectangle, an array TX of x-values for each point on the top side, an array TY of y-values for each point on the top side, the number BCT of points on the bottom side of the rectangle, an array BX of x-values for each point on the bottom side, an array BY of y-values for each point on the bottom side, the number LCT of points on the left side of the rectangle, an array LX of x-values for each point on the left side, an array LY of y-values for each point on the left side, the number RCT of points on the right side of the rectangle, an array RX of x-values for each point on the right side, an array RY of y-values for each point on the right side, and the values X1, X2, Y1, Y2 to be determined.

The routine 3200 starts in step 3202. From start step 3202, where the routine begins execution, operation proceeds to step 3204, wherein the values Y1 and Y2 are initialized to INFTY and -INFTY, respectively, where INFTY is any value defined to be larger than any possible value of X1, X2, Y1, or Y2. Control is then transferred to step 3206.

In step 3206, the loop index Q is initialized to 0 in preparation for looping twice over the main body of the procedure. Control is then transferred to step 3210.

In step 3210 the value of X1 is initialized to the value INFTY and the value of the index J is initialized to 0 in preparation for a loop over the left points. Control is then transferred to step 3212.

Step 3212 provides the exit from the loop over the left points. In step 3212 the value of J is compared to LCT. If J is less than LCT control is transferred to step 3214. Otherwise the loop is terminated and control is transferred to step 3220.

In step 3214, the value of LY[J] is examined to determine whether it lies within the range Y1 to Y2. If the comparison succeeds, control is transferred to step 3216. Otherwise, the current point is skipped and control is transferred to step 3218.

In step 3216, the value of X1 is updated to be not greater than the x-value LX[J] of the current point. Control is then transferred to step 3218.

In step 3218, the value of J is incremented in preparation for the next trip through the loop over the left points. Control is then transferred to step 3212.

In step 3220 the value of X2 is initialized to the value -INFTY and the value of the index J is initialized to 0 in preparation for a loop over the right points. Control is then transferred to step 3222.

Step 3222 provides the exit from the loop over the right points. In step 3222 the value of J is compared to RCT. If J is less than RCT control is transferred to step 3224. Otherwise the loop is terminated and control is transferred to step 3230.

In step 3224, the value of RY[J] is examined to determine whether it lies within the range Y1 to Y2. If the comparison succeeds, control is transferred to step 3226. Otherwise, the current point is skipped and control is transferred to step 3228.

In step 3226, the value of X2 is updated to be not less than the x-value RX[J] of the current point. Control is then transferred to step 3228.

In step 3228, the value of J is incremented in preparation for the next trip through the loop over the right points. Control is then transferred to step 3222.

In step 3230 the value of Y1 is initialized to the value INFTY and the value of the index J is initialized to 0 in preparation for a loop over the top points. Control is then transferred to step 3232.

Step 3232 provides the exit from the loop over the top points. In step 3232 the value of J is compared to TCT. If J is less than TCT control is transferred to step 3234. Otherwise the loop is terminated and control is transferred to step 3240.

In step 3234, the value of TX[J] is examined to determine whether it lies within the range X1 to X2. If the comparison succeeds, control is transferred to step 3236. Otherwise, the current point is skipped and control is transferred to step 3238.

In step 3236, the value of Y1 is updated to be not greater than the y-value TY[J] of the current point. Control is then transferred to step 3238.

In step 3238, the value of J is incremented in preparation for the next trip through the loop over the left points. Control is then transferred to step 3232.

In step 3240 the value of Y2 is initialized to the value -INFTY and the value of the index J is initialized to 0 in preparation for a loop over the bottom points. Control is then transferred to step 3242.

Step 3242 provides the exit from the loop over the bottom points. In step 3242 the value of J is compared to BCT. If J is less than BCT control is transferred to step 3244. Otherwise the loop is terminated and control is transferred to step 3250.

In step 3244, the value of BX[J] is examined to determine whether it lies within the range X1 to X2. If the comparison succeeds, control is transferred to step 3246. Otherwise, the current point is skipped and control is transferred to step 3248.

In step 3246, the value of Y2 is updated to be not less than the y-value BY[J] of the current point. Control is then transferred to step 3248.

In step 3248, the value of J is incremented in preparation for the next trip through the loop over the bottom points. Control is then transferred to step 3242.

In step 3250 the value if Q is incremented in preparation for the trip through the loop over the main body of the procedure. Control is then transferred to step 3252.

Step 3252 provides the exit from the loop over the main body of the procedure. The value of Q is compared to 2. If Q is less than 2, control is transferred to step 3210. Otherwise the loop is exited and control is transferred to the end 3254 of the procedure.

Figure 33A:
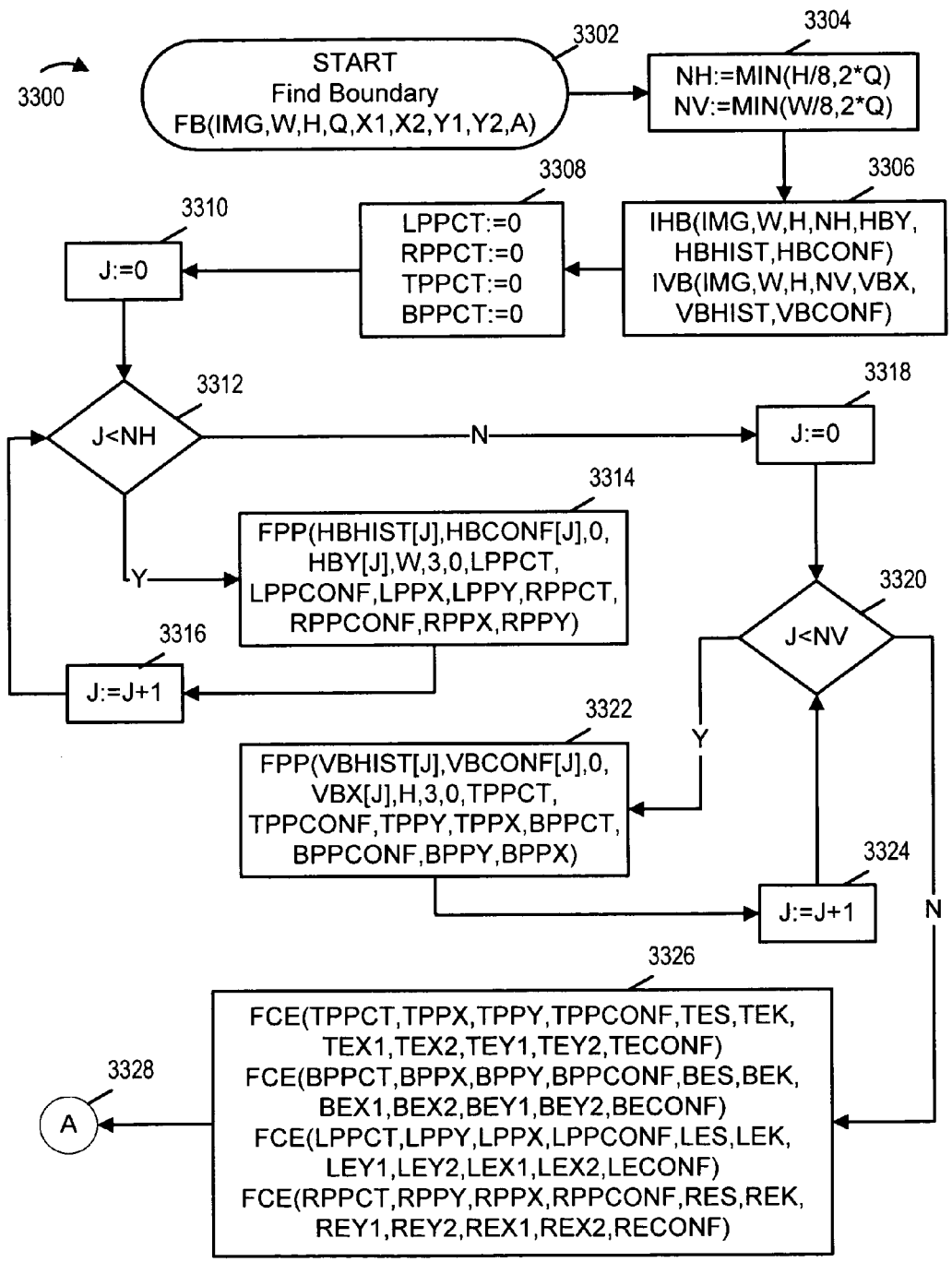
FIG. 33 depicts the method of the invention, taking as input a digitized image representing a scanned form and determining the optimum rotation angle and bounding rectangle.
Figure 33B:
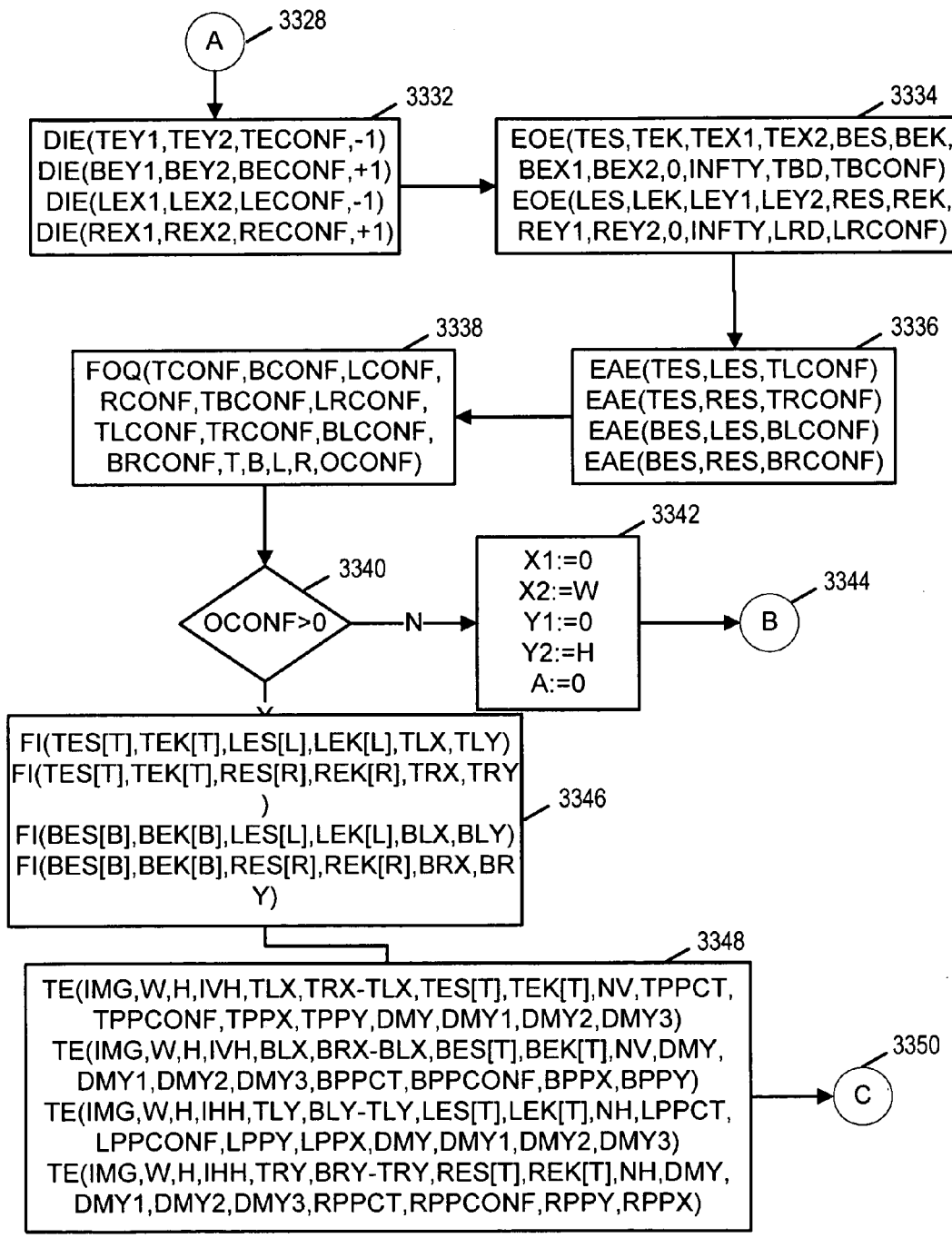
Figure 33C:
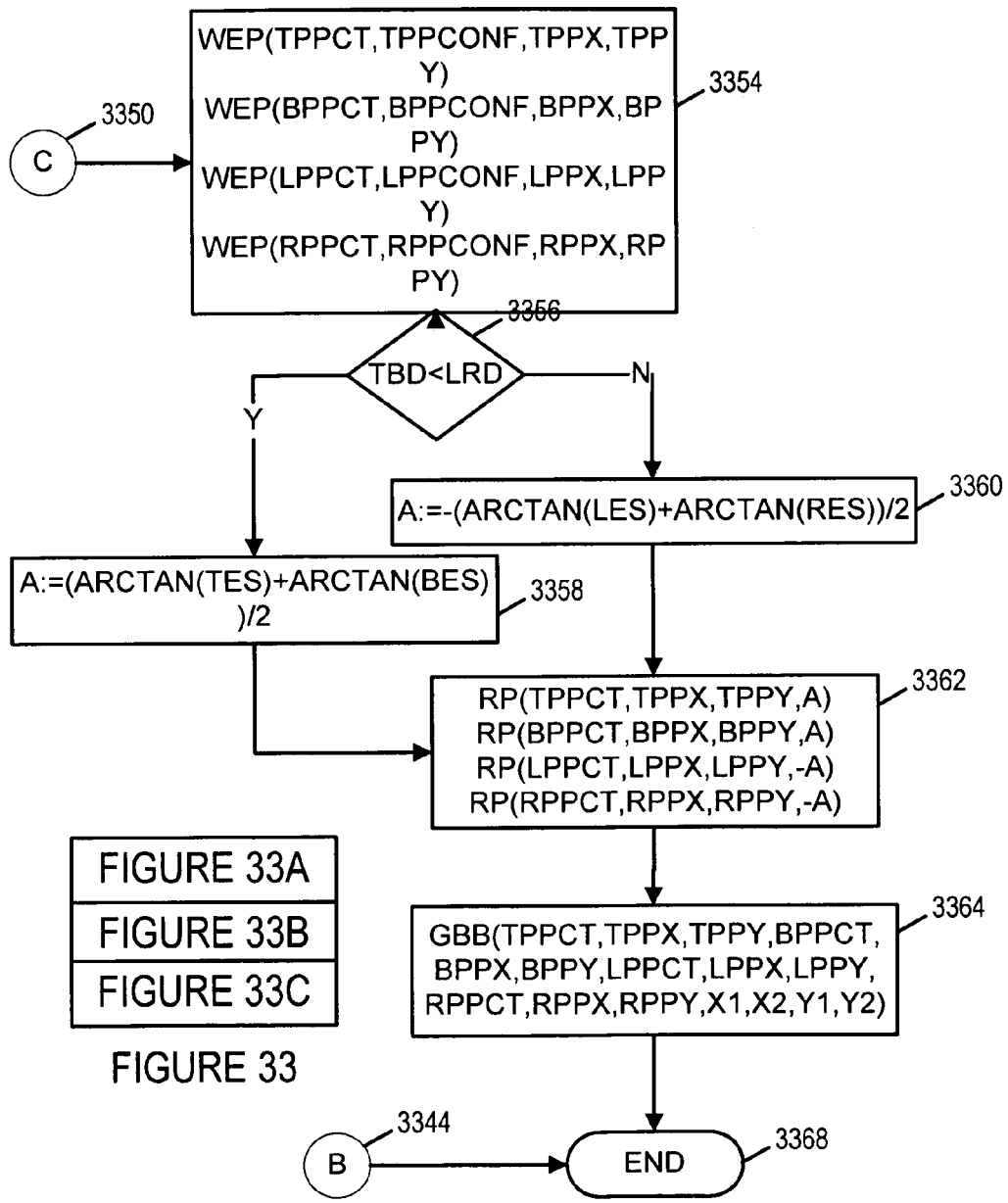

FIG. 33 comprising the combination of FIG. 33A, FIG. 33B and FIG. 33C shows an exemplary Find Boundary (FB) routine implemented in accordance with the invention. This is the top-level routine, which takes a raw image as input and determines a rotation angle and bounding box. Arguments to the procedure are the matrix IMG of pixel values, the width W and height H of the image, a quality parameter Q, the boundary values X1, X2, Y1, Y2 of the bounding box to be determined, and the rotation angle A to be determined. The quality parameter Q ranges in value from 1 to 100. Higher values of the parameter yield more accurate calculation at the expense of greater computation time. The values X1, X2, Y1, and Y2 represent the left, right, top, and bottom edges of the bounding box for the page, respectively, in the coordinate system rotated by the rotation angle A.

The routine 3300 starts in step 3302. From start step 3302, where the routine begins execution, operation proceeds to step 3304, wherein the number NV of vertical bands and the number NH of horizontal bands are calculated as equal to 2*Q, except that NH may not exceed H/8 and NW may not exceed W/8, in order that the bands may not overlap. Control is then transferred to step 3306.

In step 3306, the horizontal and vertical bands are initialized by the operations IHB(IMG,W, H,NH,HBY,HBHIST, HBCONF) and IVB(IMG,W,H,NV,VBX,VBHIST,VBCONF). Here HBY is the NH-element array of y-positions for horizontal bands, HBHIST is the NH×W array holding histogram information for the horizontal bands, HBCONF is the NH-element array of confidence values for horizontal bands, VBX is the NV-element array of x-positions for vertical bands, VBHIST is the NV×H array holding histogram information for the vertical bands, and VBCONF is the NV-element array of confidence values for vertical bands, Control is then transferred to step 3308.

In step 3308 the number LPPCT of left perimeter points, the number RPPCT of right perimeter points, the number TPPCT of top perimeter points, and the number BPPCT of bottom perimeter points are each initialized to zero. Control is then transferred to step 3310.

In step 3110, the index J is initialized to zero in preparation for a loop over the horizontal bands. Control is then transferred to step 3312.

Step 3312 provides the exit from the loop over the horizontal bands. The value of J is compared to NH. If J is less than NH, control is transferred to step 3314. Otherwise the loop is exited and control is transferred to step 3318.

In step 3314 the left and right perimeter points are determined by the operation FPP(HBHIST[J],HBCONF[J],0, HBY[J],W,3,0,LPPCT,LPPCONF,LPPX,LPPY,RPPCT, RPPCONF,RPPX,RPPY). Here LPPCONF is the array of confidence values for left perimeter points, LPPX is the array of x-values for left perimeter points, LPPY is the array of y-values for left perimeter points, RPPCONF is the array of confidence values for right perimeter points, RPPX is the array of x-values for right perimeter points, and RPPY is the array of y-values for right perimeter points. Control is then transferred to step 3316.

In step 3316, the value of J is incremented in preparation for the next trip through the loop over horizontal bands. Control is then transferred to step 3312.

In step 3318, the index J is initialized to zero in preparation for a loop over the vertical bands. Control is then transferred to step 3320.

Step 3320 provides the exit from the loop over the vertical bands. The value of J is compared to NV. If J is less than NV, control is transferred to step 3322. Otherwise the loop is exited and control is transferred to step 3326.

In step 3322 the top and bottom perimeter points are determined by the operation FPP(VBHIST[J],VBCONF[J],0, VBX[J],H,3,0,TPPCT,TPPCONF,TPPY,TPPX,BPPCT, BPPCONF,BPPY,BPPX). Here TPPCONF is the array of confidence values for top perimeter points, TPPX is the array of x-values for top perimeter points, TPPY is the array of y-values for top perimeter points, BPPCONF is the array of confidence values for bottom perimeter points, BPPX is the array of x-values for bottom perimeter points, and BPPY is the array of y-values for bottom perimeter points. Control is then transferred to step 3324.

In step 3324, the value of J is incremented in preparation for the next trip through the loop over vertical bands. Control is then transferred to step 3320.

In step 3326, candidate edges are located on the top, bottom, left, and right of the page by the operations FCE(TPPCT, TPPX,TPPY,TPPCONF,TES,TEK,TEX1,TEX2,TEY1, TEY2,TECONF), FCE(BPPCT,BPPX,BPPY,BPPCONF, BES,BEK,BEX1,BEX2,BEY1,BEY2,BECONF), FCE (LPPCT,LPPY,LPPX,LPPCONF,LES,LEK,LEY1,LEY2, LEX1,LEX2, LECONF), and FCE(RPPCT,RPPY,RPPX, RPPCONF,RES,REK,REY1,REY2,REX1,REX2, RECONF). Here TES is the array of slopes for top candidate edges; TEK is the array of intercepts for top candidate edges; TEX1, TEX2, TEY1, and TEY2 are the arrays of endpoint coordinates for top candidate edges; TECONF is the array of confidence values for top candidate edges; BES is the array of slopes for bottom candidate edges; BEK is the array of intercepts for bottom candidate edges; BEX1, BEX2, BEY1, and BEY2 are the arrays of endpoint coordinates for bottom candidate edges; BECONF is the array of confidence values for bottom candidate edges; LES is the array of slopes for left candidate edges; LEK is the array of intercepts for left candidate edges; LEX1, LEX2, LEY1, and LEY2 are the arrays of endpoint coordinates for left candidate edges; LECONF is the array of confidence values for left candidate edges; RES is the array of slopes for right candidate edges; REK is the array of intercepts for right candidate edges; REX1, REX2, REY1, and REY2 are the arrays of endpoint coordinates for right candidate edges; and RECONF is the array of confidence values for right candidate edges. Control is then transferred to step 3332 via connecting node A 3328.

In step 3332 the confidence of inner edges is reduced by the sequence of operations DIE(TEY1,TEY2,TECONF,−1), DIE(BEY1,BEY2, BECONF,+1), DIE(LEX1,LEX2, LECONF, −1), and DIE(REX1,REX2,RECONF,+1). Control is then transferred to step 3334.

In step 3334 confidence values and distances are calculated for pairs of opposite edges by the operations EOE(TES,TEK, TEX1,TEX2,BES,BEK,BEX1,BEX2,0,INFTY,TBD,TB-CONF) and EOE(LES,LEK,LEY1,LEY2,RES,REK,REY1, REY2,0,INFTY,LRD,LRCONF). Here TBD is the 3×3 array of distances between top and bottom candidate edges, TBCONF is the 3×3 array of confidences for pairs of top and bottom candidate edges, LRD is the 3×3 array of distances between left and right candidate edges, and LRCONF is the 3×3 array of confidences for pairs of left and right candidate edges, Control is then transferred to step3336.

In step 3336 confidence values are calculated for pairs of adjacent edges by the operations EAE(TES,LES,TLCONF), EAE(TES,RES,TRCONF), EAE(BES,LES,BLCONF), and EAE(BES,RES,BRCONF). Here TLCONF is the 3×3 array of confidences for pairs of top and left candidate edges, TRCONF is the 3×3 array of confidences for pairs of top and right candidate edges, BLCONF is the 3×3 array of confidences for pairs of bottom and left candidate edges, and BRCONF is the 3×3 array of confidences for pairs of bottom and right candidate edges. Control is then transferred to step 3338.

In step 3338 the quadrilateral of greatest overall confidence is determined by the operation FOQ(TCONF,BCONF, LCONF,RCONF,TBCONF,LRCONF,TLCONF,TRCONF, BLCO NF, BRCONF,T,B,L,R,OCONF). Here T, B, L, and R are the indices of the top, bottom, left, and right candidate edges, respectively, composing the optimum quadrilateral, and OCONF is the overall confidence values associated with the optimum quadrilateral. Control is then transferred to step 3340.

In step 3340 the overall confidence value OCONF is compared to zero. A non-positive value indicates that no optimum quadrilateral was found. In this case control is transferred to step 3342. Otherwise control is transferred to step 3346.

In step 3342 it is known that no optimum quadrilateral was found. Outputs from the procedure are therefore calculated as representing the entire image: X2:=W, Y1:=0, Y2:=H, and A:=0. Control is then transferred to the end 3368 of the procedure via connecting node B 3344.

In step 3346 the vertices of the optimum quadrilateral are determined by the operations FI(TES [T] ,TEK[T],LES [L] ,LEK[L] ,TLX,TLY), FI(TES[T],TEK[T],RES[R],REK[R], TRX, TRY), FI(BES [B],BEK[B],LES [L],LEK[L],BLX, BLY), and FI(BES[B],BEK[B],RES [R], REK[R],BRX, BRY). Here TLX and TLY are the coordinates of the top-left vertex, TRX and TRY are the coordinates of the top-right vertex, BLX and BLY are the coordinates of the bottom-left vertex, and BRX and BRY are the coordinates of the bottom-right vertex. Control is then transferred to step 3348.

In step 3348, boundary points along each of the four edges of the optimum quadrilateral are determined by the operations TE(IMG,W,H,IVH,TLX,TRX-TLX,TES [T],TEK[T], NV,TPPCT, TPPCONF,TPPX,TPPY,DMY,DMY1,DMY2, DMY3), TE(IMG,W,H,IVH,BLX,BRX-BLX, BES [T],BEK [T],NV,DMY,DMY1,DMY2,DMY3,BPPCT,BPPCONF, BPPX,BPPY), TE(IMG,W,H,IHH,TLY,BLY-TLY,LES[T], LEK[T],NH,LPPCT,LPPCONF,LPPY,LPPX, DMY,DMY1, DMY2,DMY3), and TE(IMG,W,H,IHH,TRY,BRY-TRY, RES[T],REK[T],NH, DMY,DMY1,DMY2,DMY3,RPPCT, RPPCONF,RPPY,RPPX). Here DMY, DMY1, DMY2, and DMY3 are dummy variables whose values are ignored, TPPCT is the number of top perimeter points located, TPPX is the array of x-coordinates of top perimeter points, TPPY is the array of y-coordinates of top perimeter points, TPPCONF is the array of confidence values for top perimeter points, BPPCT is the number of bottom perimeter points located, BPPX is the array of x-coordinates of bottom perimeter points, BPPY is the array of y-coordinates of bottom perimeter points, BPPCONF is the array of confidence values for bottom perimeter points, LPPCT is the number of left perimeter points located, LPPX is the array of x-coordinates of left perimeter points, LPPY is the array of y-coordinates of left perimeter points, LPPCONF is the array of confidence values for left perimeter points, RPPCT is the number of right perimeter points located, RPPX is the array of x-coordinates of right perimeter points, RPPY is the array of y-coordinates of right perimeter points, and RPPCONF is the array of confidence values for right perimeter points, Control is then transferred to step 3354 via connecting node C 3350.

In step 3354 low-confidence perimeter points are discarded by the operations WEP(TPPCT, TPPCONF,TPPX,TPPY), WEP(BPPCT,BPPCONF,BPPX,BPPY), WEP(LPPCT,LPP-CONF, LPPX,LPPY), and WEP(RPPCT,RPPCONF,RPPX, RPPY). Control is then transferred to step 3356.

In step 3356 the distance TBD between the top and bottom edges is compared to the distance LRD between the left and right edges, in preparation for calculation of the rotation angle. Accuracy is enhanced by using the pair of edges closer together for this calculation. If TBD is less than LRD, control is transferred to step 3358. Otherwise, control is transferred to step 3360.

In step 3358 the rotation angle A is calculated from the slopes of the top and bottom edges according to the formula (ARCTAN(TES)+ARCTAN(BES))/2. Control is then transferred to step 3362.

In step 3360 the rotation angle A is calculated from the slopes of the left and right edges according to the formula −(ARCTAN(LES)+ARCTAN(RES))/2. Control is then transferred to step 3362.

In step 3362 the perimeter point coordinates are rotated by the sequence of operations RP(TPPCT,TPPX,TPPY,A), RP(BPPCT,BPPX,BPPY,A), RP(LPPCT,LPPX,LPPY,-A), RP(RPPCT,RPPX,RPPY,-A). Control is then transferred to step 3364.

In step 3364 the bounding box coordinates X1, X2, Y1, Y2 are calculated by the operation GBB(TPPCT,TPPX,TPPY, BPPCT,BPPX,BPPY,LPPCT,LPPX,LPPY,RPPCT,RPPX, RP PY,X1, X2,Y1,Y2). Control is then transferred to the end 3366 of the procedure.

Figure 34:
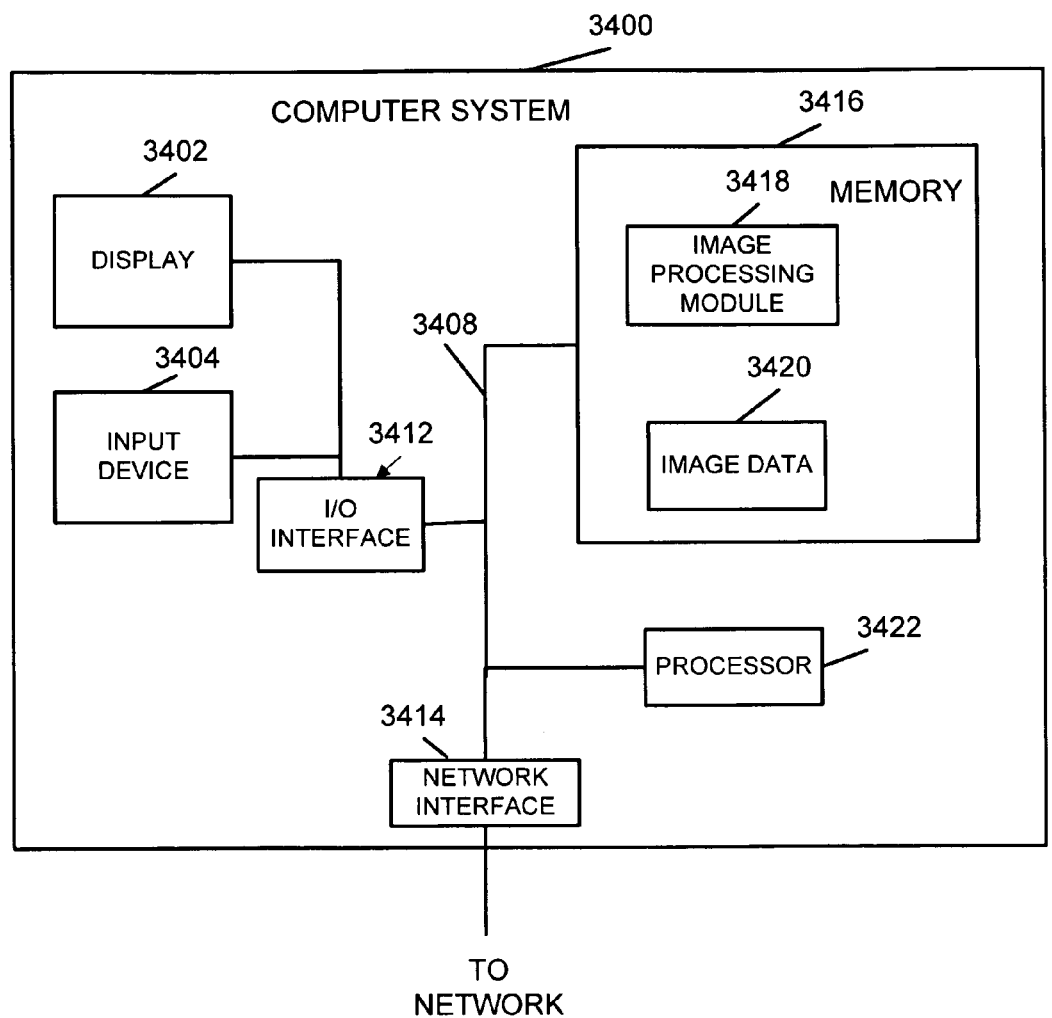
FIG. 34 depicts a computer system for processing image data implemented in accordance with one embodiment of the present invention.

FIG. 34 illustrates a computer system 3400 for processing image data implemented in accordance with one embodiment of the present invention. The computer system 3400 includes a display device 3402, input device 3404, memory 3416, processor 3422, network interface 3414, and I/O interface 3412. The display device 3402 may be used, e.g., to display images resulting from processing implemented in accordance with the present invention. Input device 3404 may be, e.g. a keyboard or other user input device. The display and input device are coupled to a bus 3408 by I/O interface 3412. The bus 3408 is also coupled to the memory 3416, processor 3422 and network interface 3414. The network interface 3414 coupled the internal components of the system 3400 to an external network, e.g., the Internet, thereby allowing the system 3400 to receive and send image data over a network. The processor 3422 controls operation of the computer system 3400 under direction of software modules and/or routines stored in the memory 3416. Memory 3416 includes image data 3420 at least one image processing module 3418 which includes a software routine, e.g., machine executable instructions, for implementing one or more of the above-described image processing methods of the present invention. When executed by processor 3422, the image processing module 3418 causes at least some of the image data to be processed by the processor 3422 in accordance with a method of the present invention. The resulting processed image data is stored in memory 3416 for future use or additional processing or supplied to display device 3402 to be displayed.

Figure 35:
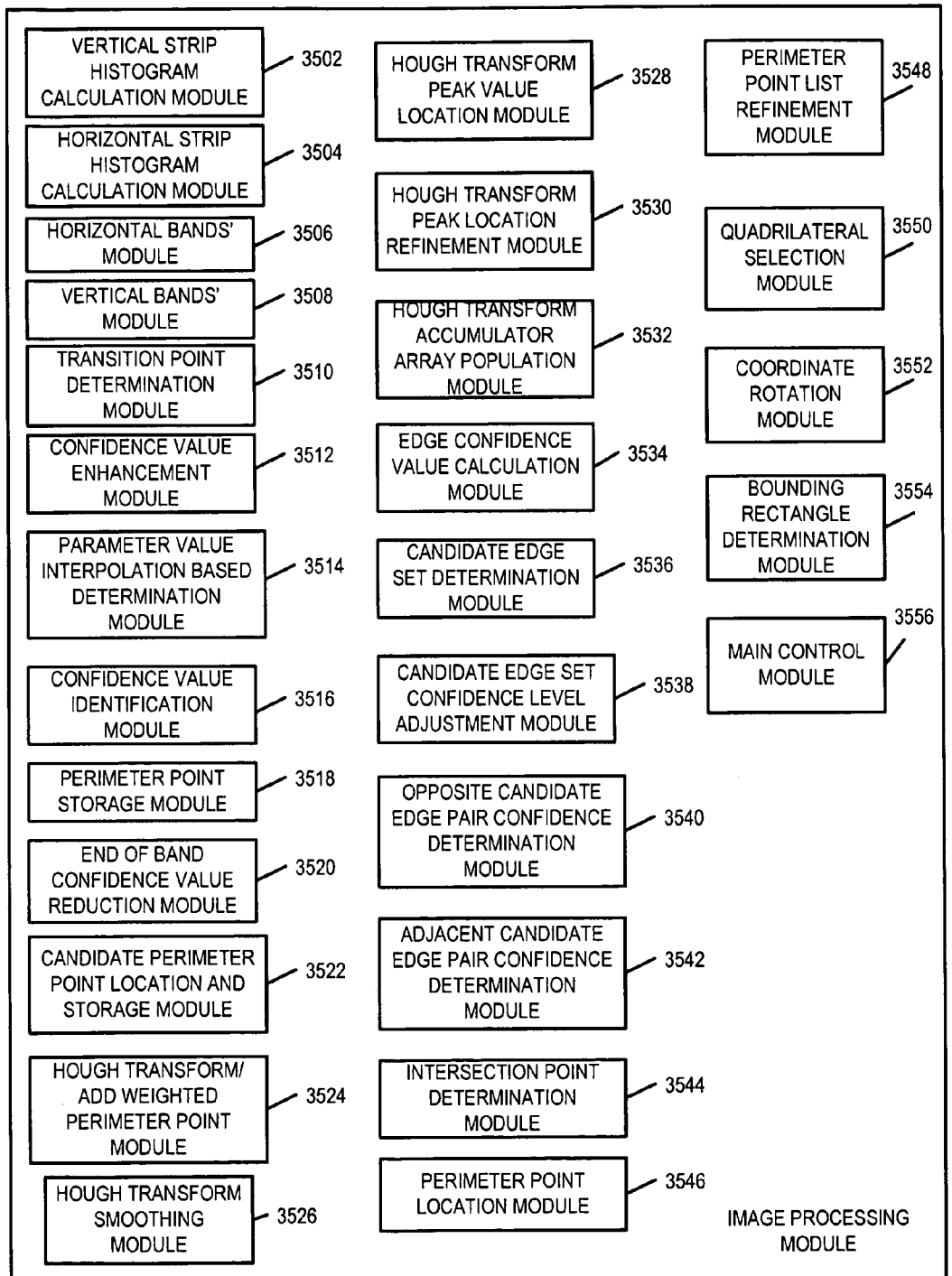
FIG. 35 depicts an exemplary image processing module.

FIG. 35 is a drawing of an exemplary image processing module 3418'. Exemplary image processing module 3418' may be the image processing module 3418 of computer system 3400 of FIG. 34. Image processing module 3418 includes a vertical strip histogram calculation module 3502, a horizontal strip histogram calculation module 3504, a horizontal bands' module 3506, a vertical bands' module 3508, a transition point determination module 3510, a confidence value enhancement module 3512, a parameter value interpolation based determination module 3514, a confidence value identification module 3516, a perimeter point storage module 3518, an end of band confidence value reduction module 3520, a candidate perimeter point location and storage module 3522, a Hough transform/add weighted perimeter point module 3524, a Hough transform smoothing module 3526, a Hough transform peak value location module 3528, a Hough transform peak location refinement module 3530, a Hough transform accumulator array population module 3532, an edge confidence value calculation module 3524, a candidate edge set determination module 3536, a candidate edge set confidence level adjustment module 3538, an opposite candidate edge pair confidence determination module 3540, an adjacent candidate edge pair confidence determination module 3542, an intersection point determination module 3544, a perimeter point location module 3546, a perimeter point list refinement module 3548, a quadrilateral selection module 3550, a coordinate rotation module 3552, a bounding rectangle determination module 3554, and a main control module 3556.

Vertical strip histogram calculation module 3502 performs the method of the flowchart of FIG. 6. Horizontal strip histogram calculation module 3504 performs the method of the flowchart of FIG. 7. Horizontal bands' module 3506 performs the method of the flowchart of FIG. 8. Vertical bands' module 3508 performs the method of the flowchart of FIG. 9. Transition point determination module 3510 performs the method of the flowchart of FIG. 10. Confidence value enhancement module 3512 performs the method of the flowchart of FIG. 11. Parameter value interpolation based determination module 3514 performs the method of the flowchart of FIG. 12. Confidence value identification module 3516 performs the method of the flowchart of FIG. 13. Perimeter point storage module 3518 performs the method of the flowchart of FIG. 14. End of band confidence value reduction module 3520 performs the method of the flowchart of FIG. 15. Candidate perimeter point location and storage module 3522 performs the method of the flowchart of FIG. 16. Hough transform/add weighted perimeter point module 3524 performs the method of the flowchart of FIG. 17. Hough transform smoothing module 3526 performs the method of the flowchart of FIG. 18. Hough transform peak value location module 3528 performs the method of the flowchart of FIG. 19. Hough transform peak location refinement module 3530 performs the method of the flowchart of FIG. 20. Hugh transform accumulator array population module 3532 performs the method of the flowchart of FIG. 21. Edge confidence value calculation module 3534 performs the method of the flowchart of FIG. 22. Candidate edge set determination module 3536 performs the method of the flowchart of FIG. 23. Candidate edge set confidence level adjustment module 3538 performs the method of the flowchart of FIG. 24. Opposite candidate edge pair confidence determination module 3540 performs the method of the flowchart of FIG. 25. Adjacent candidate edge pair confidence determination module 3542 performs the method of the flowchart of FIG. 26. Intersection point determination module 3544 performs the method of the flowchart of FIG. 27. Perimeter point location module 3546 performs the method of the flowchart of FIG. 28. Perimeter point list refinement module 3548 performs the method of the flowchart of FIG. 29. Quadrilateral selection module 3550 performs the method of the flowchart of FIG. 30. Coordinate rotation module 3552 performs the method of the flowchart of FIG. 31. Bounding rectangle determination module 3554 performs the method of the flowchart of FIG. 32. Main control module 3556 performs the method of the flowchart of FIG. 33.

In the exemplary embodiment using image processing module 3418' a Hough transform incorporating fuzzy logic including confidence values is employed in accordance with the present invention. In some other embodiments of the present invention, a different mathematical tool, other than a Hough transform, may be utilized for the purposes of locating line structures in a set of points, the alternative method employing fizzy logic including confidence values.

Various features of the present invention are implemented using modules. Such modules may be implemented using software, hardware or a combination of software and hardware. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of processing an image represented by a plurality of pixel values, each pixel value corresponding to a pixel element, the method comprising:
   operating a processor in a computer system to generate for each of a plurality of first bands of pixel values in said image, a first set of first histogram values, said first bands extending in a first direction, each first histogram value corresponding to a set of pixel values extending in a second direction perpendicular to said first direction; and
   analyzing at least some of the first set of histogram values to determine for each analyzed first set of histogram values a location of a first image edge and a first confidence value corresponding to the determined first image edge location.

2. The method of processing an image of claim 1, wherein said analyzing to determine a location of a first image edge generates a first set of first image edge locations and corresponding edge location confidence values, the method further comprising:
   determining from the first set of image edge locations and corresponding confidence values, a first possible image edge line.

3. The method of claim 2, wherein determining from the first set of image edge locations and corresponding confidence values, a first possible image edge line includes giving greater weight to determined first image edge locations corresponding to bands closer to the center of the image than to bands located further away from the center of the image when making said first possible image edge line determination.

4. The method of processing an image of claim 2, further comprising:
   analyzing at least some of the first set of histogram values to determine for each analyzed first set of histogram values a location of a second image edge and a second confidence value corresponding to the determined second image edge location.

5. The method of claim 4,
   wherein said analyzing to determine a location of a second image edge generates a second set of first image edge locations and corresponding edge location confidence values; and
   wherein the method further comprises:
   determining from the second set of image edge locations and corresponding confidence values, a second possible image edge line.

6. The method of claim 5, wherein, said first and second image edge locations correspond to different sides of the analyzed first band.

7. The method of claim 5, wherein determining from the second set of image edge locations and corresponding confidence values, a second possible image edge line includes giving greater weight to determined second image edge locations corresponding to bands closer to the center of the image than to bands located further away from the center of the image when making said second possible image edge line determination.

8. The method of claim 5, further comprising:
   generating for each of a plurality of second bands of pixel values in said image, a second set of histogram values, said second bands extending in a second direction which is perpendicular said first direction, each second histogram value corresponding to a set of pixel values extending in said first direction; and
   analyzing at least some of the second set of histogram values to determine for each analyzed second set of histogram values a location of a third image edge and a third confidence value corresponding to the determined third image edge location.

9. The method of claim 8, wherein said analyzing at least some of the second set of histogram values generates a third set of image edge locations and third set of corresponding edge location confidence values, the method further comprising:
   determining from the third set of image edge locations and corresponding confidence values, a third possible image edge line.

10. The method of claim 9, wherein determining from the second set of image edge locations and corresponding confidence values, a third possible image edge line includes giving greater weight to determined third image edge locations corresponding to bands closer to the center of the image than to bands located further away from the center of the image when making said third possible image edge line determination.

11. The method of claim 9, further comprising
   determining from the third set of image edge locations and corresponding confidence values, a fourth possible image edge.

12. The method of claim 11, further comprising:
   determining at least a fifth, a sixth, seventh and eighth possible image edge line, said fifth and sixth possible image edges extending primarily in said second direction and said seventh and eight possible image edges extending primarily in said first direction.

13. The method of claim 12, further comprising:
   selecting a set of four possible edges lines from a set of possible edge lines including at least said set of eight possible edge lines as a function of which combination of edge lines in said set of possible edge lines is determined to most probably correspond to the shape of a scanned image.

14. The method of claim 13, wherein said selecting of a set of four possible edge lines includes considering how parallel to one another pairs of edge lines extending in the same general direction are.

15. The method of claim 13, wherein selecting of a set of four possible edge lines includes considering how closely pairs of edge lines extending in different directions come to forming a perpendicular intersection.

16. The method of claim 13, further comprising:
   determining an image skew angle from the selected set of four possible edge lines.

17. The method of claim 16, further comprising:
determining, from the determined image skew angle, a bounding box for a printed area included in said image.

18. The method of claim 17, wherein said determining of a bounding box is based on points at which pairs of selected possible edge lines in said selected set of four possible edge lines intersect.

19. The method of claim 1, wherein the first image edge corresponds to a detected image parameter point.

20. The method of processing an image of claim 1, wherein said analyzing to determine a location of a first image edge generates a first set of first image edge locations and corresponding edge location confidence values, the method further comprising:
determining from the first set of image edge locations and corresponding confidence values, a first possible image edge line and a first line confidence value corresponding to said first possible image edge line; and
determining from the first set of image edge locations and corresponding confidence values, a second possible image edge line and a second line confidence value corresponding to said second possible image edge line.

21. The method of claim 20,
wherein said steps of determining from the first set of image edge locations and corresponding confidence values a first possible edge line and a first line confidence value, and a second possible edge line and a second line confidence value, include:
giving lower line confidence values to determined edge lines having the same characteristics but located closer to the center of the image than to edge lines located further away from the center of the image.

22. The method of claim 20,
wherein said steps of determining from the first set of image edge locations and corresponding confidence values, a first possible edge line and a first line confidence value, and a second possible edge line and a second line confidence value, include:
applying a lower weight to line confidence values closer to the center of the image than determined edge lines further away from the center of the image.

23. The method of claim 22, wherein said first and second edge possible lines correspond to the same side of an image, the method further comprising:
determining from the first set of image edge locations and corresponding confidence values, a third and further possible edge lines and corresponding third and fourth edge line confidence values, respectively, the thirds and fourth edge lines being located on an image edge positioned opposite said first and second possible edge lines.

24. A method of processing image data, method comprising:
operating a processor in a computer system to select, from a set of possible edge lines including at least said set of eight possible edge lines, a set of four possible edges lines as a function of which combination of edge lines in said set of possible edge lines is determined to most probably correspond to the shape of a scanned image; and
performing one of: i) outputting information indicating the selected set of four edge lines, ii) storing information indicating the selected set of four edge lines and iii) using the selected set of four edge lines in an image processing operation.

25. The method of claim 24, wherein said step of operating a processor in a computer system to select a set of four possible edge lines includes considering how parallel to one another pairs of edge lines extending in the same general direction are.

26. The method of claim 24, wherein said step of operating a processor in a computer system to select a set of four possible edge lines includes considering how closely pairs of edge lines extending in different directions come to forming a perpendicular intersection.

27. The method of claim 24, further comprising:
determining an image skew angle from the selected set of four possible edge lines.

28. The method of claim 27, further comprising:
determining, from the determined image skew angle, a bounding box for a printed area included in said image.

29. The method of claim 28, wherein said determining of a bounding box is based on points at which pairs of selected possible edge lines in said selected set of four possible edge lines intersect.

30. An apparatus for processing an image represented by a plurality of pixel values, each pixel value corresponding to a pixel element, the apparatus comprising:
a processor; and
a memory including:
means for controlling the processor to generate, for each of a plurality of first bands of pixel values in said image, a first set of first histogram values, said first bands extending in a first direction, each first histogram value corresponding to a set of pixel values extending in a second direction perpendicular to said first direction; and
means for controlling the processor to analyze at least some of the first set of histogram values to determine for each analyzed first set of histogram values a location of a first image edge and a first confidence value corresponding to the determined first image edge location.

31. A non-transitory machine readable medium including machine executable instructions which, when executed control a processor to implement a method of processing an image represented by a plurality of pixel values, each pixel value corresponding to a pixel element, the method comprising the steps of:
generating for each of a plurality of first bands of pixel values in said image, a first set of first histogram values, said first bands extending in a first direction, each first histogram value corresponding to a set of pixel values extending in a second direction perpendicular to said first direction; and
analyzing at least some of the first set of histogram values to determine for each analyzed first set of histogram values a location of a first image edge and a first confidence value corresponding to the determined first image edge location.

* * * * *